US012500343B2

(12) United States Patent
Zhou et al.

(10) Patent No.: US 12,500,343 B2
(45) Date of Patent: Dec. 16, 2025

(54) TERMINAL MONOPOLE ANTENNA BASED ON COUPLED FEEDING

(71) Applicant: Honor Device Co., Ltd., Shenzhen (CN)

(72) Inventors: Dawei Zhou, Shenzhen (CN); Yuanpeng Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 114 days.

(21) Appl. No.: 18/550,035

(22) PCT Filed: May 5, 2022

(86) PCT No.: PCT/CN2022/091007
§ 371 (c)(1),
(2) Date: Sep. 11, 2023

(87) PCT Pub. No.: WO2023/020019
PCT Pub. Date: Feb. 23, 2023

(65) Prior Publication Data
US 2024/0154311 A1 May 9, 2024

(30) Foreign Application Priority Data
Aug. 20, 2021 (CN) ......................... 202110961752.4

(51) Int. Cl.
*H01Q 1/24* (2006.01)
*H01Q 9/04* (2006.01)

(52) U.S. Cl.
CPC ........... *H01Q 9/0421* (2013.01); *H01Q 1/243* (2013.01); *H01Q 9/0442* (2013.01); *H01Q 9/0457* (2013.01)

(58) Field of Classification Search
CPC ............ H01Q 1/24; H01Q 9/04; H01Q 9/042; H01Q 9/0421; H01Q 9/0442;
(Continued)

(56) References Cited

U.S. PATENT DOCUMENTS 7,030,833 B2 4/2006 Ohara et al.
11,949,177 B2 4/2024 Wang et al.
(Continued)

FOREIGN PATENT DOCUMENTS

CN 1599130 A 3/2005
CN 102570039 A 7/2012
(Continued)

OTHER PUBLICATIONS

Yang Hong, Hou Chunpen, "Design of a multi-band single-plane monopole mobile phone antenna", Digital Technology and Application, 2017, (01), pp. 145-146, Jan. 15, 2017.
(Continued)

*Primary Examiner* — Thai Pham
(74) *Attorney, Agent, or Firm* — Slater Matsil, LLP

(57) ABSTRACT

Embodiments of this application disclose a terminal monopole antenna based on coupled feeding, relate to the technical field of antennas. The antenna includes a feed stub and a radiation stub. The radiation stub includes at least one radiator. Ends on two sides of the radiator are coupled to a reference ground through a first capacitor and a second capacitor. The feed stub is not connected to the radiation stub. The feed stub is arranged between the radiation stub and the reference ground. A feed point is provided on the feed stub. The feed stub is used to perform coupled feeding on the radiation stub.

20 Claims, 40 Drawing Sheets

Current loop monopole antenna

(58) Field of Classification Search
CPC ........ H01Q 9/0457; H01Q 5/30; H01Q 5/314; H01Q 5/328; H01Q 5/357; H01Q 7/005
See application file for complete search history.

(56) References Cited

U.S. PATENT DOCUMENTS

| | | | | |
|---|---|---|---|---|
| 12,107,324 | B2 * | 10/2024 | Chang | H01Q 21/28 |
| 2011/0193757 | A1 | 8/2011 | Choi et al. | |
| 2014/0333496 | A1 * | 11/2014 | Hu | H01Q 1/243<br>343/745 |
| 2015/0311585 | A1 | 10/2015 | Church et al. | |
| 2015/0318607 | A1 | 11/2015 | Chieh et al. | |
| 2016/0111794 | A1 * | 4/2016 | Yang | H01Q 21/28<br>343/893 |
| 2016/0276742 | A1 | 9/2016 | Yu et al. | |
| 2018/0212313 | A1 * | 7/2018 | Harper | H01Q 1/50 |

FOREIGN PATENT DOCUMENTS

| | | | |
|---|---|---|---|
| CN | 105870595 | A | 8/2016 |
| CN | 106252848 | A | 12/2016 |
| CN | 111490346 | A | 8/2020 |
| CN | 111628274 | A | 9/2020 |
| JP | 2000269724 | A | 9/2000 |
| JP | 2002290138 | A | 10/2002 |
| JP | 2008205680 | A | 9/2008 |
| WO | 2020173292 | A1 | 9/2020 |
| WO | 2020173298 | A1 | 9/2020 |

OTHER PUBLICATIONS

C. C. Lin, P. Jin and R. W. Ziolkowski, “Multi-Functional, Magnetically-Coupled, Electrically Small, Near-Field Resonant Parasitic Wire Antennas,” in IEEE Transactions on Antennas and Propagation, vol. 59, No. 3, pp. 714-724, Mar. 2011.

* cited by examiner (a)

(b)

(a)

(b)

(a)

(b)

Current loop dipole antenna
(current simulation)

(a)

(b)

Current loop dipole antenna
(magnetic field simulation)

(a)

(b)

Illustration of arrangement of current loop slot antenna in electronic device

Current loop slot antenna
(current simulation)

(a)

(b)

Current loop slot antenna
(magnetic field simulation)

(a)

(b)

Current loop left-handed antenna
(current simulation)

(a)

(b)

Current loop left-handed antenna
(magnetic field simulation)

(a)

(b)

(a)

(b)

TERMINAL MONOPOLE ANTENNA BASED ON COUPLED FEEDING

CROSS-REFERENCE TO RELATED APPLICATIONS

This application is a national stage of International Application No. PCT/CN2022/091007, filed on May 5, 2022, which claims priority to Chinese Patent Application No. 202110961752.4, filed on Aug. 20, 2021. The disclosures of both of the aforementioned applications are hereby incorporated by reference in their entireties.

TECHNICAL FIELD

This application relates to the technical field of antennas, and in particular, to a terminal monopole antenna based on coupled feeding.

BACKGROUND

With development of electronic devices, an environment in which antennas can be arranged in the electronic devices is becoming worse. As a result, a typical antenna form has gradually failed to meet a requirement of the electronic devices for wireless communication quality.

With a working mechanism different from that of the typical antenna, a current loop antenna has a more flexible requirement for an environment during antenna configuration, and therefore has a good development prospect. For common current loop antennas, signals are all fed by using a direct feeding mechanism. Because the direct feeding mechanism has a relatively high requirement on space, difficulty of configuring a current loop antenna is increased.

SUMMARY

Embodiments of this application provide a terminal monopole antenna based on coupled feeding, which can achieve radiation of a current loop antenna in a form of coupled feeding, thereby avoiding a limitation from direct feeding on arrangement of the current loop antenna.

To achieve the foregoing objective, the following technical solutions are used in the embodiments of this application:

According to a first aspect, a terminal monopole antenna based on coupled feeding is provided. For example, the terminal monopole antenna may be a current loop antenna. The antenna includes a feed stub and a radiation stub. The radiation stub includes at least one radiator. Ends on two sides of the radiator are coupled to a reference ground through a first capacitor and a second capacitor. The feed stub is not connected to the radiation stub. The feed stub is arranged between the radiation stub and the reference ground. A feed point is provided on the feed stub. The feed stub is used to perform coupled feeding on the radiation stub. A length of the radiation stub is less than one quarter of an operating wavelength of the terminal antenna.

Based on this solution, a current loop antenna for feeding through space coupling is provided. In this example, the current loop antenna may be a current loop monopole antenna. In this example, the feed stub may be used to perform coupled feeding. The feed stub may be arranged between the radiation stub and the reference ground. The feed stub is not connected to the radiation stub because the feed stub can perform feeding in a form of space coupling. In some implementations, two ends of the radiation stub can be grounded through capacitors, so that when the radiation stub is working, a uniform magnetic field in a same direction is formed near the antenna, for example, between the antenna radiator and the reference ground, that is, a radiation feature of the current loop antenna is obtained.

In a possible design, when an operating band of the antenna is 450 MHz to 1 GHz, a capacitance value of each of the first capacitor and the second capacitor is set within [1.5 pF, 15 pF]. When an operating band of the antenna is 1 GHz to 3 GHz, a capacitance value of each of the first capacitor and the second capacitor is set within [0.5 pF, 15 pF]. When an operating band of the antenna is 3 GHz to 10 GHz, a capacitance value of each of the first capacitor and the second capacitor is set within [1.2 pF, 12 pF]. Based on this solution, a possible solution of tuning an operating band is provided. This example provides a limit on the magnitude of end capacitors corresponding to different operating bands, thereby ensuring efficient radiation of the current loop antenna.

In a possible design, the radiation stub is connected in series with one or more third capacitors. When an operating band of the antenna is 450 MHz to 1 GHz, a capacitance value of the third capacitor is set within [2 pF, 25 pF]. When an operating band of the antenna is 1 GHz to 3 GHz, a capacitance value of the third capacitor is set within [0.8 pF, 12 pF]. When an operating band of the antenna is 3 GHz to 10 GHz, a capacitance value of the third capacitor is set within [0.2 pF, 8 pF]. Based on this solution, a possible solution of tuning an operating band is provided. This example provides a magnitude limit of capacitors connected in series with the radiator and corresponding to different operating bands, thereby ensuring efficient radiation of the current loop antenna. Generally, a larger quantity of capacitors connected in series with the radiator indicates a more uniform distribution of the magnetic field, thereby improving radiation efficiency of the current loop antenna.

In a possible design, the feed stub includes a first feed portion and a second feed portion. One end of the first feed portion is coupled to one end of the feed point. One end of the second feed portion is coupled to the other end of the feed point. The first feed portion and the second feed portion are axisymmetrical about a longitudinal axis on which the feed point is located. The other end of each of the first feed portion and the second feed portion away from the feed point is coupled to the reference ground. Based on this solution, a possible feed stub configuration is provided. The feed stub with the structure can effectively excite the radiation stub in the foregoing example to perform radiation with a radiation feature of the current loop antenna.

In a possible design, that the other end of each of the first feed portion and the second feed portion away from the feed point is coupled to the reference ground includes: the other end of each of the first feed portion and the second feed portion away from the feed point is coupled to the reference ground through a capacitor. Based on this solution, a possible feed stub configuration is provided. The feed stub with the structure can effectively excite the radiation stub in the foregoing example to perform radiation with a radiation feature of the current loop antenna.

In a possible design, the feed stub includes a third feed portion. A first end of the third feed portion is coupled to one end of the feed point. A second end of the third feed portion is coupled to the reference ground. The other end of the feed point is coupled to a radio frequency microstrip. Based on this solution, a possible feed stub configuration is provided. The feed stub with the structure can effectively excite the radiation stub in the foregoing example to perform radiation with a radiation feature of the current loop antenna.

In a possible design, the third feed portion is connected in series with at least one capacitor, including at least a fourth capacitor. The fourth capacitor is arranged in a center of a coupling part between the third feed portion and the radiation stub. Based on this solution, a possible feed stub configuration is provided. The feed stub with the structure can effectively excite the radiation stub in the foregoing example to perform radiation with a radiation feature of the current loop antenna.

In a possible design, the second end of the third feed portion is coupled to the reference ground through a tuning device. The tuning device includes at least one of the following devices: a capacitor, an inductor, and a resistor. Based on this solution, a possible feed stub configuration is provided. The feed stub with the structure can effectively excite the radiation stub in the foregoing example to perform radiation with a radiation feature of the current loop antenna.

In a possible design, a distance between the first end of the third feed portion and the second end of the third feed portion is less than a projection length of the third feed portion on the radiation stub. Based on this solution, a possible feed stub configuration is provided. The feed stub with the structure can effectively excite the radiation stub in the foregoing example to perform radiation with a radiation feature of the current loop antenna.

In a possible design, the third feed portion is connected in series with at least one capacitor, including at least a fifth capacitor. The fifth capacitor is arranged in a center of a coupling part between the third feed portion and the radiation stub. Based on this solution, a possible feed stub configuration is provided. The feed stub with the structure can effectively excite the radiation stub in the foregoing example to perform radiation with a radiation feature of the current loop antenna.

In a possible design, the at least one capacitor connected in series with the third feed portion further includes: a sixth capacitor and a seventh capacitor respectively arranged on two sides of the fifth capacitor. Based on this solution, a possible feed stub configuration is provided. The feed stub with the structure can effectively excite the radiation stub in the foregoing example to perform radiation with a radiation feature of the current loop antenna.

In a possible design, different sizes of feed stubs correspond to different port impedances of the terminal antenna. Based on this solution, an example of a solution of adjusting a port impedance of the current loop antenna is provided. For example, the port impedance of the terminal antenna can be adjusted by adjusting the size of the feed stub.

In a possible design, the feed stub is used to excite the radiation stub to perform radiation with a radiation feature of a current loop antenna. The radiation feature of the current loop antenna is that there is a uniform magnetic field near the radiation stub when the terminal antenna is working. Based on this solution, an example of magnetic field distribution features of the current loop antenna is provided. It can be understood that, any antenna with the magnetic field distribution features should fall within a scope of the current loop antenna provided in the embodiments of this application.

In a possible design, when the terminal antenna is working, a current flow direction on the radiation stub is a first direction, a current flow direction on the reference ground is a second direction, and the first direction is opposite to the second direction. A current flow direction on the feed stub is the second direction. Based on this solution, an example of current distribution on the antenna during the coupled feeding is provided. For example, a current on the radiation stub can form a closed current loop with a current between the radiation stub and the reference ground through the capacitors at the two ends. During the coupled feeding, a direction of a current on the feed stub may be opposite to a direction of the current on the radiation stub.

According to a second aspect, an electronic device is provided. The electronic device is provided with at least one processor, a radio frequency module, and the terminal antenna according to the first aspect and any possible design of the first aspect, such as a current loop antenna based on coupled feeding. During signal transmission or reception, the electronic device transmits or receives signals through the radio frequency module and the terminal antenna.

It should be understood that the technical features of the technical solution provided in the second aspect above can all correspond to the terminal antenna provided in the first aspect and any possible design of the first aspect, and therefore, similar beneficial effects can be achieved. Details are not described herein again.

DETAILED DESCRIPTION OF ILLUSTRATIVE EMBODIMENTS

One or more antennas may be provided in an electronic device to implement a wireless communication function thereof.

Generally, antennas in the electronic device may be in various forms. For example, the antenna in the electronic device may be in a form of a monopole (monopole) or a dipole (dipole), or in other forms.

For example, an inverted-L antenna (The Inverted-L Antenna, ILA) is used as an example. The ILA antenna may be an implementation of a monopole antenna. When the ILA antenna is working, at least one resonance may be obtained through excitation in a corresponding operating band based on a size of a radiator of the ILA antenna. A length of the radiator of the ILA antenna may correspond to ¼ of a wavelength corresponding to the operating band. In other words, the ILA antenna can achieve coverage in the operating band by working at the ¼ wavelength.

Figure 1:
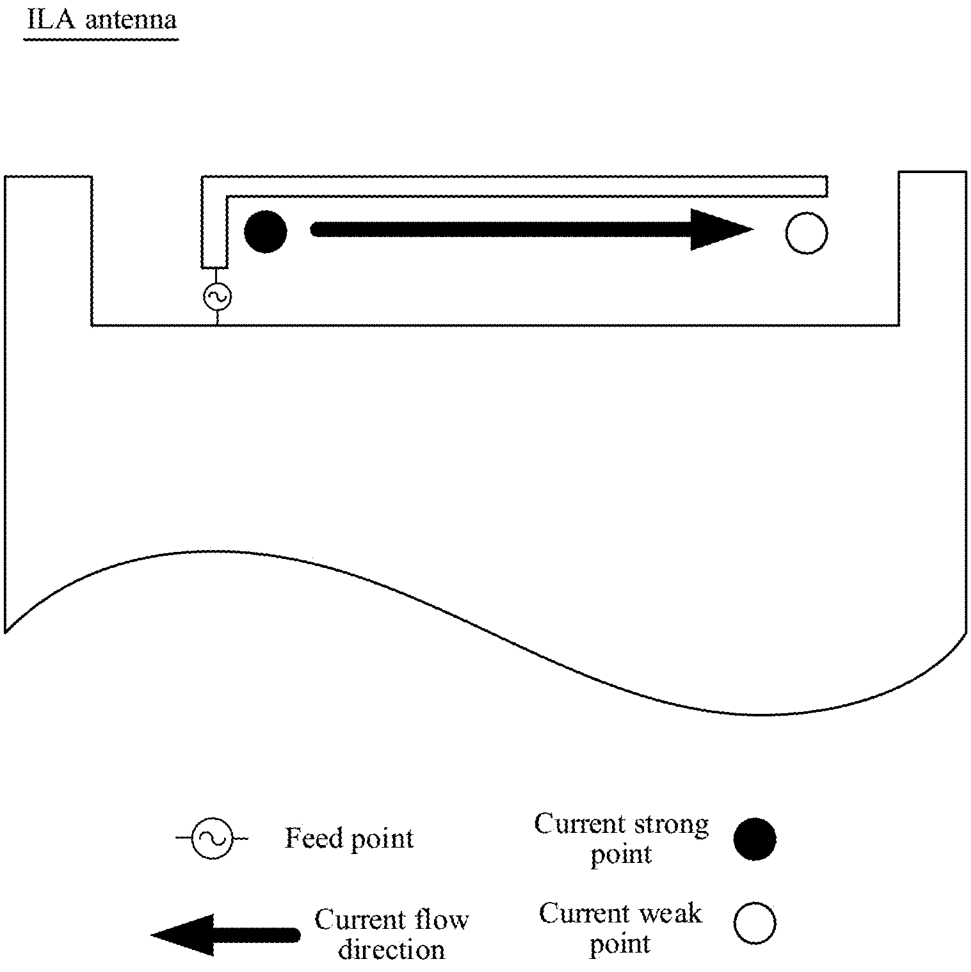
FIG. 1 is a schematic current diagram of an ILA antenna.

FIG. 1 is a schematic diagram of electric field distribution of an ILA antenna. It can be seen that current strong points and current weak points are distributed on a radiator of the ILA antenna. At the current strong point, an electric field is relatively weak and a magnetic field is relatively strong. Correspondingly, at the current weak point, the electric field is relatively strong and the magnetic field is relatively weak. Due to a potential difference between the current strong point and the current weak point, a current shown in FIG. 1 may be distributed on the ILA antenna. Generally, that a feed point is provided at one end of the radiator of the ILA antenna is used as an example. The end at which the feed point is located of the radiator is a current strong point, and the other end different from the feed point is a current weak point.

Figure 2:
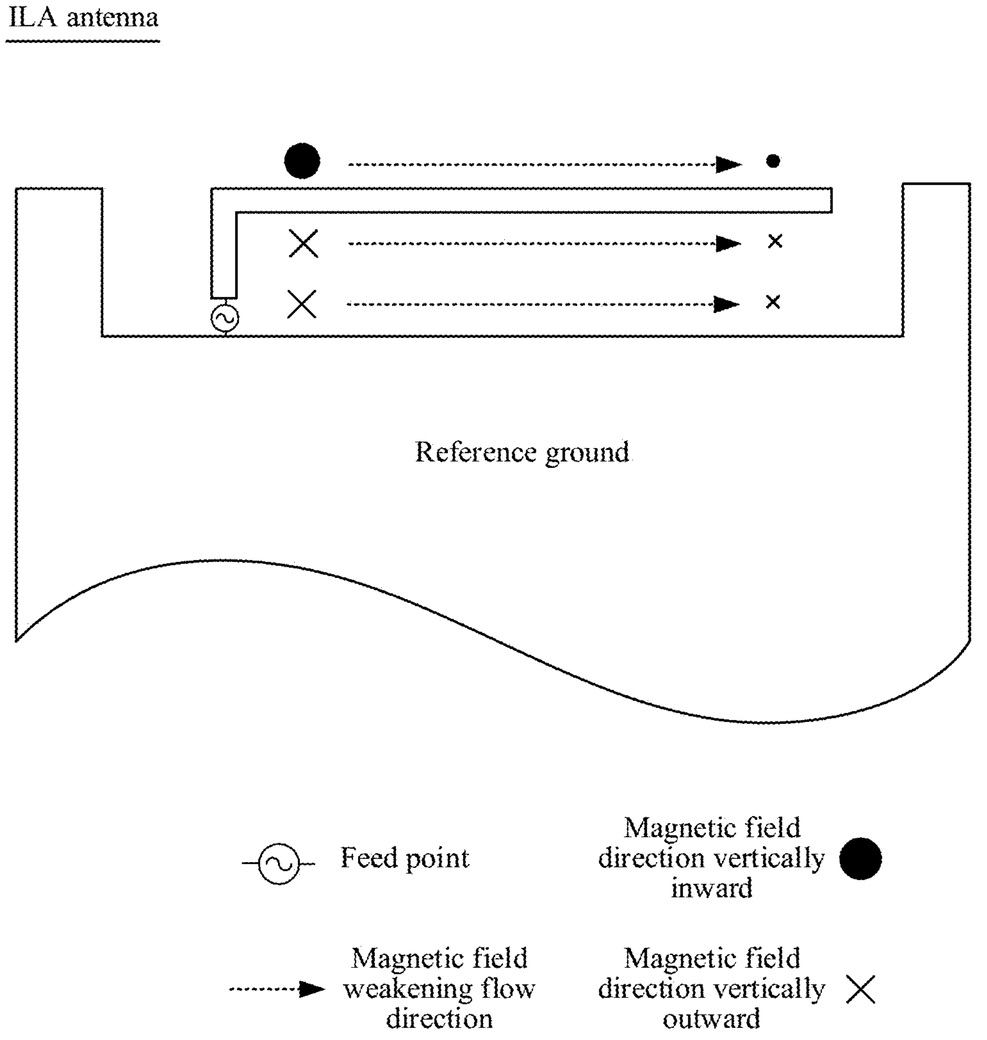
FIG. 2 is a schematic magnetic field diagram of an ILA antenna.

Based on the current distribution shown in FIG. 1, FIG. 2 shows a distribution status of a magnetic field in a working process of the ILA antenna. It can be seen that the magnetic field near the end of the radiator close to the feed point is relatively strong, while the magnetic field near the corresponding end away from the feed point is relatively weak.

Combining the descriptions of FIG. 1 and FIG. 2, it can be understood that, when a typical antenna (for example, a monopole) is working, currents of different intensities can be excited at different positions on a radiator of the antenna, so that the antenna works in a corresponding mode, for example, in a ¼-wavelength mode shown in FIG. 1, to obtain a resonance of a corresponding frequency band to cover an operating band, thereby achieving transmission and reception of wireless signals in the operating band. When currents of different intensities are distributed on the radiator of the antenna, electric fields/magnetic fields distributed in a space near the antenna are not uniform.

Different from the foregoing typical antenna, a current loop antenna, as a new antenna form, uses a structure similar to that of the typical antenna, so that a uniformly distributed magnetic field can be generated under excitation near the radiator of the antenna, thereby generating a resonance to cover the operating band. A form of excitation of the current loop antenna is different from that of excitation of a conventional antenna such as the ¼-wavelength mode, and is simpler to implement and therefore less demanding on an environment. In the context of decreasing space reserved for antennas in an electronic device, the current loop antenna has become a very competitive form of antenna.

For example, a current loop ILA antenna is used as an example. A feed point can be connected to one end of the radiator of the typical antenna. Different from a typical ILA antenna, a radiator of the antenna can be grounded through a capacitor at an end away from the feed point. In this way, an effect of exciting a uniform magnetic field near the ILA antenna can be achieved. That is, a radiation effect of the current loop ILA antenna is achieved.

Figure 3:
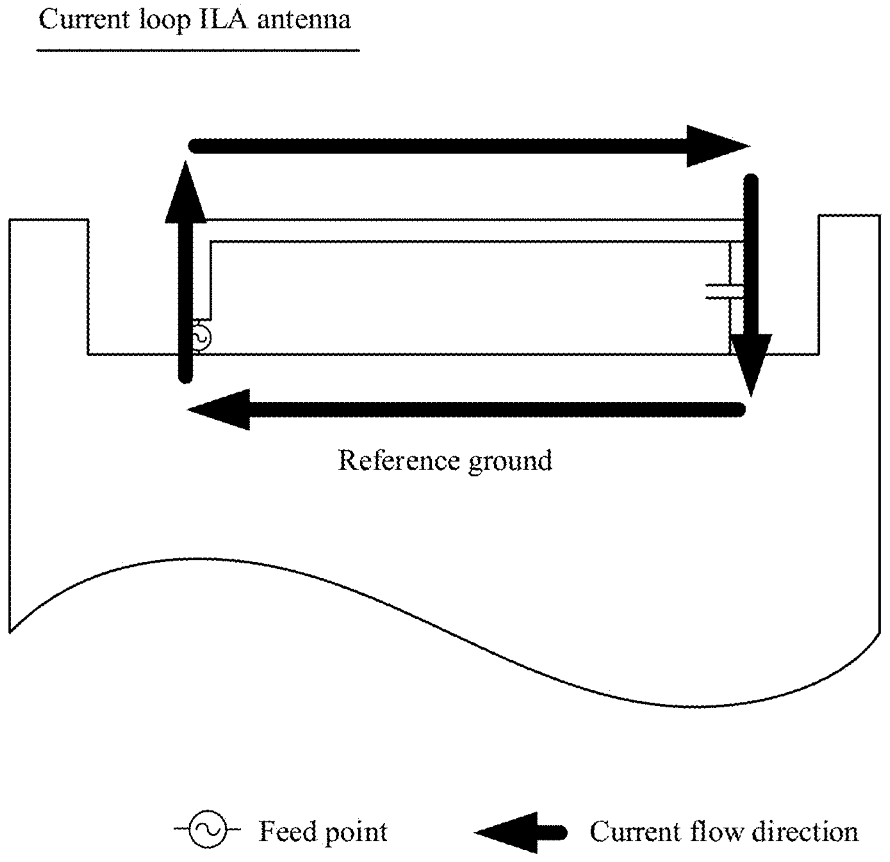
FIG. 3 is a schematic current diagram of a current loop ILA antenna.
Figure 4:
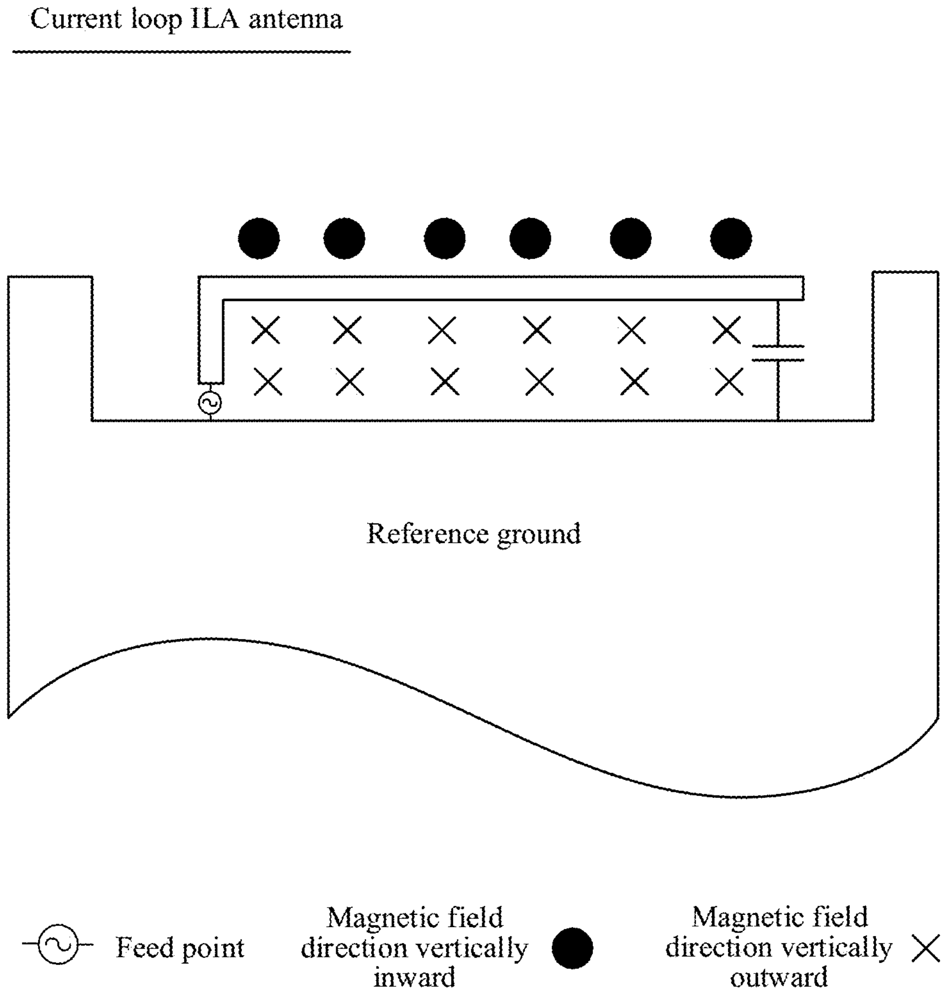
FIG. 4 is a schematic magnetic field diagram of a current loop ILA antenna.

FIG. 3 shows a current distribution status of a current loop ILA antenna. As shown in FIG. 3, on the current loop ILA antenna, a current on an antenna radiator may form a closed current loop with a current on a nearby reference ground (such as a current on a side of the reference ground close to the antenna), thereby forming a feature of a "current loop". FIG. 4 shows a distribution status of a magnetic field near the current loop ILA antenna. It can be seen that a uniform magnetic field distribution is formed near the antenna radiator. In this embodiment of this application, the uniform magnetic field distribution may mean that magnetic fields in a space that are generated due to antenna radiation have close or same strength at positions having a same distance from the radiator of the current loop antenna.

It should be understood that FIG. 3 and FIG. 4 show only a schematic structure and a working status of the current loop antenna based on the ILA antenna. In some other scenarios, based on currently commonly used antennas, such as other forms of monopole antennas, dipole antennas, slot antennas, or left-handed antennas, the antenna can be caused to have a radiation feature of the current loop antenna through simple structural processing.

A person skilled in the art should understand that, in the working process of the antenna, the setting of feeding is very important to the configuration and normal operation of the antenna. The setting of the feeding may include a form of the feeding and a position of the feeding.

The form of the feeding is used as an example. In different scenarios, the form of the feeding may include direct feeding, coupled feeding, and other forms. When direct feeding is to be used to feed the antenna, this can be achieved by using a feed part. One end of the feed part may be coupled to a microstrip connected to a radio frequency end for sending/receiving signals. The other end of the feed part may be coupled to the antenna radiator. In this way, through the feed part, a signal from the radio frequency end can be transmitted to the antenna radiator for radiation, or a signal received by the antenna can be transmitted to the radio frequency end for processing. In some implementations, the feed part may be rigidly connected to the antenna radiator through a component such as a conductive elastic piece or a pogo pin. In some other implementations, a function of the feed part may further be implementing electrical connection of an electrical signal between the microstrip and the antenna radiator through welding and other processes.

It can be seen that regardless of a specific implementation of direct feeding, sufficient space needs to be reserved between the microstrip and the antenna radiator for arranging the feed part. In addition, in order to perform feeding well, there is a high requirement on the arrangement of the feed part. In contrast, coupled feeding can achieve excitation of the current on the antenna radiator in a form of electric field coupling/magnetic field coupling. Therefore, there is no need for a physical component (such as the feed part) to be directly coupled to the antenna radiator. Therefore, when the space does not allow the arrangement of the feed part directly coupled to the antenna radiator, the antenna can still be excited to work.

In the foregoing descriptions, feed parts (the feed points shown in the figures) are provided in all of FIG. 1 to FIG. 4 to achieve the direct feeding to the antenna. However, currently, there is no favorable technical solution that can excite the current loop antenna to work through coupled feeding. Therefore, use of the current loop antenna is limited.

To resolve the foregoing problem, a coupled feeding mechanism provided in an embodiment of this application can effectively excite an antenna radiator to perform radiation with the radiation feature of the current loop antenna in different radiator scenarios, such as exciting the antenna radiator to generate a uniform magnetic field for radiation. In this way, the coupled feeding of the current loop antenna is achieved.

It should be noted that a coupled feeding solution provided in an embodiment of this application can be applied to different current loop antennas, for example, a current loop monopole antenna based on a monopole antenna (such as a current loop ILA antenna), a current loop dipole antenna based on a dipole antenna, a current loop left-handed antenna based on a left-handed antenna, or a current loop slot antenna based on a slot (slot) antenna.

The coupled feeding solution provided in this embodiment of this application and specific usage thereof in different current loop antennas are described below in detail with reference to instances and the accompanying drawings.

An environment for arrangement of the current loop antenna to which the coupled feeding solution provided in this embodiment of this application is applied is first described.

The current loop antenna involved in the embodiments of this application may be applied to an electronic device of a user, for supporting a wireless communication function of the electronic device. For example, the electronic device may be a portable mobile device such as a mobile phone, a tablet computer, a personal digital assistant (personal digital assistant, PDA), an augmented reality (augmented reality, AR)\virtual reality (virtual reality, VR) device, and a media player, or the electronic device may be a wearable electronic device such as a smartwatch. A specific form of the device is not specially limited in the embodiments of this application.

Figure 5:
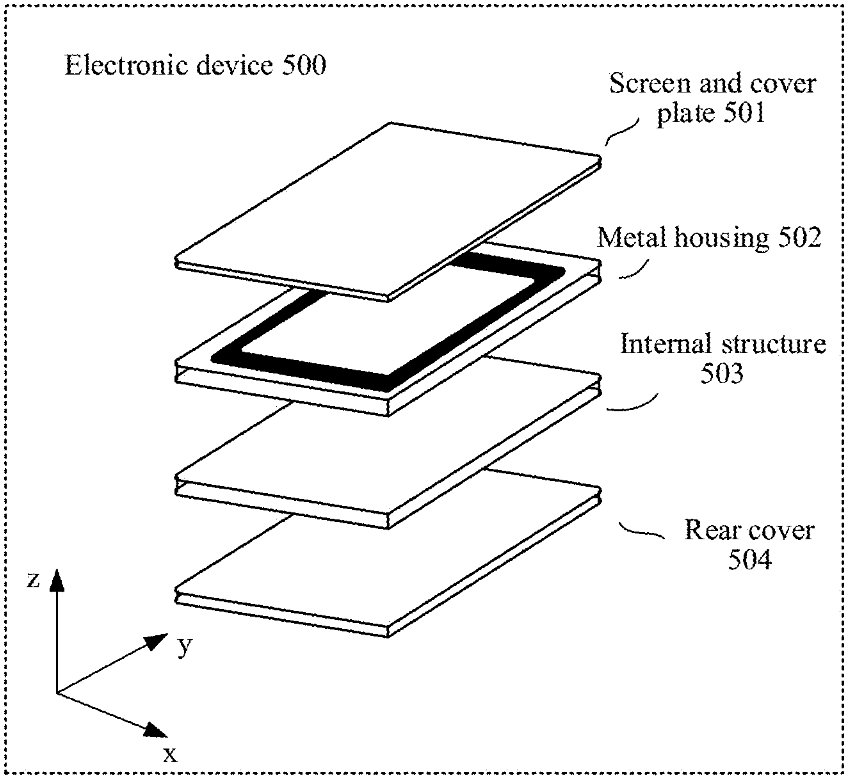
FIG. 5 is a schematic composition diagram of an electronic device according to an embodiment of this application.

FIG. 5 is a schematic structural diagram of an electronic device 500 according to an embodiment of this application. As shown in FIG. 5, the electronic device 500 provided in this embodiment of this application can be provided with a screen and cover plate 501, a metal housing 502, an internal structure 503, and a rear cover 504 in sequence along a z-axis from top to bottom.

The screen and cover plate 501 may be configured to implement a display function of the electronic device. The metal housing 502 can serve as a main body frame of the electronic device 500 to provide rigid support for the electronic device 500. The internal structure 503 may include a collection of electronic components and mechanical components for implementing various functions of the electronic device 500. For example, the internal structure 503 may include a shielding case, a screw, a reinforcing rib, and the like. The rear cover 504 may be a back appearance surface of the electronic device 500. The rear cover 504 may include a glass material, a ceramic material, plastics, and the like in different implementations.

A current loop antenna solution provided in the embodiments of this application can be applied in the electronic device 500 shown in FIG. 5, for supporting a wireless communication function of the electronic device 500. For example, the current loop antenna may be provided on the metal housing 502 of the electronic device 500. For another example, the current loop antenna may be provided on the rear cover 504 of the electronic device 500, and so on.

Figure 6:
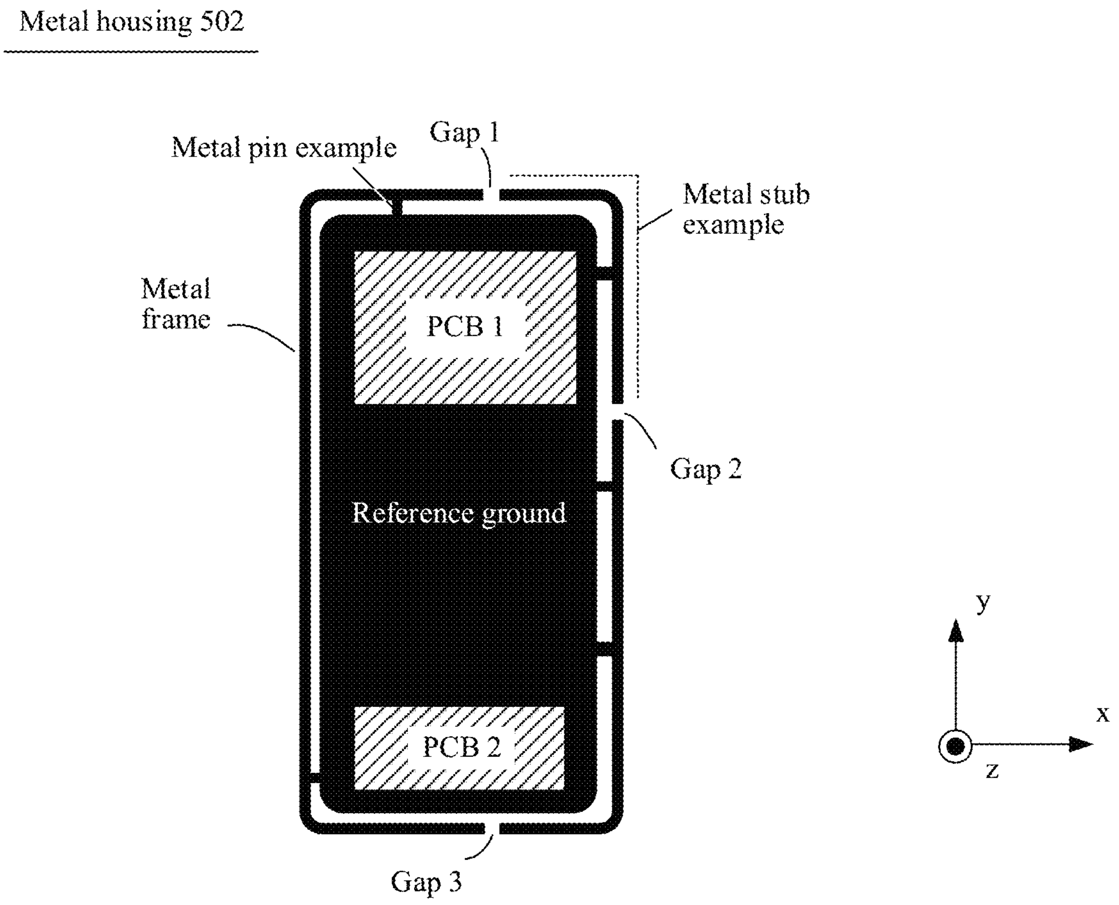
FIG. 6 is a schematic composition diagram of an electronic device according to an embodiment of this application.

In an example, the metal housing 502 has a metal frame architecture, and FIG. 6 shows a schematic composition of the metal housing 502. In this example, the metal housing may be made of a metallic material, such as aluminum alloy. As shown in FIG. 6, a reference ground may be provided on the metal housing. The reference ground may be a complete metallic material with a relatively large area, for providing most of the rigid support and providing a zero potential reference for each electronic component. In the example shown in FIG. 6, a metal frame may also be provided at the periphery of the reference ground. The metal frame may be a complete closed metal frame, or may be a metal frame interrupted by one or more gaps shown in FIG. 6. For example, in the example shown in FIG. 6, a gap 1, a gap 2, and a gap 3 may be provided at different positions on the metal frame. These gaps can interrupt the metal frame, so that independent metal stubs are obtained. In some embodiments, some or all of the metal stubs may be used as radiation stubs of the antenna, thereby implementing structural reuse in a process of arranging the antenna, and reducing difficulty of arranging the antenna. When the metal stubs are used as the radiation stubs of the antenna, positions of gaps correspondingly provided at one or two ends of the metal stub can be flexibly selected based on the arrangement of the antenna.

In the example shown in FIG. 6, one or more metal pins may also be provided on the metal frame. In some examples, the metal pin may be provided with a screw hole, for fastening another mechanical part through a screw. In some other examples, the metal pin may be coupled to a feed point, so that the antenna can be fed through the metal pin when a metal stub connected to the metal pin serves as the radiation stub of the antenna. In some other examples, the metal pin may alternatively be coupled to another electronic component to implement a corresponding electrical connection function.

In this example, an illustration of arrangement of a printed circuit board (printed circuit board, PCB) on the metal housing is also shown. That a main board (main board) and a sub board (sub board) are separately designed is used as an example. In some other examples, the main board and the sub board may alternatively be connected, such as an L-shaped PCB design. In some embodiments of this application, the main board (for example, a PCB 1) may be used to carry electronic components for implementing various functions of the electronic device 500, such as a processor, a memory, and a radio frequency module. The sub board (for example, a PCB 2) may also be used to carry electronic components, such as a universal serial bus (Universal Serial Bus, USB) interface, a related circuit, and a speaker box (speaker box). For another example, the sub board may also be used to carry a radio frequency circuit or the like corresponding to an antenna arranged at the bottom (that is, a part in a negative direction of a y-axis of the electronic device).

The current loop antennas based on coupled feeding provided in the embodiments of this application all can be applied to an electronic device having the composition shown in FIG. 5 or FIG. 6.

The electronic device 500 in the foregoing example is only a possible composition. In some other embodiments of this application, the electronic device 500 may also have other compositions. For example, to implement the wireless communication function of the electronic device 500, a communication module shown in FIG. 7 may be provided in the electronic device. The communication module may include an antenna, a radio frequency module that performs signal interaction with the antenna, and a processor that performs signal interaction with the radio frequency module. For example, the signal interaction between the radio frequency module and the antenna may be interaction of analog signals. The signal interaction between the radio frequency module and the processor may be interaction of analog signals or digital signals. In some implementations, the processor may be a baseband processor.

Figure 7:
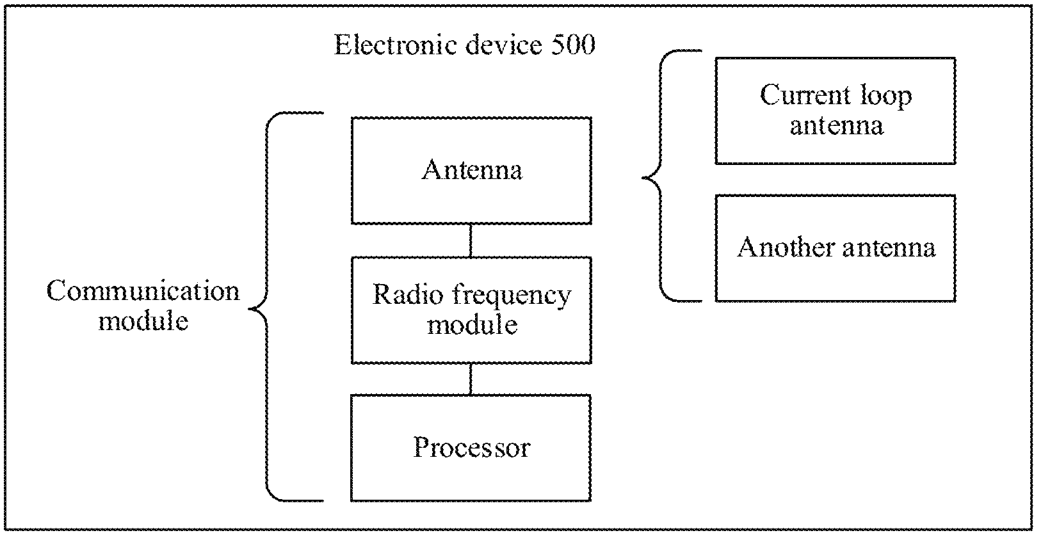
FIG. 7 is a schematic diagram of reference coordinates according to an embodiment of this application.

As shown in FIG. 7, in this example, the antenna may be in different forms, for example, may be a current loop antenna. In a possible implementation, the current loop antenna may be fed through coupled feeding.

For ease of description, in each of the following examples, that the structure is provided corresponding to a rear view of the electronic device is used as an example. For example, in the rear view of the electronic device, a rear camera module may be located in an upper left corner of the electronic device. With the rear camera module as a reference, a horizontal direction away from the rear camera module may be a positive direction of an x-axis, corresponding to a rightward direction. Oppositely, a horizontal direction close to the rear camera module may be a negative direction of the x-axis, corresponding to a leftward direction. The rear camera module may be provided in a part of the electronic device in a positive direction of the y-axis, corresponding to an upward direction. Oppositely, a direction opposite to the positive direction of the y-axis is the negative direction of the y-axis, corresponding to a downward direction. Based on the foregoing settings of the x-axis and the y-axis, a positive direction of the z-axis is a direction aimed at the front (that is, a display screen) along the back of the electronic device, corresponding to an inward direction. Oppositely, a negative direction of the z-axis is a direction aimed at the back of the electronic device along the front of the electronic device, corresponding to an outward direction. In all the following descriptions, a coordinate system setting shown in FIG. 7 is used for description. It should be noted that the coordinate system setting is used only for ease of description, and does not constitute any limitation on the coupled feeding solution provided in the embodiments of this application.

A coupled feeding form provided in the embodiments of this application is described below with reference to FIG. 8 and FIG. 9.

Figure 8:
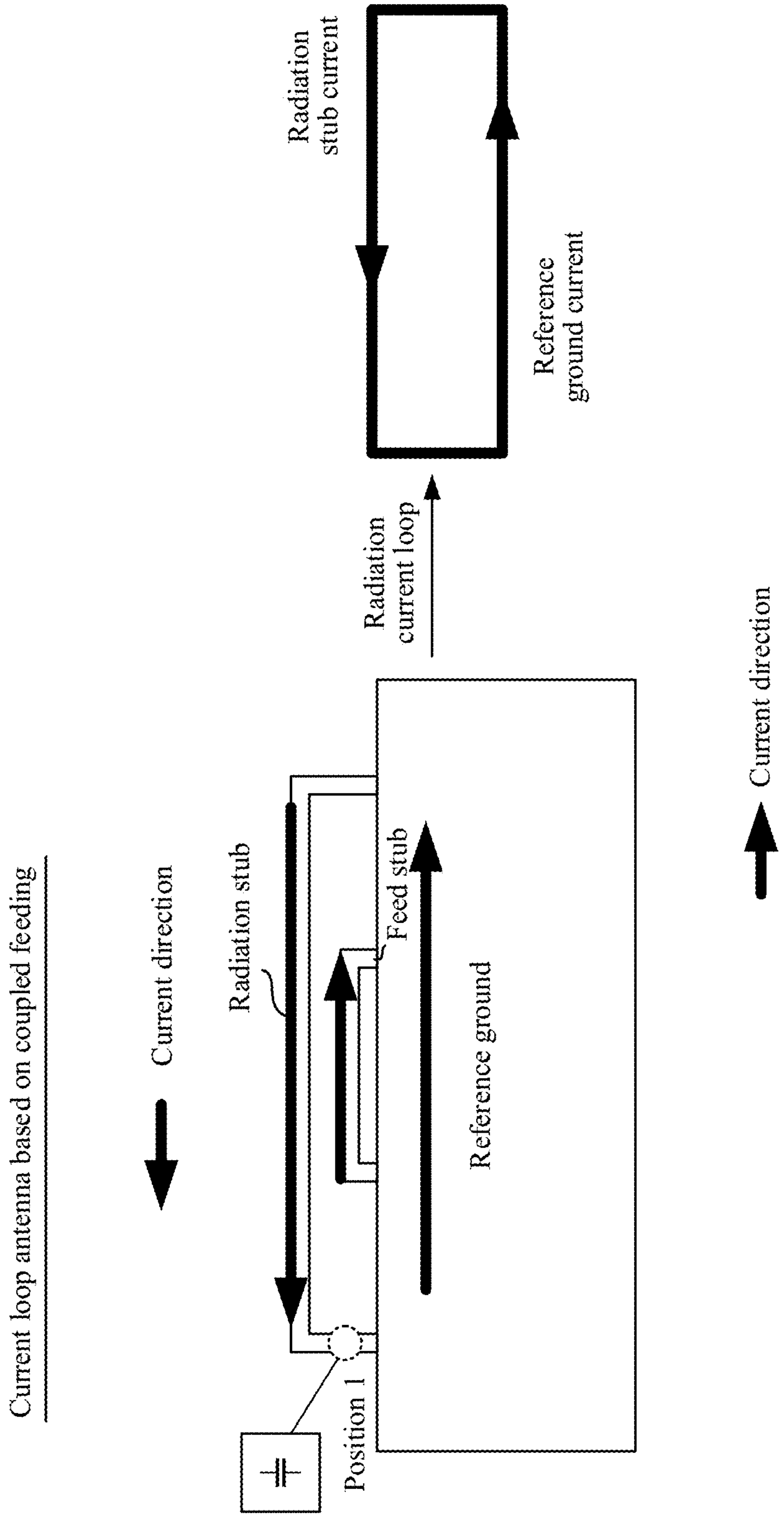
FIG. 8 is a schematic current diagram of a current loop antenna according to an embodiment of this application.

FIG. 8 shows a current status on a current loop antenna during coupled feeding. It can be seen that a current loop antenna based on coupled feeding provided in an embodiment of this application may include a radiation stub and a feed stub. The radiation stub is not electrically connected to the feed stub. A feed point is provided on the feed stub. The feed stub couples energy to the radiation stub through electric field/magnetic field coupling, to excite the radiation stub to perform radiation. The radiation stub may be a radiator capable of current loop radiation.

When the current loop antenna based on coupled feeding works, a direction of a current on the radiation stub may be opposite to a direction of a current on a ground (for example, the ground is close to a side of the current loop antenna) serving as a reference ground. In this way, a current loop consisting of the radiation stub and the ground is formed, and radiation with a radiation feature of the current loop antenna is performed. In this embodiment of this application, in order to obtain the foregoing current loop through excitation, at a same moment, the current on the feed stub may be in a direction opposite to the current on the radiation stub but the same as a current on the reference ground. The feed stub with this feature can excite the radiation of the current loop antenna, without the need to directly feed a signal to the radiation stub, thereby implementing the radiation of the current loop antenna based on coupled feeding.

It should be noted that in different embodiments, the foregoing effect can be achieved by arranging a capacitor connected in series and/or in parallel with the radiation stub. For example, with reference to FIG. 8, a capacitor may be arranged at a position 1. Positions and a quantity of capacitors are to be defined in detail in subsequent examples with reference to actual scenarios, and details are not described herein again.

Figure 9:
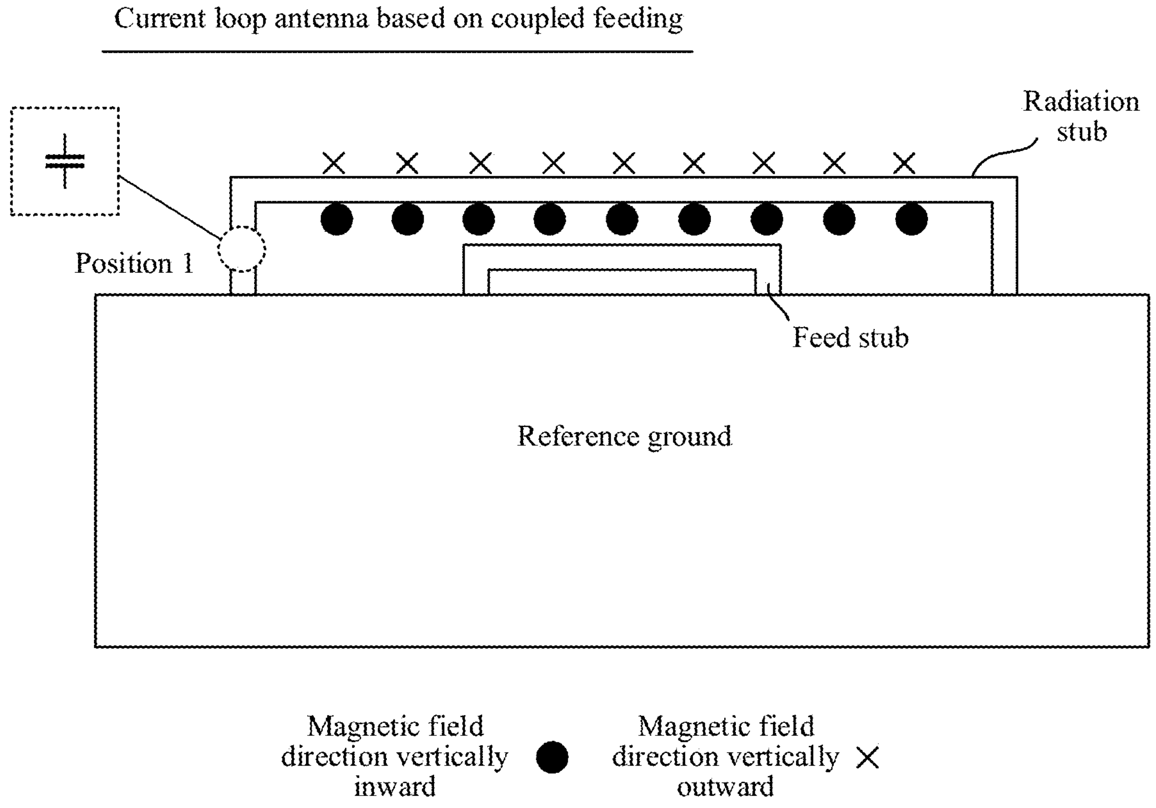
FIG. 9 is a schematic magnetic field diagram of a current loop antenna according to an embodiment of this application.

FIG. 9 shows a magnetic field distribution status when an antenna with a current feature shown in FIG. 8 is working. It can be seen that a uniform magnetic field is generated near the radiation stub, and therefore, this conforms to the radiation feature of the current loop antenna. It can be understood that, the radiation stub of the current loop antenna provided in the embodiments of this application may be provided with a capacitor (for example, to be grounded through the capacitor), so that based on an energy storage feature of the capacitor for electric energy, a difference in current distribution at different positions on the radiation stub at a same time is not extremely large, that is, a uniform current is generated. In this way, based on the uniform current on the radiation stub, similarly, a uniform current can also be generated on the reference ground, and a direction of the current may be opposite to a direction of the current on the radiation stub, so that a closed uniform current loop is formed. In this way, a uniformly distributed magnetic field can be obtained near the radiation stub (for example, in a region between the radiation stub and the reference ground). In this way, it is determined that the radiation of the current loop antenna can be successfully excited through coupled feeding by the feed stub shown in FIG. 7.

It should be noted that the compositions shown in FIG. 8 and FIG. 9 are intended to describe a current distribution feature that needs to be satisfied by the coupled feeding solution provided in the embodiments of this application. The illustrations of FIG. 8 and FIG. 9 do not constitute any limitation on the structures of the radiation stub and/or the feed stub.

Figure 13A:
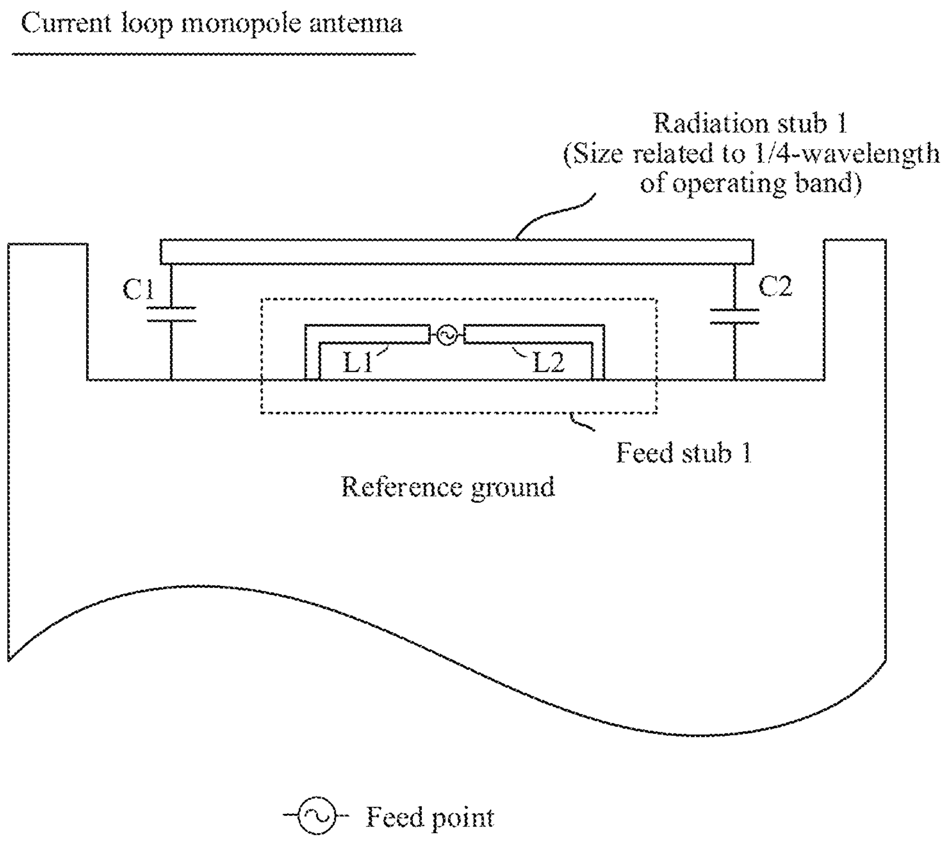
FIG. 13A is a schematic composition diagram of a current loop monopole antenna according to an embodiment of this application.

For example, in terms of the radiation stub of the current loop antenna in the embodiments of this application, in a specific design, at least one capacitor (for example, a first capacitor C1 and/or a second capacitor C2) may be provided at an end, as shown in FIG. 13A. This end may be an end different from a feeder end. For example, when one end of the radiation stub is coupled to a feed point, the other end of the radiation stub may be grounded by arranging the first capacitor C1 or C2. For another example, when a feed point is provided at a middle position of the radiation stub, neither of the two endpoints of the radiation stub is coupled to the feed point. In this case, the two endpoints of the radiation stub may be grounded through the first capacitor C1 and C2, respectively.

The magnitude of the capacitor (for example, C1 and C2) arranged at the end may be determined based on an operating band of the current loop antenna. For example, Table 1 below shows an example of value ranges of C1 and C2 based on different operating bands.

TABLE 1

| Operating band | End capacitor range |
|---|---|
| Low band | [1.5 pF, 15 pF] |
| Mid band | [0.5 pF, 15 pF] |
| High band | [1.2 pF, 12 pF] |

In the example of Table 1, it can be seen that when the operating band of the current loop antenna is a low band (Low Band, LB), the magnitude of the capacitors C1 and C2 provided at the ends of the radiation stub may fall within [1.5 pF, 15 pF]. When the operating band of the current loop antenna is a mid band (Mid Band, MB), the magnitude of the capacitors C1 and C2 provided at the ends of the radiation stub may fall within [0.5 pF, 15 pF]. When the operating band of the current loop antenna is a high band (High Band, HB), the magnitude of the capacitors C1 and C2 provided at the ends of the radiation stub may fall within [1.2 pF, 12 pF].

The LB, MB, and HB are low, mid, and high bands, including, but not limited to, a Bluetooth (Bluetooth, BT) communication technology, a Global Positioning System (global positioning system, GPS) communication technology, a wireless fidelity (wireless fidelity, Wi-Fi) communication technology, a communication technology of Global System for Mobile Communications (global system for mobile communications, GSM), a wideband Code Division Multiple Address (wideband code division multiple access, WCDMA) communication technology, a Long Term Evolution (long term evolution, LTE) communication technology, a 5G communication technology, a SUB-6G communication technology, and other communication technologies in the future. The LB band may cover 450 MHz to 1 GHz, the MB band may cover 1 GHz to 3 GHz, and the HB band may cover 3 GHz to 10 GHz, including 5G NR, Wi-Fi 6E, UWB, and other common frequency bands.

In the current loop antenna provided in the embodiments of this application, the radiation stub may be connected in series with one or more third capacitors C3, so that a magnetic field obtained through excitation can be more uniformly distributed, thereby improving radiation efficiency of the antenna. For example, Table 2 below shows a corresponding example of the operating band of the antenna and ranges of a capacitance value of C3 connected in series with the radiation stub.

TABLE 2

| Operating band | Range of capacitor C3 connected in series with stub |
|---|---|
| Low band | [2 pF, 25 pF] |
| Mid band | [0.8 pF, 12 pF] |
| High band | [0.2 pF, 8 pF] |

Figure 22:
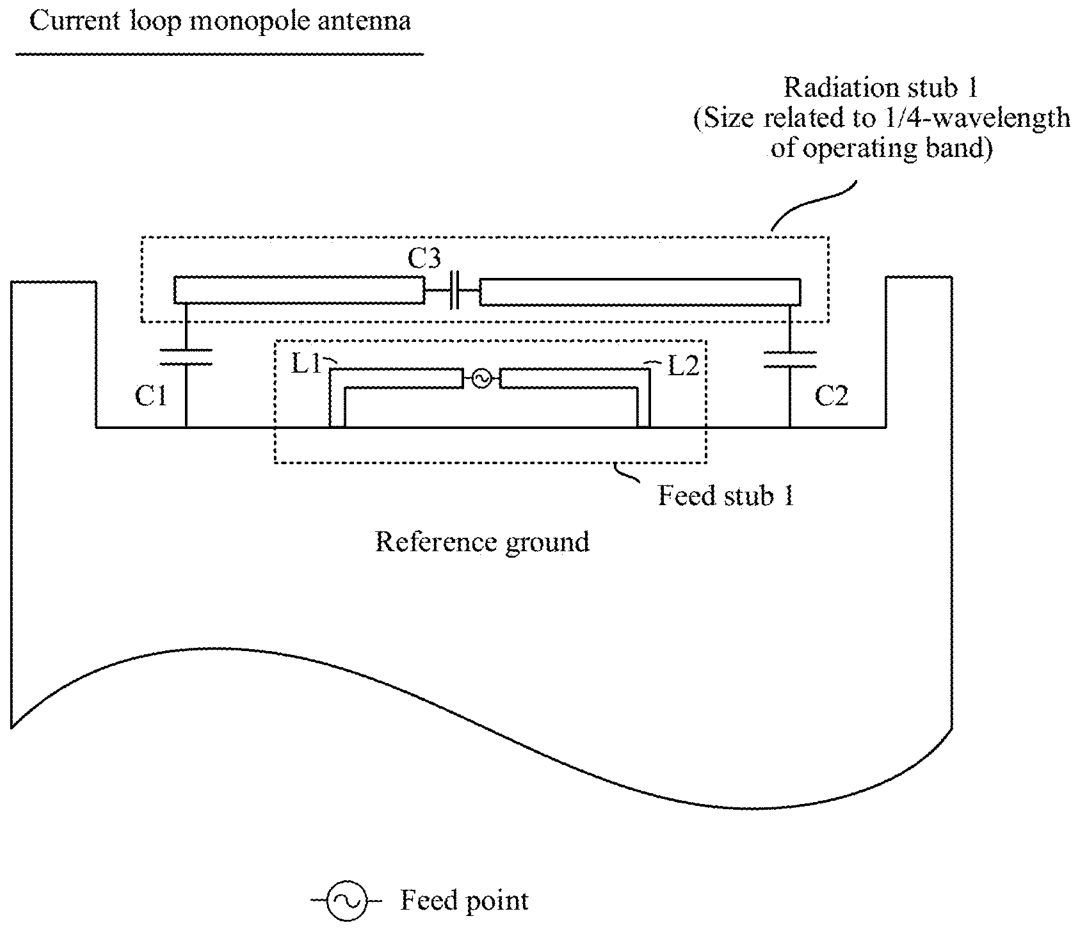
FIG. 22 is a schematic composition diagram of a current loop monopole antenna according to an embodiment of this application.

In the example of Table 2, it can be seen that when the operating band of the current loop antenna is a low band (Low Band, LB), the magnitude of the capacitor C3 connected in series with the radiation stub may fall within [2 pF, 25 pF], as shown in FIG. 22. When the operating band of the current loop antenna is a mid band (Mid Band, MB), the magnitude of the capacitor C3 connected in series with the radiation stub may fall within [0.8 pF, 12 pF]. When the operating band of the current loop antenna is a high band (High Band, HB), the magnitude of the capacitor C3 connected in series with the radiation stub may fall within [0.2 pF, 8 pF].

It should be noted that the example ranges of the capacitors in Table 1 Table 2 above are merely examples. In different environments, the magnitude of the capacitors may be flexibly set.

The current loop antenna provided in the embodiments of this application can be excited through direct feeding and can also be excited through coupled feeding. Possible implementations of the feed stub in the case of coupled feeding provided in the embodiments of this application are exemplified below with reference to FIG. 10 and FIG. 11. When applied to the antenna shown in FIG. 8 or FIG. 9, feed stubs with compositions shown in FIG. 10 and FIG. 11 all conform to the current feature shown in FIG. 8, and can achieve the coupled feeding of the current loop antenna. For ease of description, in the illustrations of FIG. 10 and FIG. 11, only the compositions of the feed stubs are shown, and a position of the reference ground is shown as a reference. In an actual use, the composition of any feed stub shown in FIG. 10 or FIG. 11 may be applied to the coupled feeding scenario of the current loop antenna shown in FIG. 8 or FIG. 9.

Figure 10:
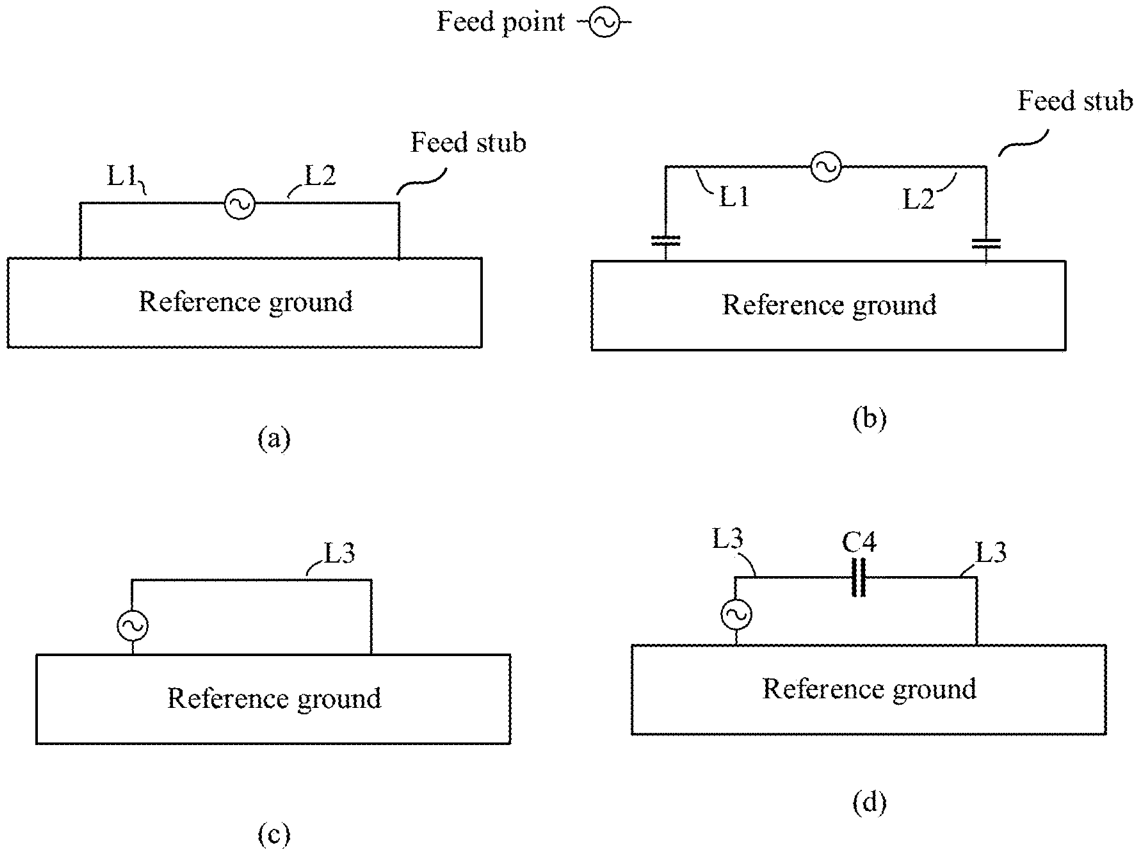
FIG. 10 is a schematic structural diagram of a feed stub for coupled feeding of a current loop antenna according to an embodiment of this application.

Refer to FIG. 10, which shows four possible compositions of feed stubs according to an embodiment of this application.

As shown in (a) in FIG. 10, in this example, a feed stub may include two sub stubs, for example, a first feed portion L1 and a second feed portion L2. L1 and L2 each have one end coupled to the reference ground. The other ends of L1 and L2 different from the ground ends are respectively coupled to positive and negative electrodes of a feed point. In different examples, on two sides of the feed point, lengths of L1 and L2 may be different. For example, when the lengths of L1 and L2 are the same, L1 and L2 may be distributed in a left-right mirror image manner with respect to the feed point, that is, L1 and L2 are in an axisymmetrical structure with respect to a vertical axis of the feed point. For another example, when the lengths of L1 and L2 are different, the feed point may alternatively be located at a position on the right or left of the feed stub. It should be noted that in an implementation of this example, regardless of whether the feed point is provided in a left part or a right part of the radiation stub, it can be seen that the positive electrode and the negative electrode of the feed point are respectively coupled to radiators. For example, one end is coupled to L1 and the other end is coupled to L2.

As shown in (b) in FIG. 10, another possible implementation of a feed stub is provided. In this example, similar to the solution shown in (a) in FIG. 10, a radiator of the feed stub may be segmented by a feed point into two parts, for example, a first feed portion L1 and a second feed portion L2. One ends of L1 and L2 are respectively coupled to positive and negative electrodes of the feed point. In other words, the feed point may be provided on a radiation stub (for example, a central position), and two ends of the feed point may be respectively coupled to one part of the radiation stub. The other ends of L1 and L2 may be grounded through capacitors, respectively. Similar to (a) in FIG. 10, a specific position of the feed point on the feed stub may be flexibly set, for example, in a left part of the feed stub, or in a right part of the feed stub, or in a middle part of the feed stub.

As shown in (c) in FIG. 10, a feed stub may include one radiator, for example, a third feed portion L3. One end of L3 may be coupled to a feed point. The other end of L3 may be coupled to the reference ground. Compared with the solution provided in the foregoing example, the solution provided in this example is simple to configure and easier to implement. In some embodiments, L3 may enclose a rectangle or an approximate rectangle with an edge of the reference ground. In a possible implementation, as shown in (c) in FIG. 10, a distance between the two ends of L3 may be equal to a long side of the rectangle. It should be noted that in an implementation of this example, the feed point may be provided at one end of L3. For example, as shown in (c) in FIG. 10, the feed point may be provided at the left end of L3. In other words, one end of the feed point may be coupled to the radiator L3, and the other end of the feed point may be coupled to a radio frequency signal line, without the need to be coupled to other radiators.

As shown in (d) in FIG. 10, a feed stub may include one radiator, for example, a third feed portion L3. One end of L3 may be coupled to a feed point, to implement feeding to a radiator through this end, that is, L3 may be provided at one end of the radiator L3. The other end of L3 may be coupled to the reference ground. In this example, different from the structure example of (c) in FIG. 10, L3 may be further connected in series with a capacitor (for example, a fourth capacitor). In different embodiments, a position of the fourth capacitor on L3 may be flexibly set. For example, in some implementations, the fourth capacitor may be provided in a left part of L3. In some implementations, the fourth capacitor may alternatively be provided in a right part of L3. In some implementations, as shown in (d) in FIG. 10, the fourth capacitor may alternatively be provided at a middle position of L3.

A feed stub with any composition shown in FIG. 10 can implement the current distribution shown in FIG. 8, to excite the radiation stub to perform radiation with a current loop radiation feature. It should be noted that in this embodiment of this application, the current loop radiation feature may mean that radiation with a uniform magnetic field feature can be generated around the radiator.

Figure 11:
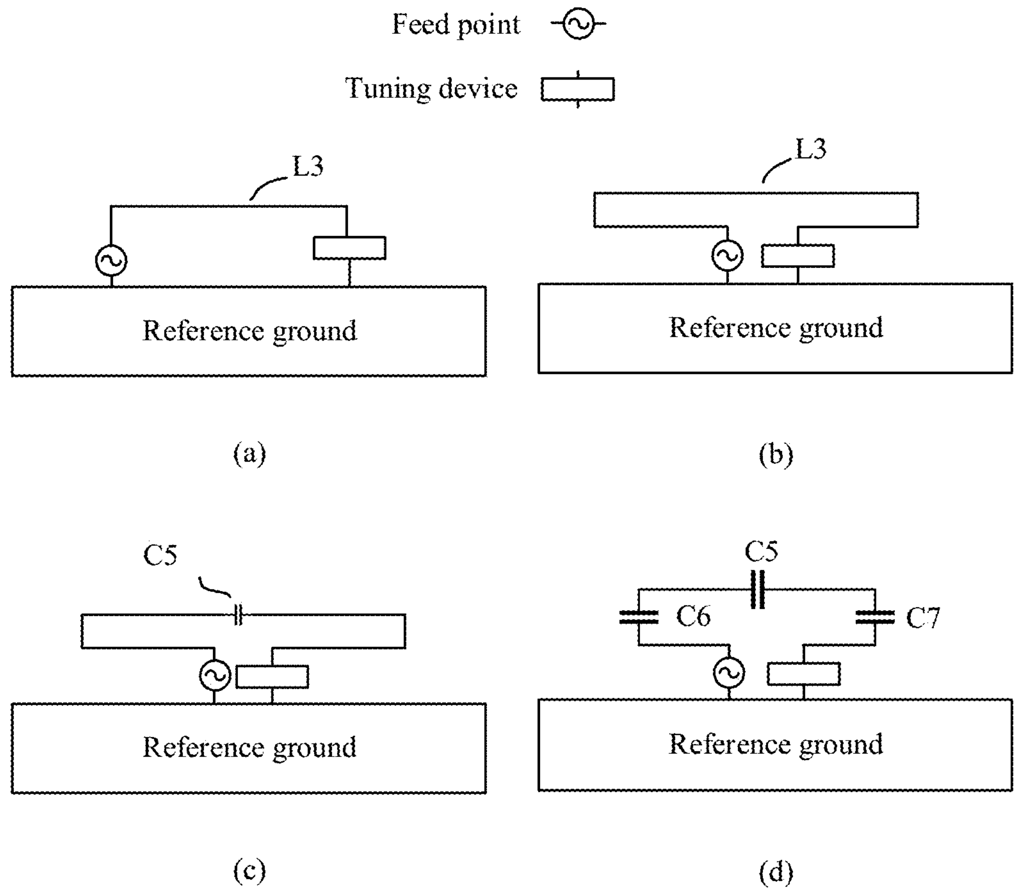
FIG. 11 is a schematic structural diagram of a feed stub for coupled feeding of a current loop antenna according to an embodiment of this application.

Refer to FIG. 11, which shows some other specific implementation examples of feed stubs according to an embodiment of this application.

For example, (a) in FIG. 11 shows another possible implementation of a feed stub provided in this embodiment of this application. This implementation may be evolved based on (c) in FIG. 10. As shown in (a) in FIG. 11, the feed stub in this example may also include one radiator, for example, a third feed portion L3. One end of L3 may be coupled to a feed point. The other end of L3 may be coupled to the reference ground through a tuning device. In other words, the feed point may be provided at an end of the radiator L3. The other end of the feed point may not be coupled to the radiator, but is directly connected to a radio frequency microstrip. The tuning device may include at least one of the following devices: a capacitor, an inductor, and a resistor. In this example, the feed point and the tuning device may be respectively located at two endpoints of L3. In some other implementations, the tuning device may alternatively be located at other positions on L3 than that of the feed point. It should be noted that in this example, L3 may enclose a rectangle or an approximate rectangle with an edge of the reference ground. In a possible implementation, as shown in (a) in FIG. 11, a distance between the two ends of L3 may be equal to a long side of the rectangle. In other words, the distance between the two ends of L3 may be equal to a projection length of L3 on the radiation stub.

(b) in FIG. 11 shows another possible implementation of a feed stub provided in this embodiment of this application. This example is similar to the composition shown in (a) in FIG. 11. The feed stub may also include one radiator, for example, a third feed portion L3. One end of L3 may be coupled to a feed point. The other end of L3 may be coupled to the reference ground through a tuning device. Different from the solution shown in (a) in FIG. 11, in this example, the distance between the two ends of L3 may be less than a projection length of L3 on the radiation stub. That is, a distance between the feed end and the ground end is shorter, closer to a form of a loop antenna.

(c) in FIG. 11 shows another possible implementation of a feed stub provided in this embodiment of this application. This example is similar to the composition shown in (b) in FIG. 11. The feed stub may also include one radiator, for example, a third feed portion L3. One end of L3 may be coupled to a feed point. The other end of L3 may be coupled to the reference ground through a tuning device. The distance between the two ends of L3 may be less than the projection length of L3 on the radiation stub. A difference lies in that in this example, L3 may be further connected in series with a capacitor, for example, a fifth capacitor C5. In different implementations, C5 may be located at different positions on L3. For example, as shown in (c) in FIG. 11, C5 may be provided at a horizontally central position of L3.

(d) in FIG. 11 shows another possible implementation of a feed stub provided in this embodiment of this application. This example is similar to the composition shown in (c) in FIG. 11. The feed stub may also include one radiator, for example, a third feed portion L3. One end of L3 may be coupled to a feed point. The other end of L3 may be coupled to the reference ground through a tuning device. The distance between the two ends of L3 may be less than the projection length of L3 on the radiation stub. A difference lies in that in this example, L3 may be further connected in series with more capacitors. For example, in addition to C5 connected in series with L3, a sixth capacitor C6 and a seventh capacitor C7 may be respectively connected in series on two sides of the C5.

Feed stubs with the various compositions shown in FIG. 10 and FIG. 11 may be matched to the coupled feeding of the current loop antenna shown in FIG. 8 or FIG. 9, to excite the radiation stub to perform radiation, and generate a uniform magnetic field, that is, to obtain an antenna with the radiation feature of the current loop antenna.

It should be noted that in a process of arranging the feed stub with the composition provided in the embodiments of this application, capacitive/inductive tuning of the current loop antenna can be achieved by adjusting the size of the radiator of the feed stub. For example, that the capacitive/inductive nature of the current loop antenna is identified by using a Smith (Smith) chart is used as an example. Increasing the size of the radiator of the feed stub can increase the inductive nature of the current loop antenna. This can be shown in the Smith chart as a case in which a circle enclosed by a chart curve becomes larger and approaches a short-circuit point. Correspondingly, reducing the size of the radiator of the feed stub can increase the capacitive nature of the current loop antenna. This can be shown in the Smith chart as a case in which the circle enclosed by the chart curve becomes smaller and approaches an open-circuit point. In this way, port matching of the current loop antenna in different scenarios can be achieved.

In addition, in the coupled feeding solution provided in the embodiments of this application, the position of the feed stub may alternatively be flexibly set. For example, refer to the example in FIG. 8. In this example, that the feed stub is located at a middle position between the radiation stub and the reference ground is used as an example. In some other implementations of this application, the feed stub may alternatively move left and right along an x-axis based on FIG. 8. This composition can excite the radiation of the current loop antenna, and a magnetic field generated by the current loop antenna is uniformly distributed. Therefore, the left and right movement of the feed stub does not have significant impact on the radiation of the current loop antenna. For example, the left and right movement of the feed stub does not have significant impact on resonant frequency and/or radiation performance (for example, radiation efficiency or system efficiency) of the current loop antenna. In other words, in the process of implementing the coupled feeding solution provided in the embodiments of this application, the position of the feed stub can be flexibly selected according to an actual scenario. It can be seen that because the position of the feed stub is not strictly limited, it is more conducive to the implementation of this solution.

Through the foregoing description, it should be understood by a person skilled in the art that, through the arrangement of the feed stub, during coupled feeding, the feed stub can be excited to have the current feature shown in FIG. 8, so that the current loop antenna on the radiation stub can be excited. FIG. 10 and FIG. 11 show a plurality of different implementations with the current feature shown in FIG. 8, which can be flexibly selected in specific applications. Certainly, the examples in FIG. 10 and FIG. 11 are examples only and are not exhaustive. Compositions of some other feed stubs can achieve the excitation of the current loop antenna of the radiation stub as long as they can generate the current feature shown in FIG. 8. In this case, the compositions should also fall within the protection scope of the embodiments of this application.

Figure 12A:
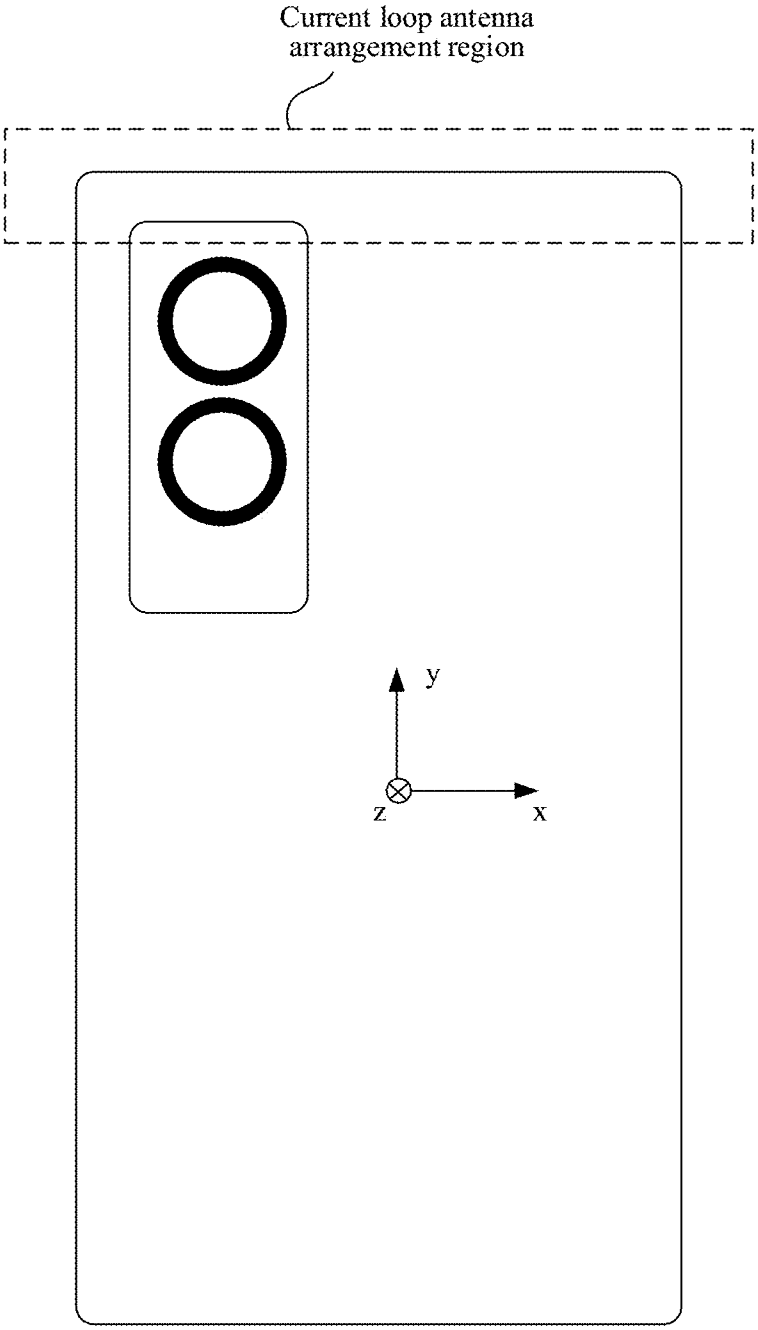
FIG. 12A is a schematic diagram of an arrangement position of a current loop antenna according to an embodiment of this application.

In an actual implementation process, the current loop antenna provided in the embodiments of this application can be applied to an electronic device including a mobile phone. For example, that the current loop antenna is applied to a mobile phone is used as an example. Referring to FIG. 12A, the current loop antenna provided in the embodiments of this application can be provided at an edge of the mobile phone, to reuse a metal frame of the mobile phone, or provide favorable radiation performance based on a good radiation environment provided at the edge of the mobile phone. For example, in some embodiments, as shown in FIG. 12A, the current loop antenna may be provided on top of the mobile phone. In some other embodiments of this application, the current loop antenna may alternatively be provided on another side of the mobile phone, such as a left side, a right side, or the bottom, to implement a radiation function thereof.

The antenna configuration and radiation feature in actual application scenarios of different current loop antennas are exemplified below with reference to actual current loop antennas and the coupled feeding solution in the foregoing examples. In this way, the coupled feeding solution provided in the embodiments of this application is more clearly described.

Figure 12B:
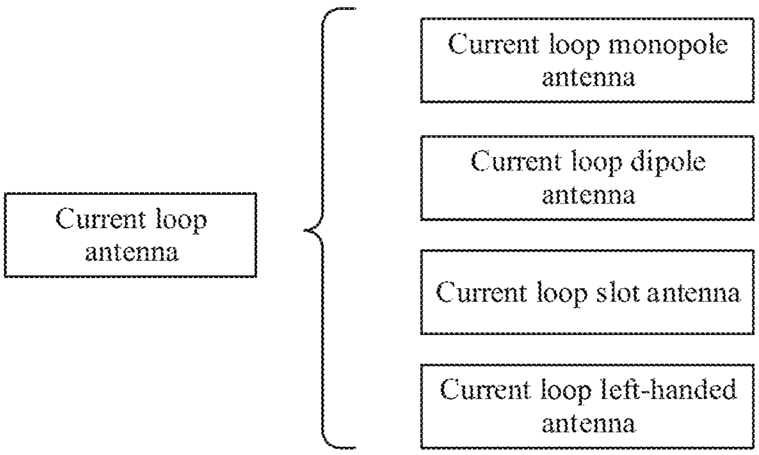
FIG. 12B is a schematic diagram of current loop antenna types according to an embodiment of this application.

For example, the current loop antenna may include various different specific implementations. For example, as shown in FIG. 12B, the current loop antenna may include a current loop monopole antenna (for example, a current loop ILA antenna), a current loop dipole antenna, a current loop slot (Slot) antenna, and a current loop composite left-handed antenna (The composite left hand antenna, CRLH). For a structure of the left-handed antenna, refer to CN201380008276.8 and CN201410109571.9. Details are not described herein again.

In some embodiments, that the current loop antenna is a current loop monopole antenna and a feeding form uses the coupled feeding structure shown in (a) in FIG. 10 is used an example to describe the current loop antenna based on coupled feeding provided in the embodiments of this application.

As shown in FIG. 13A, the current loop monopole antenna may include a radiation stub 1 and a feed stub 1. The radiation stub 1 may include one radiator. In this example, in order to obtain a uniform magnetic field through excitation, two ends of the radiator may be respectively grounded through capacitors (for example, C1 and C2). The magnitude of C1 and that of C2 may be the same or different.

In this embodiment of this application, a size of the radiation stub 1 may be related to an operating band. For example, a length of the radiation stub 1 may be less than or equal to ¼ of a corresponding wavelength of the operating band. The corresponding wavelength of the operating band may be a wavelength of a central frequency of the operating band.

Figure 13B:
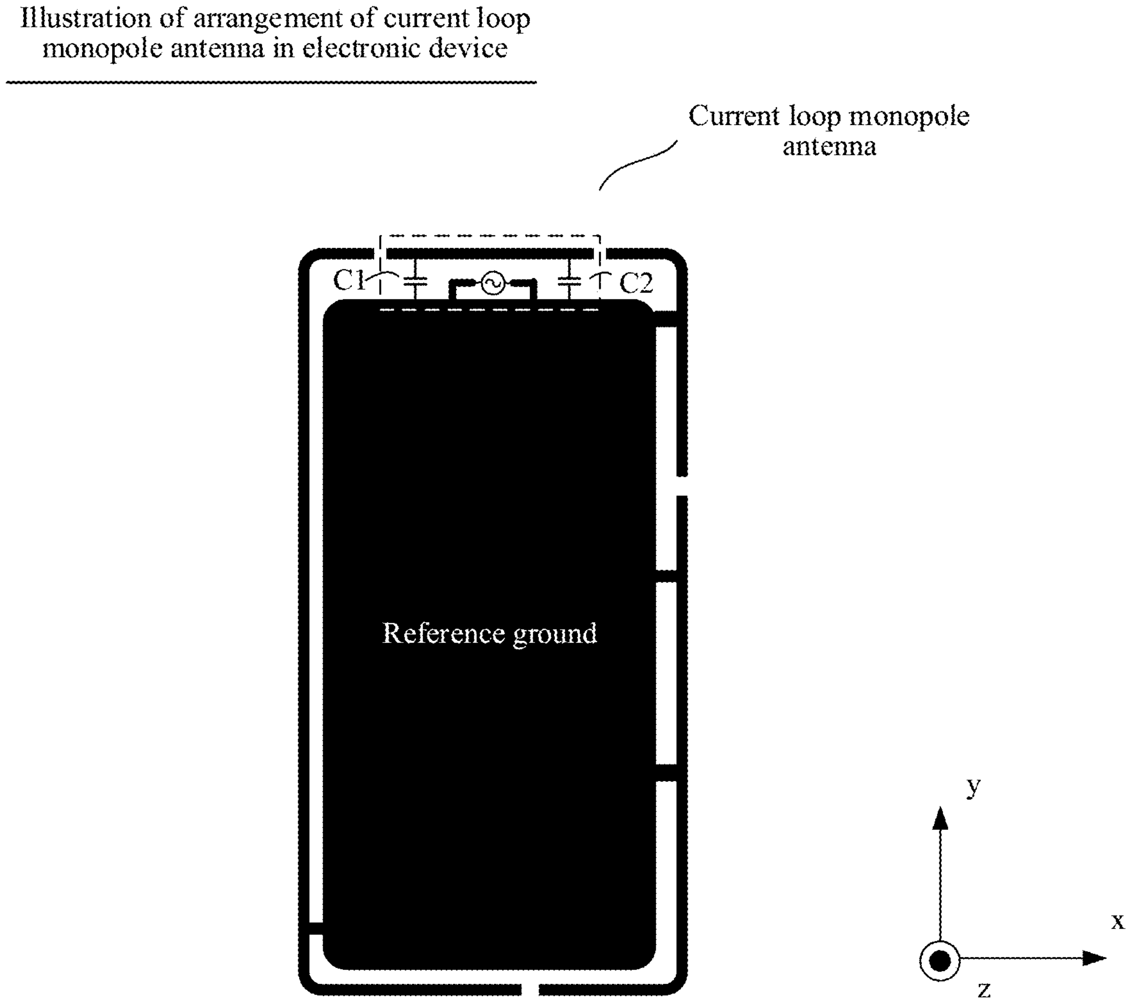
FIG. 13B is a schematic diagram of arrangement of a current loop monopole antenna in an electronic device according to an embodiment of this application.

As shown in FIG. 13A, coupled feeding may be performed on the current loop monopole antenna through the feed stub 1. With reference to the foregoing description of (a) in FIG. 10, the feed stub 1 may include two radiators L1 and L2. L1 and L2 each have one end grounded, such as coupled to a reference ground. The other ends of L1 and L2 may be connected through a feed point. For example, one end of L1 may be connected to a positive electrode of the feed point, and correspondingly, one end of L2 may be connected to a negative electrode of the feed point. In this way, signal transmission can be performed on the feed stub 1 with a radio frequency module through the feed point. For example, in a transmitting scenario, the radio frequency module may feed a signal into the feed stub 1 through the feed point, so that the feed stub 1 can implement coupled feeding of the radiation stub 1 through magnetic coupling. In an implementation, with reference to FIG. 12A and FIG. 6, refer to FIG. 13B. The current loop monopole antenna with the composition shown in FIG. 13A may be provided on the top of an electronic device, to cover one or more operating bands of the electronic device.

Figure 14:
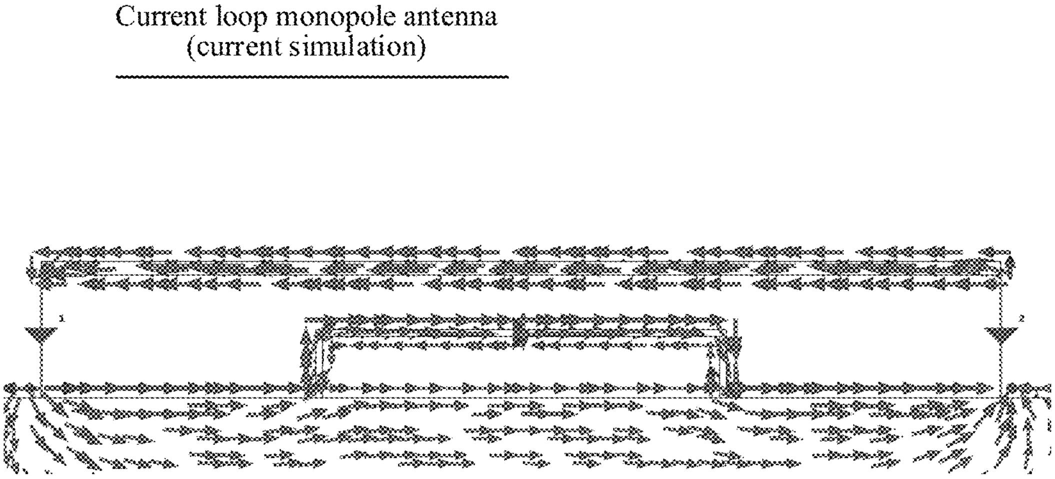
FIG. 14 is a schematic diagram of current distribution of a current loop monopole antenna according to an embodiment of this application.
Figure 14:
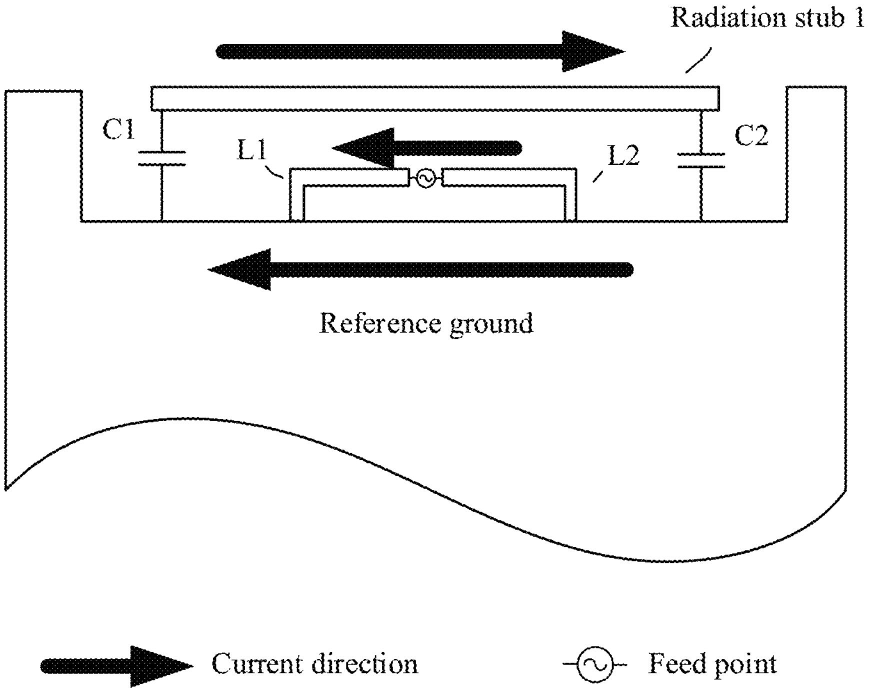

FIG. 14 is a schematic diagram of current simulation in a working process of the current loop monopole antenna with the composition shown in FIG. 13A. (a) in FIG. 14 is an actual simulation result. For better description, (b) in FIG. 14 shows a simplified flow direction of a current on the current loop monopole antenna. It can be seen that at this moment, a current along a negative direction of an x-axis (that is, to the left) can be formed on the feed stub 1 (for example, L1 and L2) under the excitation of the feed point. Under the excitation of coupled feeding of the feed stub 1, a rightward current can be formed on the radiation stub 1. Correspondingly, a leftward current can be formed on the reference ground. In this scenario, the current on the radiation stub 1 can form a closed current loop with the current on the reference ground, thereby obtaining the radiation feature of the current loop antenna.

Figure 15:
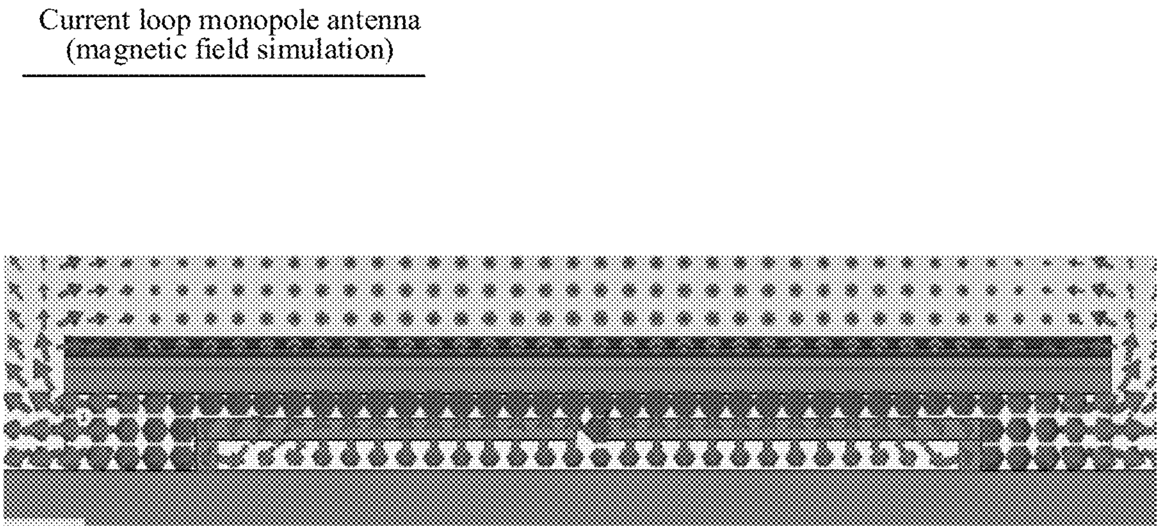
FIG. 15 is a schematic diagram of magnetic field distribution of a current loop monopole antenna according to an embodiment of this application.
Figure 15:
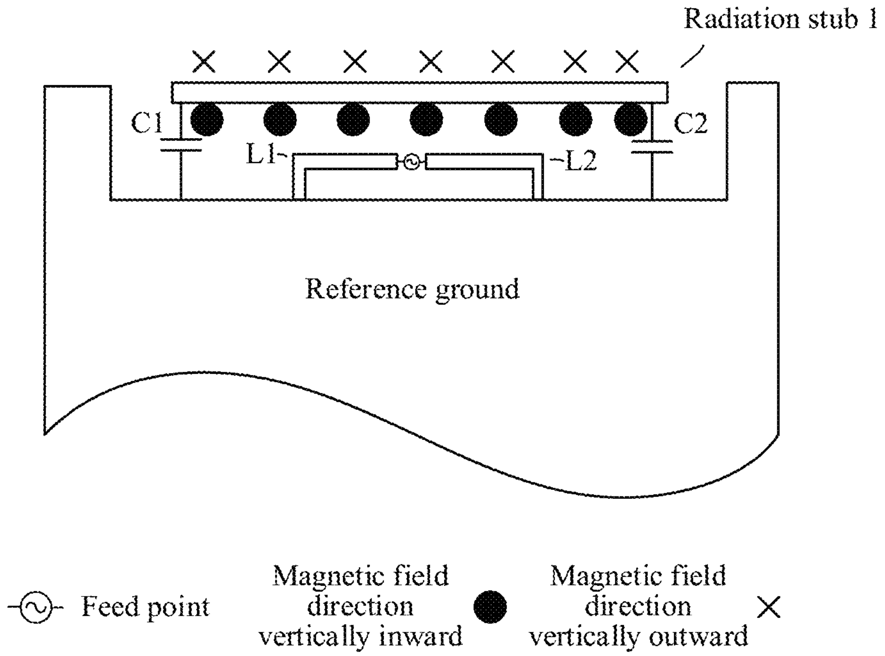

FIG. 15 is a schematic diagram of magnetic field simulation in a working process of the current loop monopole antenna with the composition shown in FIG. 13A. Similar to FIG. 14, (a) in FIG. 15 is an actual simulation result. For better description, (b) in FIG. 15 shows a simplified distribution illustration of a magnetic field near the current loop monopole antenna. With reference to the description of FIG. 14, in a case of having the current distribution status shown in (a) in FIG. 14 or (b) in FIG. 14, a uniform magnetic field distribution is obtained near the radiation stub 1. This further proves that in an antenna with the structure shown in FIG. 13A, the radiation stub 1 can be caused to perform radiation with the radiation feature of the current loop antenna through the coupled feeding of the feed stub 1.

Figure 16:
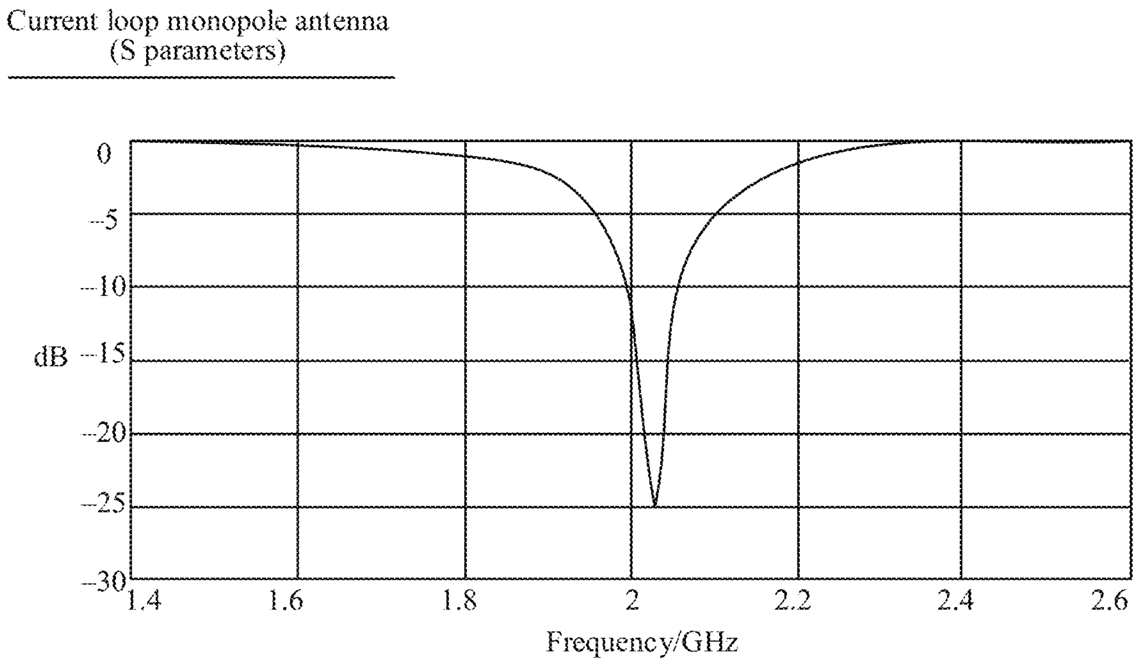
FIG. 16 is a schematic diagram of S parameters of a current loop monopole antenna according to an embodiment of this application.
Figure 16:
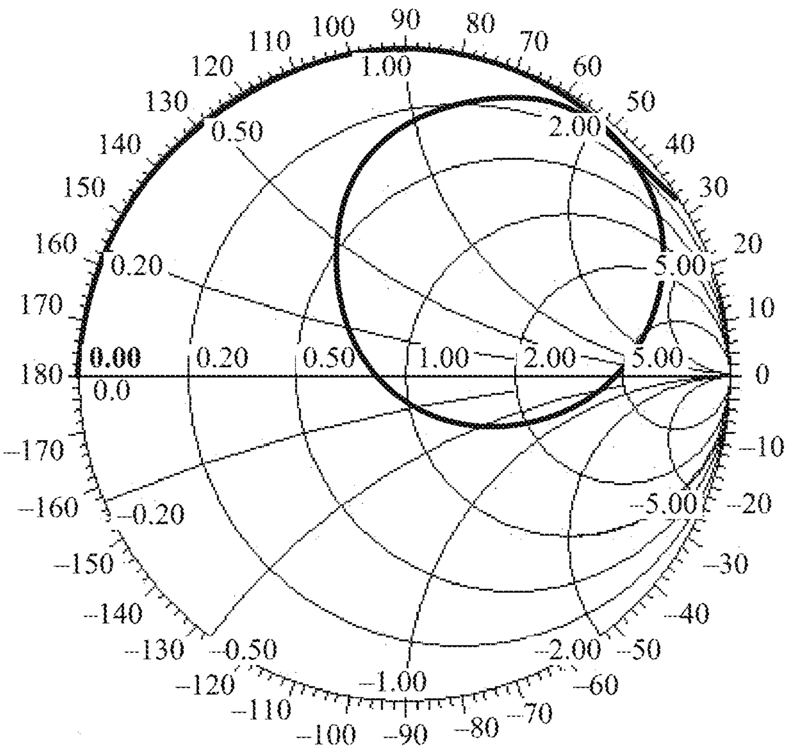

The radiation performance of the current loop monopole antenna is described below with reference to simulation results of S parameters. With reference to FIG. 16, Su. (as shown in (a) in FIG. 16) and a Smith chart (as shown in (b) in FIG. 16) of the current loop monopole antenna are provided. It can be seen that the current loop monopole antenna with the composition shown in FIG. 13A can generate a resonance near 2 GHz without any matching device (or with few matching devices used). The resonance has a −5 dB bandwidth close to 150 MHz, and therefore, coverage of at least one operating band can be achieved. Based on the Smith chart of the antenna, it can be seen that through the structural design shown in FIG. 13A, the antenna naturally has a favorable 50 ohm port matching feature, so that a requirement of a matching circuit (or device) on an antenna space and design costs and production costs can be reduced.

Figure 17:
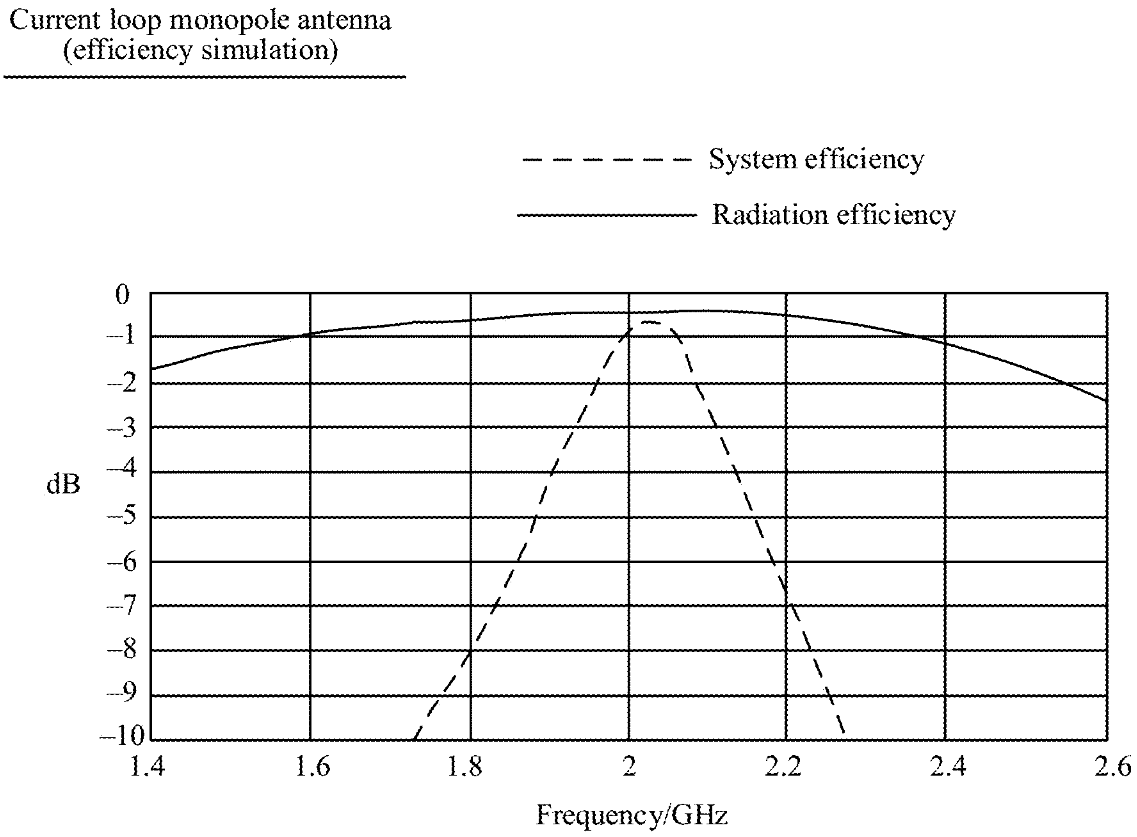
FIG. 17 is a schematic diagram of efficiency simulation of a current loop monopole antenna according to an embodiment of this application.

FIG. 17 is an illustration of efficiency simulation of the current loop monopole antenna with the composition shown in FIG. 13A. Radiation efficiency of a system of the antenna (such as a system of the current loop monopole antenna with the composition shown in FIG. 13A) is higher than −2 dB between 1.6 GHz and 2.3 GHz. Therefore, favorable radiation performance can be obtained by adjusting a position of a resonance within this frequency band (for example, 1.6 GHz to 2.3 GHz). FIG. 17 also shows system efficiency when the position of the resonance is shown in (a) in FIG. 16 (for example, a deepest point of the resonance is located at around 2 GHz). It can be seen that the highest efficiency of the resonance has exceeded −1 dB, and a −5 dB bandwidth thereof is greater than 200 MHz. Therefore, the antenna can well cover the operating band.

In this embodiment of this application, the operating band can include common bands used by an electronic device during wireless communication, such as a band (band) in a primary frequency (700 MHz to 960 MHz, and 1710 MHz to 2690 MHz), or a band of a wireless local area network (Wireless Local Area Networks, WLAN) used for a local area network connection, and a Bluetooth (bluetooth) band. Therefore, the current loop monopole antenna with the composition shown in FIG. 13A can be widely applied to conventional antennas to help electronic devices implement wireless communication functions thereof.

In order to enable a person skilled in the art to better apply the current loop monopole antenna based on coupled feeding provided in the embodiments of this application to actual products, the following describes impact of feed stubs 1 of different lengths on the operation of the current loop monopole antenna.

With reference to the foregoing description, the length of the feed stub may be used to adjust an inductive/capacitive component of the current loop antenna, thereby making the antenna have a port matching effect.

Figure 18:
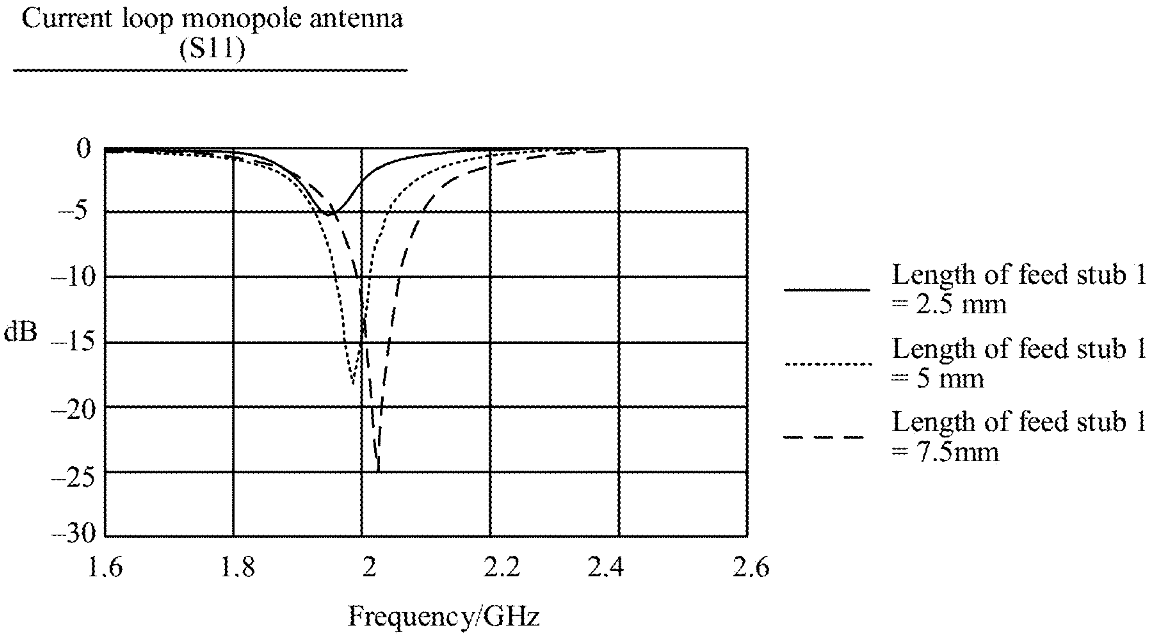
FIG. 18 is a schematic diagram of S11 parameters of a current loop monopole antenna according to an embodiment of this application.

FIG. 18 is a comparison illustration of S parameters corresponding to feed stubs 1 of different lengths and radiation stubs of a same length in the current loop monopole antenna with the composition shown in FIG. 13A In an example, the lengths of the feed stubs 1 are 2.5 mm, 5 mm, and 7.5 mm, respectively. It can be seen that a longer feed stub 1 indicates a higher port matching degree and deeper S11, and the bandwidth can also be correspondingly widened. Refer to the comparison of the Smith chart shown in FIG. 19. As the length of the feed stub 1 increases, the inductive nature of the antenna is enhanced, and a signal can be better fed through coupling into the radiation stub 1 for radiation. The Smith chart is increasingly closer to a 50 ohm matching state. Correspondingly, it can be seen from the radiation efficiency comparison shown in FIG. 20 that, there is no significant change in radiation efficiency near 2 GHz during adjustment of port matching by the length of the feed stub 1. Therefore, it is proved that adjusting the length of the feed stub 1 to perform port matching does not cause any significant loss of radiation performance.

Figure 19:
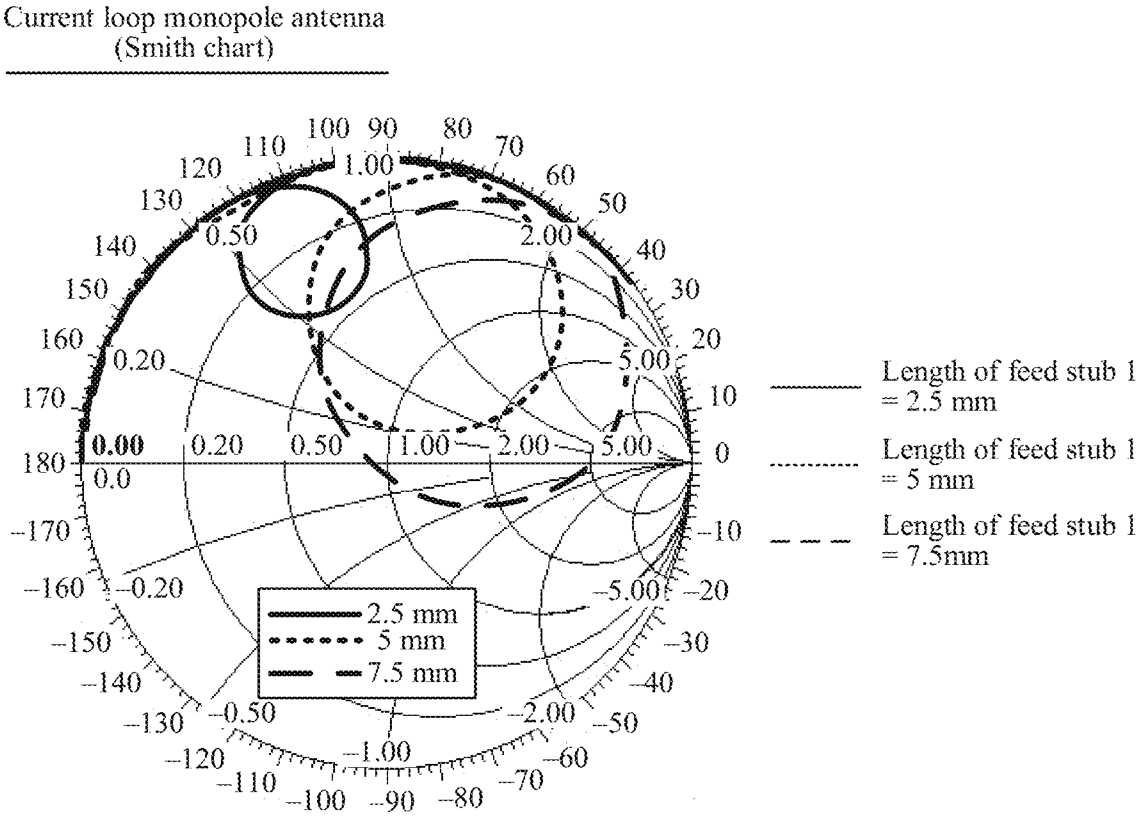
FIG. 19 is a schematic diagram of a Smith chart of a current loop monopole antenna according to an embodiment of this application.
Figure 20:
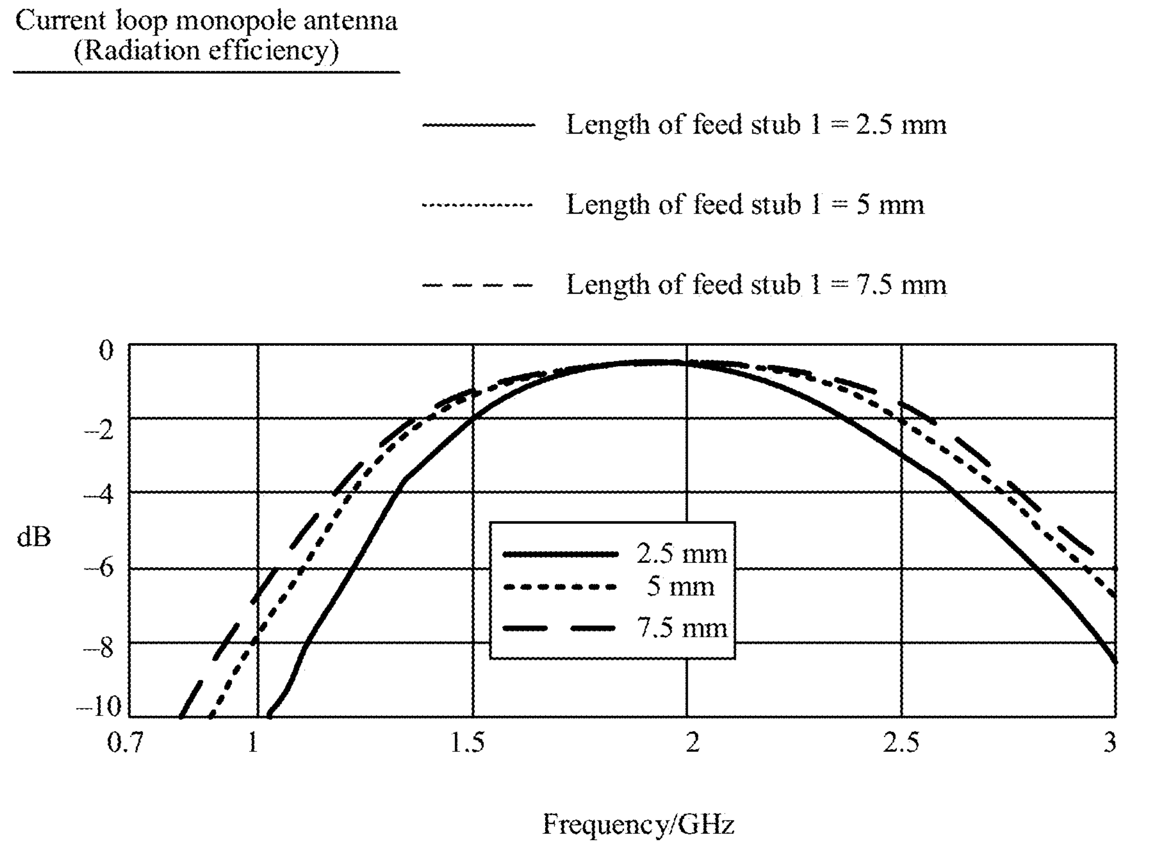
FIG. 20 is a schematic diagram of efficiency simulation of a current loop monopole antenna according to an embodiment of this application.

It should be noted that in the solutions shown in FIG. 18, FIG. 19, and FIG. 20, only comparisons of impact of the feed stubs 1 of different lengths in the current environment are illustrated. In other environments, when the antenna is required to have relatively high capacitive nature, a relatively good radiation effect can be obtained by adjusting the size of the feed stub 1 to obtain better capacitive matching. Therefore, the size of the feed stub 1 can be flexibly adjusted according to requirements of different environments, to obtain relatively good radiation performance of the current loop monopole antenna.

Figure 21:
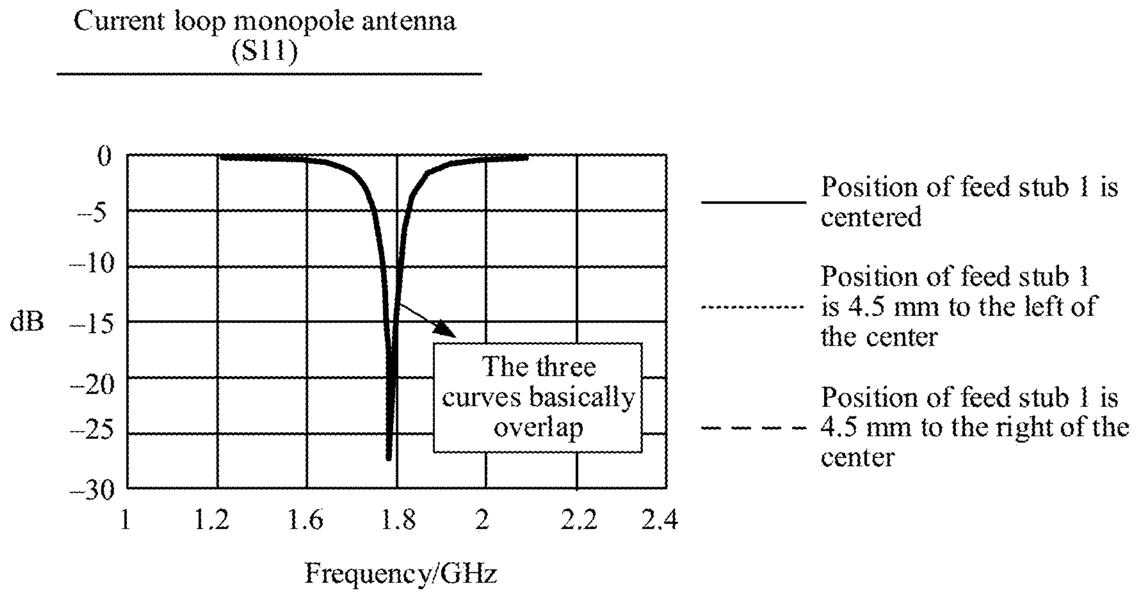
FIG. 21 is a schematic diagram of S11 parameters of a current loop monopole antenna according to an embodiment of this application.

In addition, the embodiments of this application further provide a comparative illustration of the impact on resonant frequency when the position of the feed stub 1 of the current loop monopole antenna with the composition shown in FIG. 13A moves left and right along the x-axis. As shown in FIG. 21, when the feed stub 1 is provided in the center, the feed stub 1 is moved to the left by 4.5 mm, or the feed stub 1 is moved to the right by 4.5 mm, resonances thereof basically overlap. In other words, in a specific implementation of the current loop monopole antenna provided in the embodiments of this application, the position of the feed stub 1 in the x-axis may be flexibly set. With reference to the foregoing description, the antenna solution provided in the embodiments of this application is a current loop antenna, and a nearby magnetic field is uniformly distributed in a working process of the antenna. Therefore, the position of the feed stub 1 can be flexibly set according to an actual implementation scenario. In this way, design difficulty of the current loop monopole antenna can be significantly reduced.

It should be noted that in the current loop monopole antennas provided above in FIG. 13A to FIG. 21, the compositions of the radiation stubs 1 are each an example only. For example, the radiation stub 1 may include one monopole radiator. In some other implementations of this application, the radiation stub 1 may alternatively be in other forms. For example, the radiation stub 1 may alternatively be connected in series with one or more capacitors (for example, connected in series with a third capacitor C3). For example, FIG. 22 shows an illustration of a current loop monopole antenna with a radiation stub 1 connected in series with one capacitor C3. Coupled feeding can still be performed on the current loop monopole antenna through the feed stub 1 in the foregoing example to obtain a current loop radiation feature. It is proved through experiments that the radiation efficiency of the antenna can be further improved when the radiation stub 1 is connected in series with one or more capacitors (for example, C3). For the setting of the corresponding capacitor position and the setting of a quantity of capacitors, selection may be flexibly performed according to actual needs, and this is not limited in this embodiment of this application.

In addition, the foregoing examples are all described by using an example in which the composition shown in (a) in FIG. 10 is used for the coupled feeding. In some other embodiments of this application, other examples in FIG. 10 or any example shown in FIG. 11 may alternatively be used for the composition of the coupled feeding, and an effect that can be achieved is similar to the foregoing examples. A form of the composition used for the coupled feeding is not limited in the embodiments of this application.

In different specific implementation processes, specific implementations of the current loop monopole antenna with any composition shown in FIG. 13A to FIG. 15 or FIG. 22 may be different. For example, in some embodiments, with reference to FIG. 13B, the radiator of the radiation stub 1 and/or the feed stub 1 of the current loop monopole antenna may fully or partially reuse a metal frame of an electronic device. In some other embodiments, the radiator of the radiation stub 1 and/or the feed stub 1 of the current loop monopole antenna may alternatively be implemented in a form of a flexible circuit board (Flexible Printed Circuit, FPC), a die casting process for anodicoxidation (Metalframe Diecasting for Anodicoxidation, MDA), or the like. A specific implementation form of the current loop monopole antenna is not limited in this embodiment of this application.

In the foregoing description, the coupled feeding solution provided in the embodiments of this application is described with reference to the current loop monopole antenna. The following uses an example in which the current loop antenna is a current loop dipole antenna and a feeding form uses the coupled feeding structure shown in (a) in FIG. 10 to continue to describe the current loop antenna based on coupled feeding provided in the embodiments of this application.

It should be understood that, a typical monopole antenna implements radiation through a ¼-wavelength radiation structure. Correspondingly, based on a mirror image principle, a dipole antenna implements radiation through a ½-wavelength radiation structure.

In this example, the antenna is improved based on a typical dipole, and signal transmission is implemented through coupled feeding, to obtain a current loop dipole antenna.

Figure 23A:
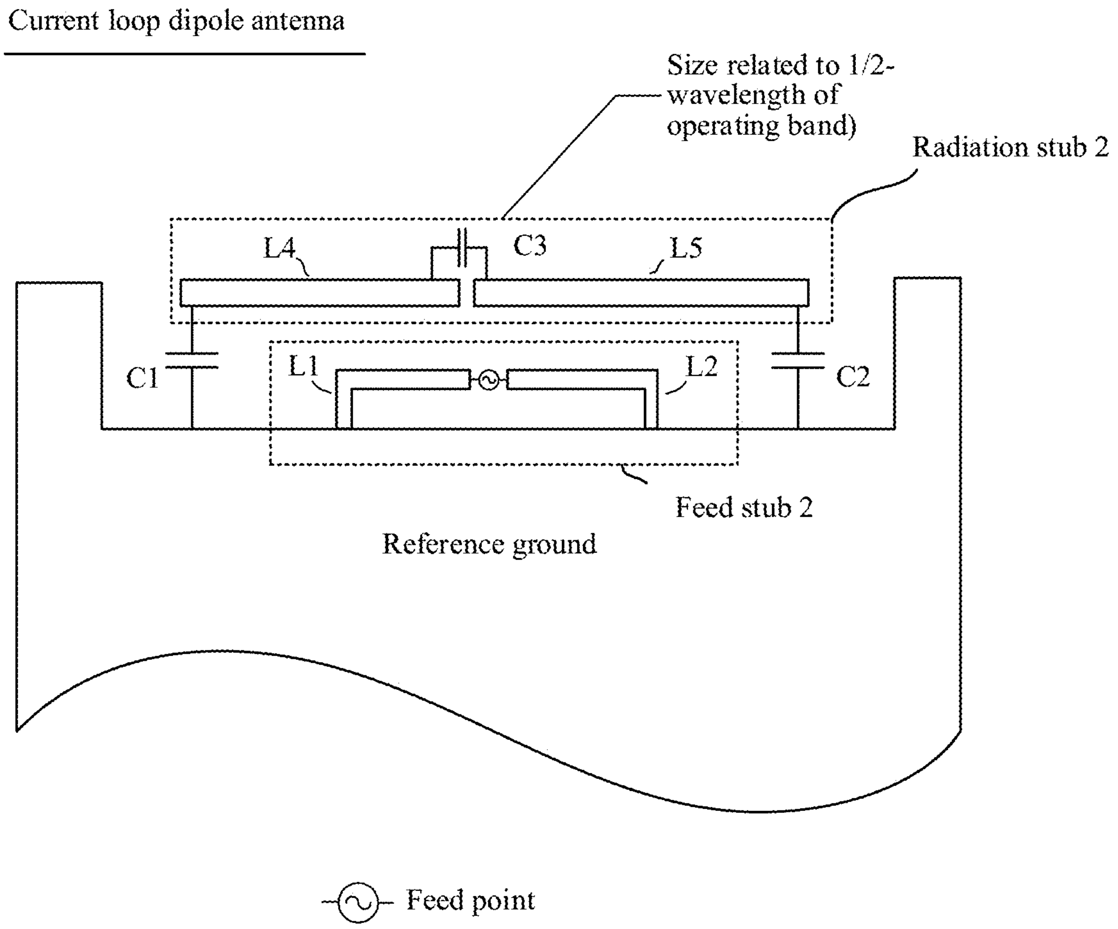
FIG. 23A is a schematic composition diagram of a current loop dipole antenna according to an embodiment of this application.

FIG. 23A is a schematic diagram of a current loop dipole antenna based on coupled feeding according to an embodiment of this application. As shown in FIG. 23A, a radiation stub 2 of the current loop dipole antenna may include two radiators (for example, L4 and L5). L4 and L5 may be coupled through a capacitor (for example, a third capacitor C3). Ends of L4 and L5 away from C3 may be coupled to the ground through capacitors, respectively. For example, the ends of L4 and L5 away from C3 may be coupled to the ground through a first capacitor C1 and a second capacitor C2, respectively.

In different implementations, the magnitude of C1 and C2 and the magnitude of C3 may be determined based on an operating band of the current loop dipole antenna.

In some embodiments, a total length of the radiation stub 2 (for example, lengths of L4 and L5) may be related to a ½-wavelength of the operating band. For example, the total length of the radiation stub 2 may be less than the ½-wavelength of the operating band and greater than a ¼-wavelength of the operating band.

It should be noted that in different embodiments of this application, a position of C3 provided between L4 and L5 may be flexible. For example, C3 may be provided at a central position of the radiation stub 2, that is, L4 and L5 may have a same size. In some other embodiments, C3 may alternatively be provided in a left part of the radiation stub 2, that is, the length of L4 may be less than the length of L5. Alternatively, C3 may be provided in a right part of the radiation stub 2, that is, the length of L4 may be greater than the length of L5.

Figure 23B:
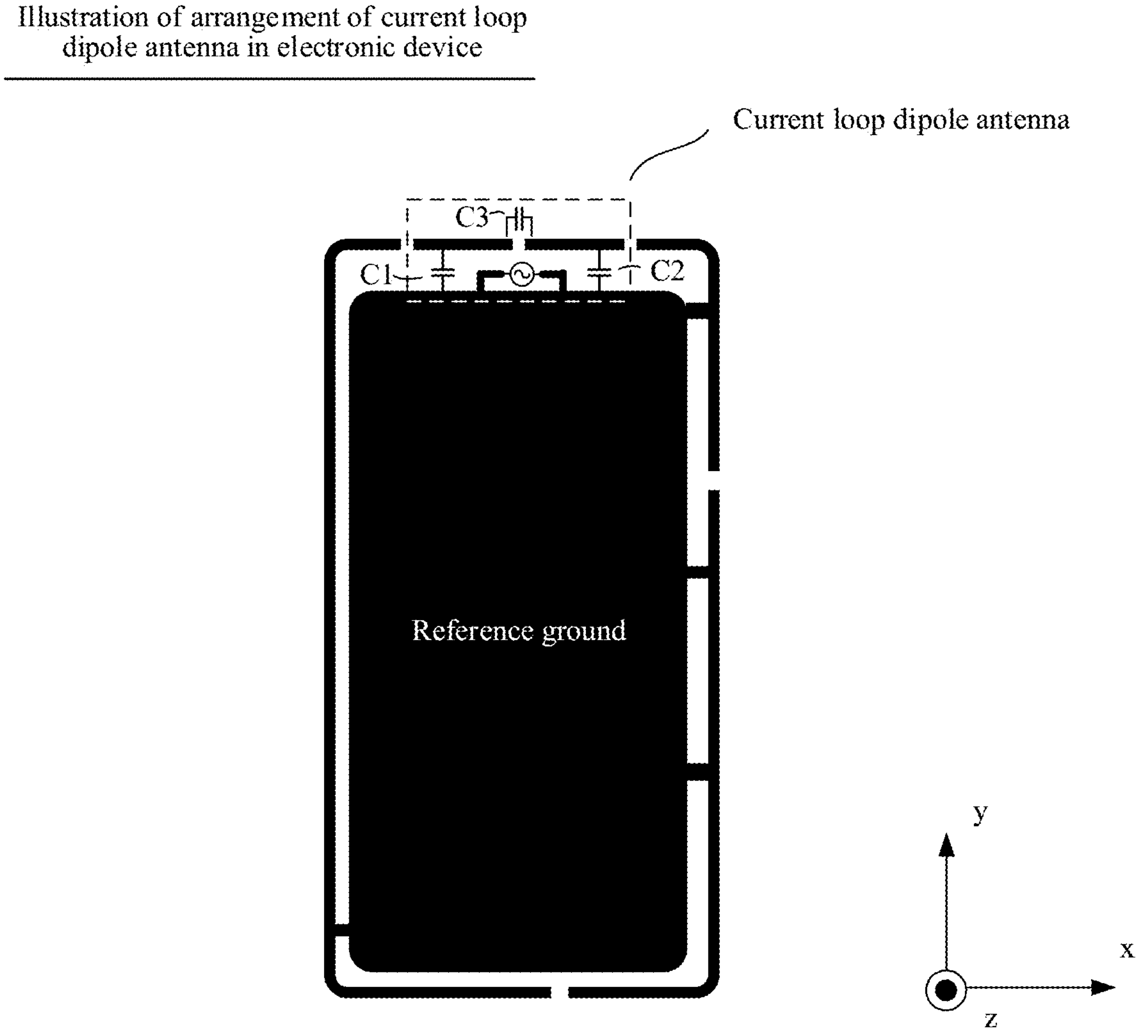
FIG. 23B is a schematic diagram of arrangement of a current loop dipole antenna in an electronic device according to an embodiment of this application.

The current loop dipole antenna with the composition shown in FIG. 23A can form a radiation feature of the current loop antenna in a feed structure shown in the feed stub 2 shown in the figure (that is, shown in (a) in FIG. 10). In an implementation, refer to FIG. 23B. The current loop dipole antenna with the composition shown in FIG. 23A may be provided on the top of an electronic device. For example, the radiator of the radiation stub 2 may reuse a metal frame on the top of the electronic device, to cover one or more operating bands of the electronic device.

A working status of the current loop dipole antenna shown in FIG. 23A is described below with reference to current simulation and magnetic field simulation.

Figure 24:
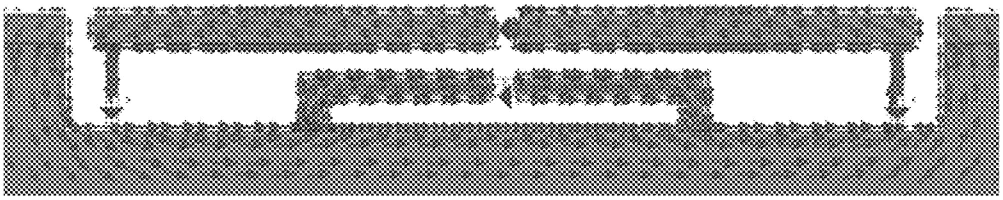
FIG. 24 is a schematic diagram of current distribution of a current loop dipole antenna according to an embodiment of this application.
Figure 24:
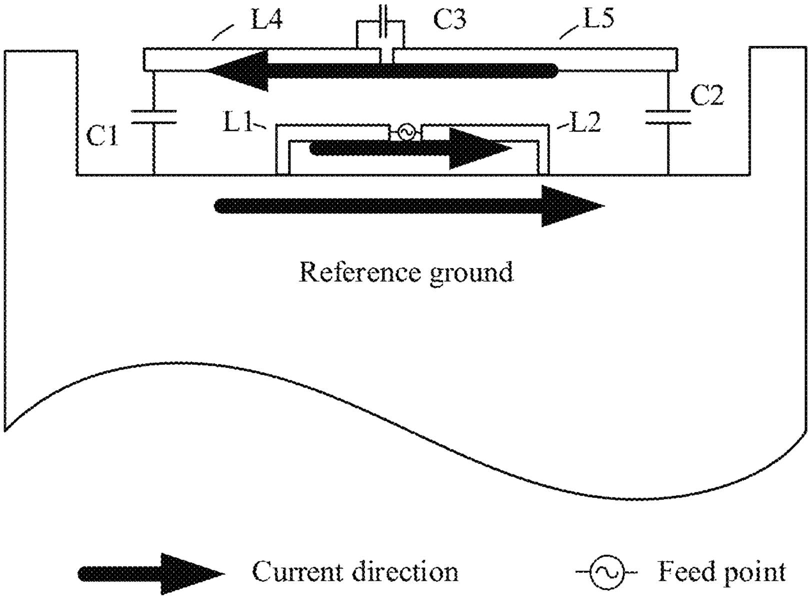

For example, refer to FIG. 24, which is a schematic diagram of a current distribution status of the current loop dipole antenna based on coupled feeding provided in the embodiments of this application. (a) in FIG. 24 is an actual simulation result. For better description, (b) in FIG. 24 is a simplified illustration of a current near the current loop dipole antenna. It can be seen that when the current loop dipole antenna is working, currents in opposite directions can be formed on the radiation stub 2 (for example, L4 and L5) and a reference ground. For example, a leftward current can be formed on L4 and L5, and a rightward current can be formed on the reference ground. In this case, through the capacitors (for example, C1 and C2) respectively provided on the left and right sides, the current on L4 and L5 and the current on the reference ground can form a closed current loop. In addition, a current in a direction that is the same as the current on the reference ground and opposite to the current on L4 and L5 may be formed on the feed stub 2 (for example, L1 and L2). Therefore, this conforms to a current distribution feature in a working process of the current loop antenna.

Figure 25:
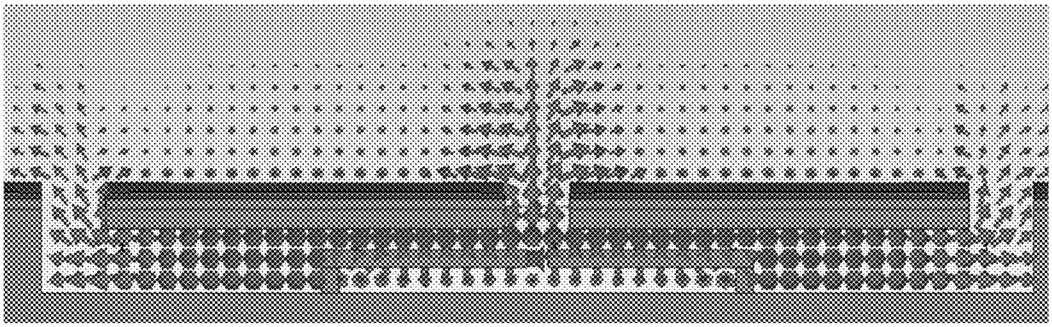
FIG. 25 is a schematic diagram of magnetic field distribution of a current loop dipole antenna according to an embodiment of this application.
Figure 25:
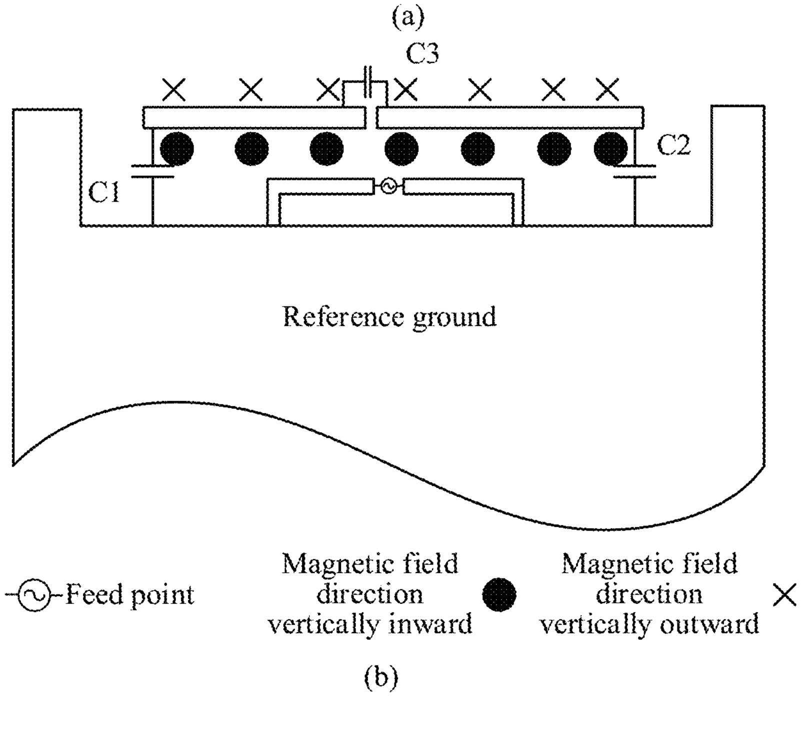

Corresponding to FIG. 24, FIG. 25 is a schematic diagram of a magnetic field distribution status of the current loop dipole antenna based on coupled feeding provided in the embodiments of this application. (a) in FIG. 25 is an actual simulation result. For better description, (b) in FIG. 25 is a simplified illustration of a magnetic field near the current loop dipole antenna. It can be seen that when the current loop dipole antenna is working, a uniform magnetic field can be formed in space. For example, a uniform magnetic field in an inward direction perpendicular to the paper (that is, in a positive direction of a z-axis) can be formed in an upper space of L4 and L5. A uniform magnetic field in a negative direction of the z-axis is formed in a lower space of L4 and L5. It should be understood that, with reference to the foregoing description, due to the arrangement of the capacitors C1, C2, and C3, based on an energy storage feature of the capacitors for electric energy, the current on L4 and L5 is more uniformly distributed and forms a closed current loop with the current on the reference ground, so that a magnetic field generated therefrom also has a uniform distribution feature. In this way, it is also proved that the current loop dipole antenna based on coupled feeding with the composition shown in FIG. 23A can obtain the radiation feature of the current loop antenna.

A radiation status of the current loop dipole antenna based on coupled feeding with the composition shown in FIG. 23A is described below with reference to simulation results of S parameters.

Figure 26:
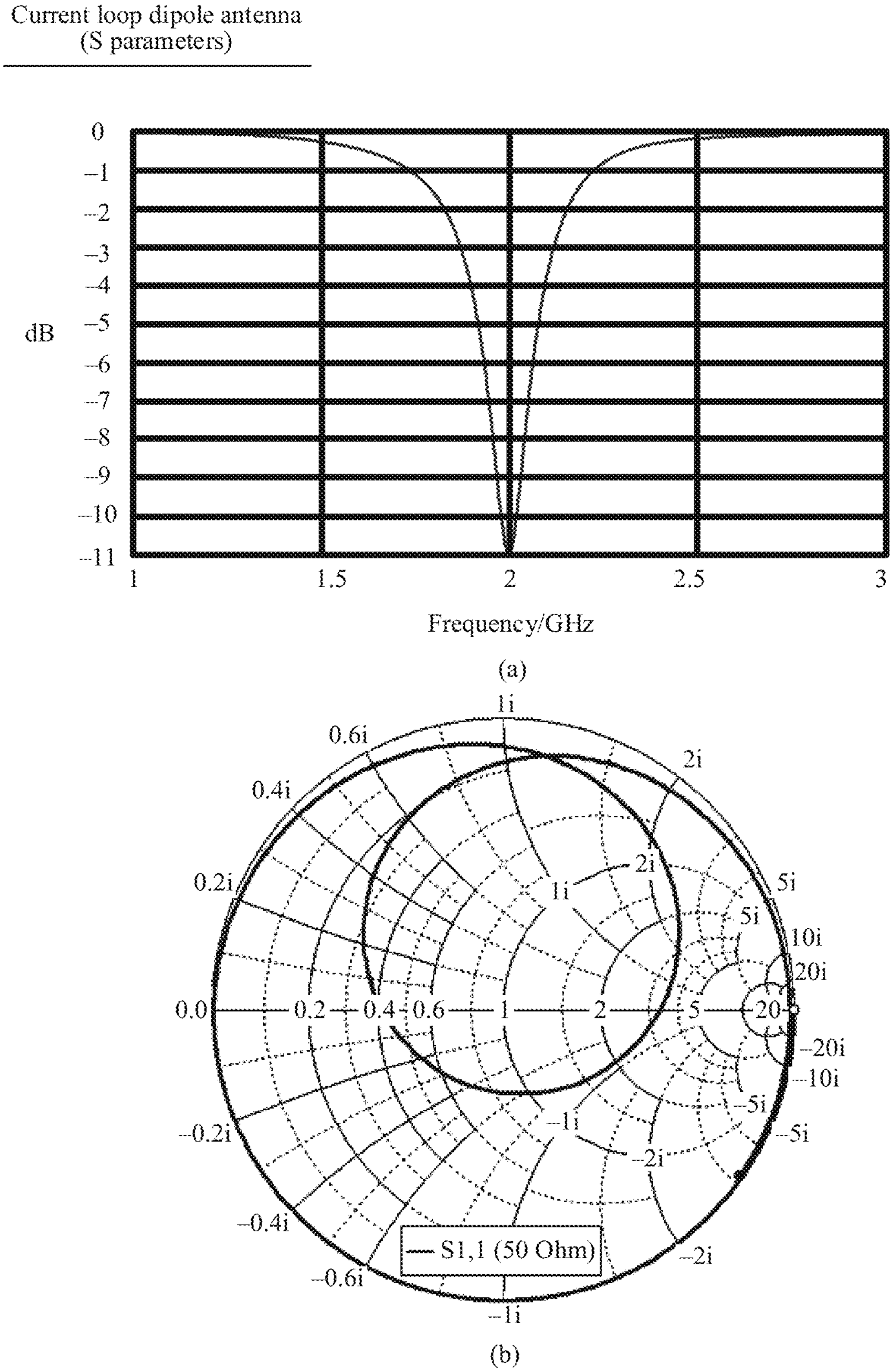
FIG. 26 is a schematic diagram of S parameters of a current loop dipole antenna according to an embodiment of this application.
Figure 27:
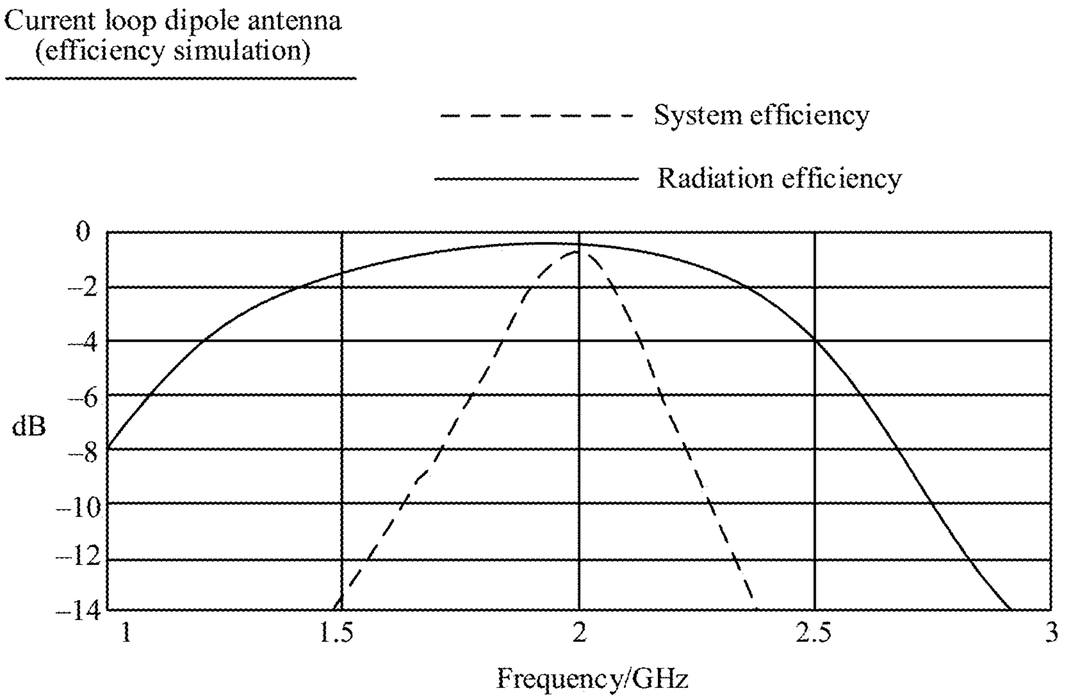
FIG. 27 is a schematic diagram of efficiency simulation of a current loop dipole antenna according to an embodiment of this application.

For example, refer to FIG. 26. As shown in (a) in FIG. 26, on an Su curve, the current loop dipole antenna can perform excitation to generate a resonance near 2 GHz. The resonance has a −5 dB bandwidth of over 100 MHz, and therefore, coverage of at least one operating band can be achieved. With reference to (b) in FIG. 26, in a Smith chart, except for the arrangement of the capacitors (for example, C1, C2, and C3) shown in FIG. 23A, no additional matching circuit is required in the current loop dipole antenna, and favorable 50 ohms port matching can be achieved. Refer to FIG. 27, which shows an illustration of radiation efficiency and system efficiency of the current loop dipole antenna based on coupled feeding with the composition shown in FIG. 23A. As shown in FIG. 27, the current loop dipole antenna has a −2 dB radiation efficiency bandwidth of over 1 GHz, and therefore, a favorable radiation capability can be provided. Correspondingly, in a current environment, the system efficiency of the current loop dipole antenna has a −6 dB bandwidth of over 300 MHz. Therefore, in an actual environment, the current loop dipole antenna can also provide favorable bandwidth and radiation performance.

With reference to the foregoing analysis results of the impact of the sizes and positions of L1 and L2 on antenna radiation in FIG. 12B to FIG. 21 for the current loop monopole antenna, the results are still applicable to the current loop dipole antenna. For example, a port matching state of the current loop dipole antenna can be adjusted by adjusting the lengths or length of L1 and/or L2. For another example, x-axis positions of L1 and L2 have little impact on the resonant frequency and radiation performance of the current loop dipole antenna.

Figure 28:
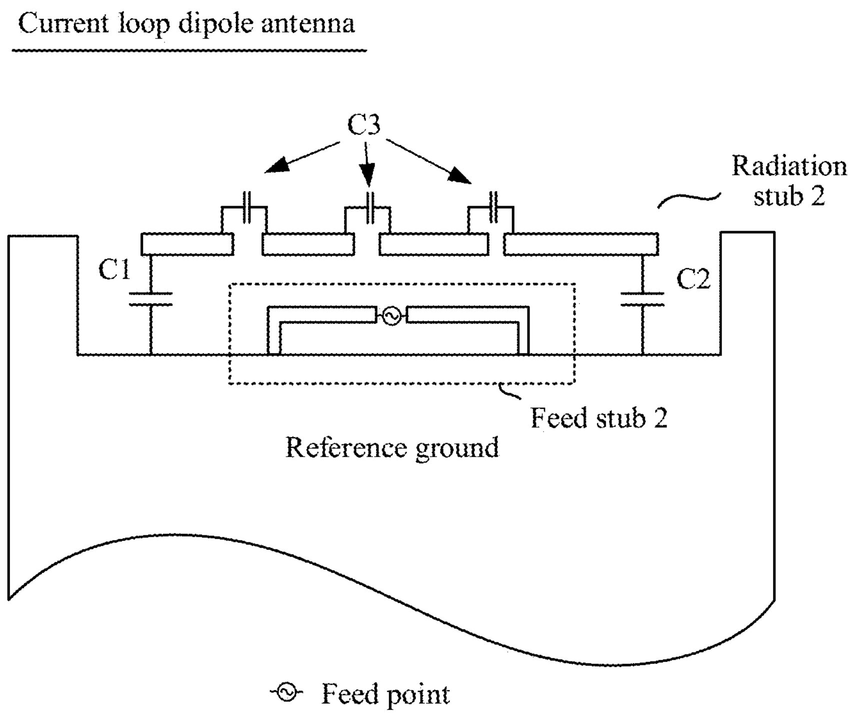
FIG. 28 is a schematic composition diagram of a current loop monopole antenna according to an embodiment of this application.

It should be noted that in the current loop dipole antennas provided above in FIG. 23A to FIG. 27, the compositions of the radiation stubs 2 are each an example only. For example, in addition to the two capacitors (C1 and C2) connected to the ground, the radiation stub 2 may be connected in series with one capacitor (C3). In some other implementations of this application, the radiation stub 2 may alternatively be in other forms. For example, L4 and L5 may be further connected in series with one or more capacitors C3. For example, FIG. 28 shows an illustration of a current loop dipole antenna whose radiation stub 2 is connected in series with a plurality of capacitors (for example, three capacitors C3). In this example, L4 may be further connected in series with one capacitor C3, and L5 may also be connected in series with one capacitor C3. It is proved through experiments that the radiation efficiency of the antenna can be further improved when the radiation stub 2 is connected in series with a plurality of capacitors C3. For the setting of the corresponding capacitor position and the setting of a quantity of capacitors, selection may be flexibly performed according to actual needs, and this is not limited in this embodiment of this application.

In addition, the foregoing examples are all described by using an example in which the composition shown in (a) in FIG. 10 is used for the coupled feeding. In some other embodiments of this application, other examples in FIG. 10 or any example shown in FIG. 11 may alternatively be used for the composition of the coupled feeding, and an effect that can be achieved is similar to the foregoing examples. A form of the composition used for the coupled feeding is not limited in the embodiments of this application.

In different specific implementation processes, specific implementations of the current loop dipole antenna with any composition shown in FIG. 23A to FIG. 28 may be different. For example, in some embodiments, the radiator of the radiation stub 2 and/or the feed stub 2 of the current loop dipole antenna may fully or partially reuse a metal frame of an electronic device. In some other embodiments, the radiator of the radiation stub 2 and/or the feed stub 2 of the current loop dipole antenna may alternatively be implemented in a form of a flexible circuit board (Flexible Printed Circuit, FPC), MDA, or the like. A specific implementation form of the current loop dipole antenna is not limited in this embodiment of this application.

In the foregoing description, the coupled feeding solution provided in the embodiments of this application is described with reference to the current loop dipole antenna. The following uses an example in which the current loop antenna is a current loop slot antenna and a feeding form uses the coupled feeding structure shown in (a) in FIG. 10 to describe the current loop antenna based on coupled feeding provided in the embodiments of this application.

Figure 29A:
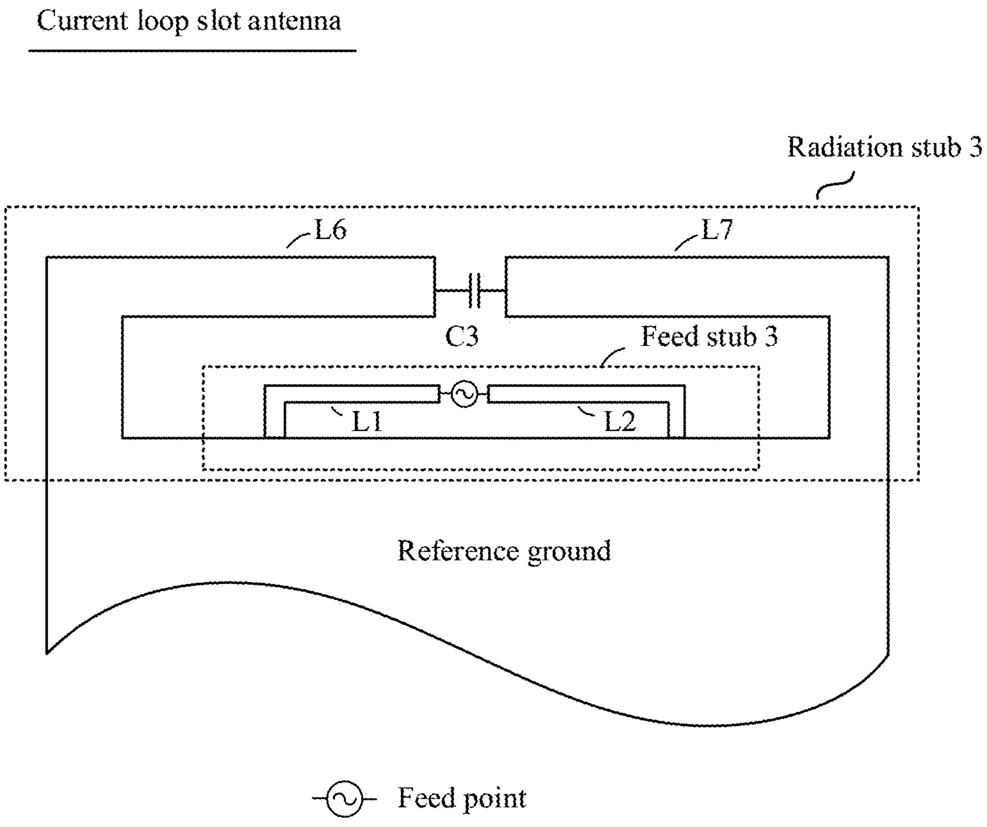
FIG. 29A is a schematic composition diagram of a current loop slot antenna according to an embodiment of this application.

FIG. 29A is a schematic composition diagram of a current loop slot antenna based on coupled feeding according to an embodiment of this application.

As shown in FIG. 29A, the current loop slot antenna provided in this example may include a radiation stub 3 and a feed stub 3. The feed stub 3 may be used to generate a corresponding current on a radiator thereof under excitation of a feed point. The radiation stub 3 may obtain magnetic excitation from the feed stub 3 through coupled feeding, to generate a radiation feature of the current loop antenna.

In this example, the feed stub 3 may use a composition similar to that shown in (a) in FIG. 10 in the foregoing example to implement a coupled feeding function thereof, and details are not described herein again. As shown in FIG. 29A, the radiation stub 3 included in the current loop slot antenna provided in this embodiment of this application may include at least two radiators (for example, L6 and L7) whose ends are oppositely provided. In an implementation, a hollow rectangular gap enclosed by the radiator and a reference ground is as an example. The radiator consisting of L6 and L7 may be a side opposite to a main ground (a lower edge of the gap shown in FIG. 29A) of the reference ground among the four sides of the rectangular gap. That is, in this example, the radiator consisting of L6 and L7 may be an upper edge of the rectangular gap. One end of L6 and one end of L7 may be provided facing each other. At the ends provided facing each other, L6 and L7 may be coupled to each other through a capacitor (for example, a third capacitor C3). As shown in FIG. 29A, the other ends of L6 and L7 may be separately coupled to the reference ground. In this way, L6 and L7 may form a gap with the reference ground. With reference to FIG. 29A, the gap may be a gap corresponding to a rectangular non-conductive region included in the radiation stub 3. It can be understood that, due to the arrangement of C3, based on an energy storage feature of the capacitor for electric energy, the radiator constituting the slot antenna and the edge of the reference ground that is close to the gap are caused to generate a relatively uniform closed current loop, so that a uniformly distributed magnetic field can be obtained from the gap.

In different implementations, the magnitude of C3 may be determined based on an operating band of the current loop dipole antenna.

Figure 29B:
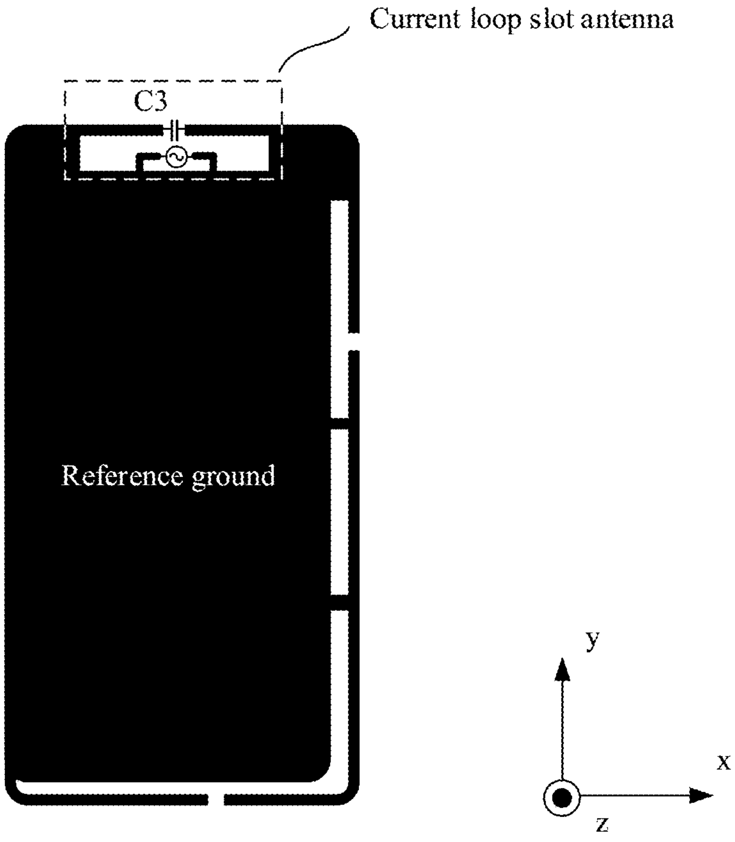
FIG. 29B is a schematic diagram of arrangement of a current loop slot antenna in an electronic device according to an embodiment of this application.

When the current loop slot antenna is working, a transverse current can be generated on the feed stub 3 (for example, L1 and L2). Under excitation of the transverse current, L6 and L7 can excite radiation with a current loop feature through coupled feeding. In an implementation, refer to FIG. 29B. The current loop slot antenna with the composition shown in FIG. 29A may be provided on the top of an electronic device, to cover one or more operating bands of the electronic device.

A working status of the current loop slot antenna provided in this embodiment of this application is described below with reference to current and magnetic field simulation results.

Figure 30:
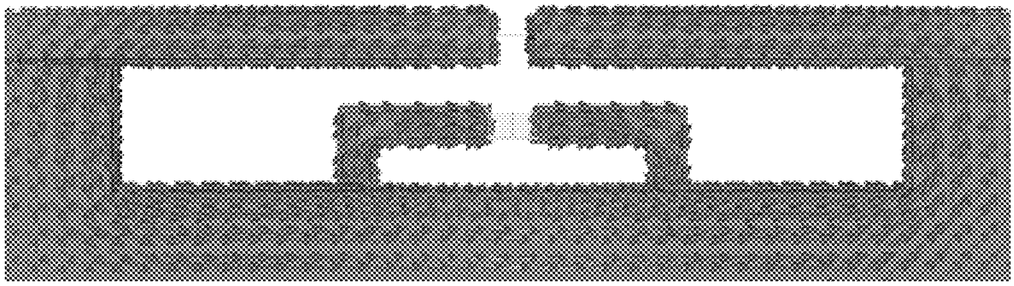
FIG. 30 is a schematic diagram of current distribution of a current loop slot antenna according to an embodiment of this application.
Figure 30:
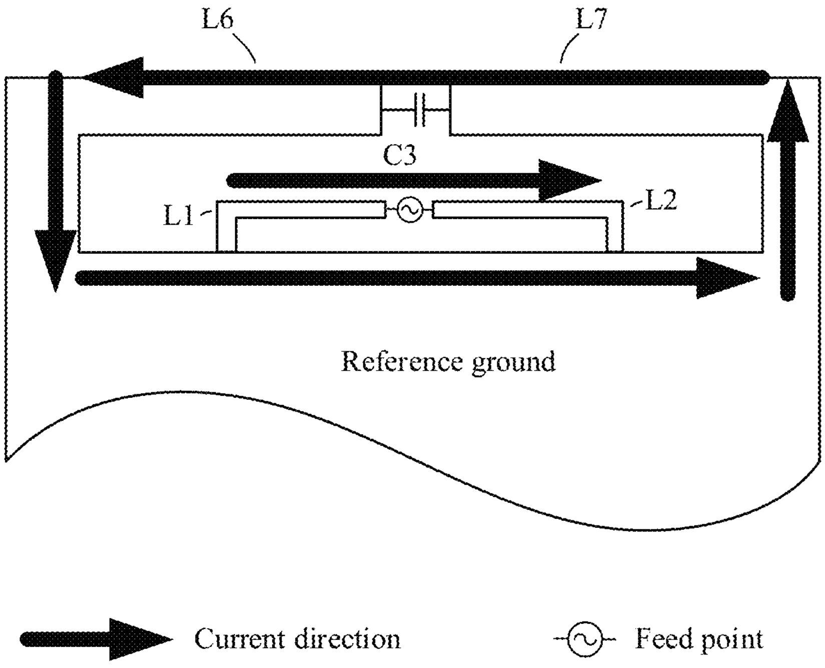

For example, FIG. 30 is a schematic diagram of current simulation of a current loop slot antenna according to an embodiment of this application. (a) in FIG. 30 is an actual simulation result. For better description, (b) in FIG. 30 is a simplified current distribution illustration of a current on L6 and L7. It can be seen that when the current loop slot antenna is working, currents in opposite directions can be formed on the radiation stub 3 and a reference ground. For example, a leftward current can be formed on L6 and L7, and a rightward current can be formed on the reference ground. In this case, the current on L6 and L7 and the current on the reference ground can form a closed current loop. In addition, a current in a direction that is the same as the current on the reference ground and opposite to the current on L6 and L7 may be formed on L1 and L2. Therefore, this conforms to a current distribution feature in a working process of the current loop antenna.

Figure 31:
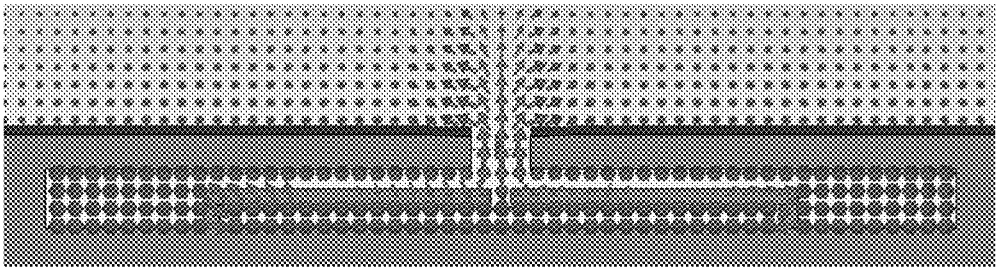
FIG. 31 is a schematic diagram of magnetic field distribution of a current loop slot antenna according to an embodiment of this application.
Figure 31:
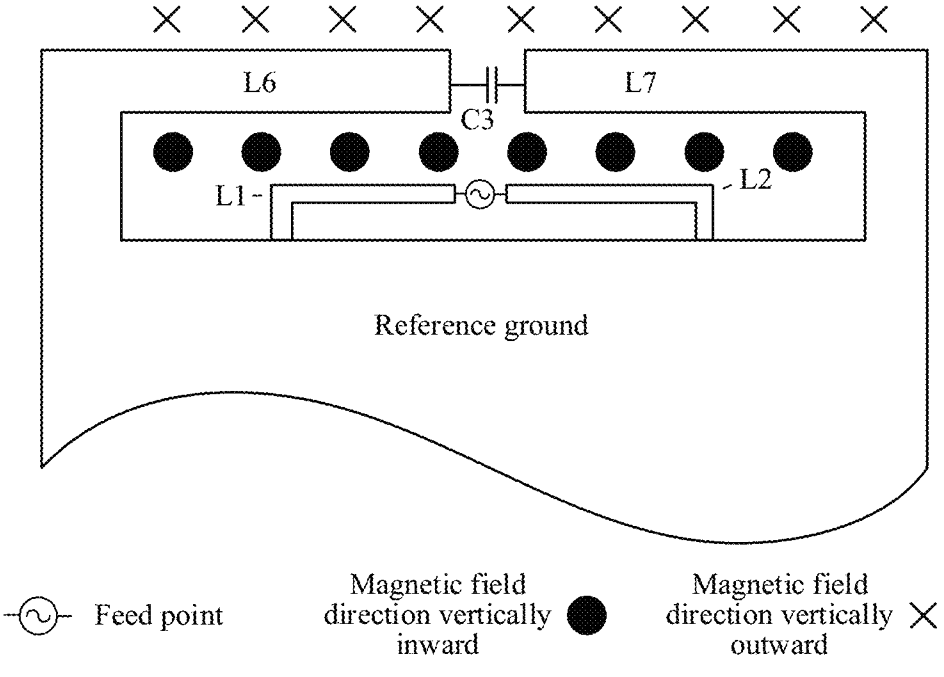

Based on FIG. 30, refer to FIG. 31, which is a schematic diagram of magnetic field simulation of the current loop slot antenna further provided in this embodiment of this application. (a) in FIG. 31 is an actual simulation result. For better description, (b) in FIG. 31 is a simplified illustration of distribution of a magnetic field near L6 and L7 of the current loop slot antenna. It can be seen that when the current loop slot antenna is working, a uniform magnetic field can be formed in space. For example, a uniform magnetic field in an inward direction perpendicular to the paper (that is, in a positive direction of a z-axis) can be formed in an upper space of L6 and L7. A uniform magnetic field in a negative direction of the z-axis is formed in a lower space of L6 and L7. In this way, it is also proved that the current loop slot antenna based on coupled feeding with the composition shown in FIG. 29A can obtain the radiation feature of the current loop antenna.

The antenna solution provided in the embodiments of this application also has favorable radiation performance. A radiation status of the current loop slot antenna based on coupled feeding with the composition shown in FIG. 29A is described below with reference to simulation results of S parameters.

Figure 32:
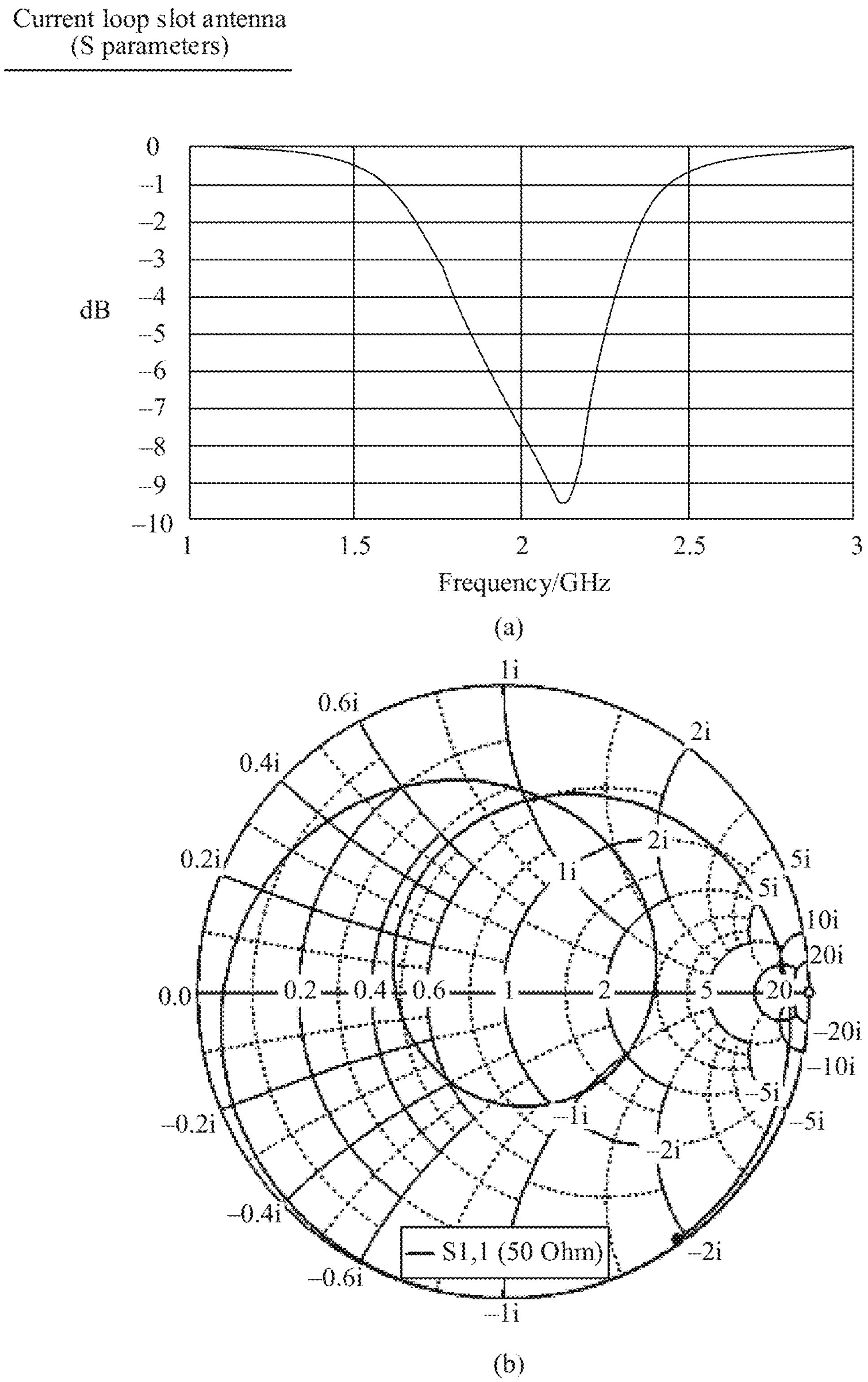
FIG. 32 is a schematic diagram of S parameters of a current loop slot antenna according to an embodiment of this application.
Figure 33:
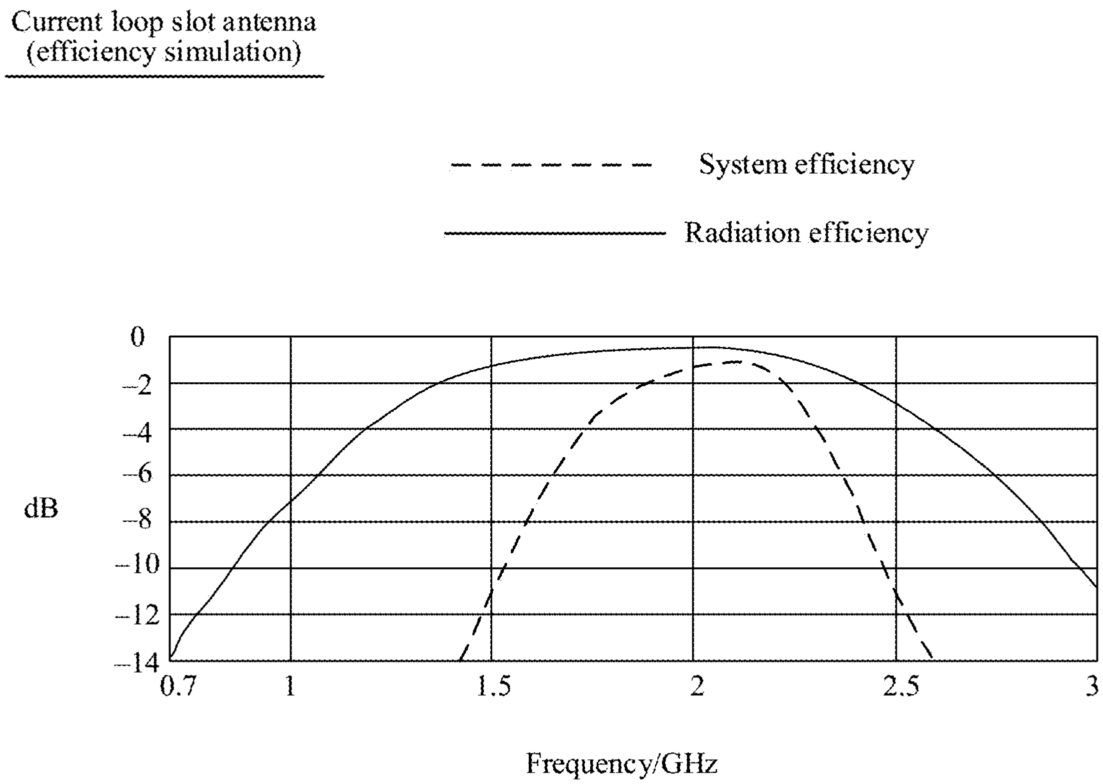
FIG. 33 is a schematic diagram of efficiency simulation of a current loop slot antenna according to an embodiment of this application.

For example, refer to FIG. 32. As shown in (a) in FIG. 32, on an S11 curve, the current loop slot antenna can perform excitation to generate a resonance near 2.2 GHz. The resonance has a −5 dB bandwidth close to 500 MHz, and therefore, coverage of at least one operating band can be achieved. With reference to (b) in FIG. 32, in a Smith chart, except for the arrangement of the capacitor shown in FIG. 29A, no additional matching circuit is required in the current loop slot antenna, and favorable 50 ohms port matching can be achieved. Refer to FIG. 33, which shows an illustration of radiation efficiency and system efficiency of the current loop slot antenna based on coupled feeding with the composition shown in FIG. 29A. As shown in FIG. 33, the current loop slot antenna has a −2 dB radiation efficiency bandwidth of over 1 GHz, and therefore, a favorable radiation capability can be provided. Correspondingly, in a current environment, the system efficiency of the current loop slot antenna has a −6 dB bandwidth of close to 1 GHz. Therefore, in an actual environment, the current loop slot antenna can also provide favorable bandwidth and radiation performance.

With reference to the foregoing analysis results of the impact of the sizes and positions of the feed stubs 1 on antenna radiation in FIG. 12B to FIG. 21 for the current loop monopole antenna, the results are still applicable to the current loop slot antenna. For example, a port matching state of the current loop slot antenna can be adjusted by adjusting the lengths of L1 and L2. For another example, x-axis positions of L1 and L2 have little impact on the resonant frequency and radiation performance of the current loop slot antenna.

Figure 34:
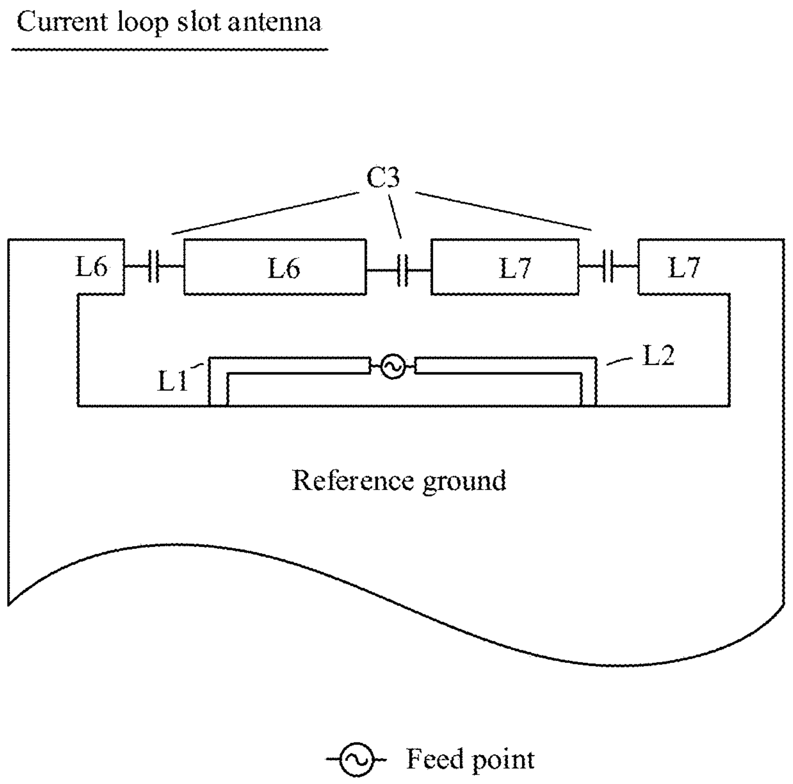
FIG. 34 is a schematic composition diagram of a current loop monopole antenna according to an embodiment of this application.

It should be noted that in the current loop slot antennas provided above in FIG. 29A to FIG. 33, the compositions of the radiation stubs 3 are each an example only. For example, on the radiation stub 3, a capacitor C3 may be provided, for coupling L6 and L7. In some other implementations of this application, more capacitors C3 may be provided on the radiation stub 3. For example, L6 and/or L7 may be connected in series with one or more capacitors C3. For example, FIG. 34 shows an illustration of a current loop slot antenna with a radiation stub 3 connected in series with a plurality of (for example, three) capacitors. In this example, L6 and L7 each may be connected in series with one capacitor C3, and this can further improve the radiation efficiency of the antenna. In different examples, positions of C3 connected in series with the radiation stub are not limited.

In addition, the foregoing examples are all described by using an example in which the composition shown in (a) in FIG. 10 is used for the coupled feeding. In some other embodiments of this application, other examples in FIG. 10 or any example shown in FIG. 11 may alternatively be used for the composition of the coupled feeding, and an effect that can be achieved is similar to the foregoing examples. A form of the composition used for the coupled feeding is not limited in the embodiments of this application.

In different specific implementation processes, specific implementations of the current loop slot antenna with any composition shown in FIG. 29A to FIG. 34 may be different. For example, in some embodiments, the radiator of the radiation stub 3 and/or the feed stub 3 of the current loop slot antenna may fully or partially reuse a metal frame of an electronic device. In some other embodiments, the radiator of the radiation stub 3 and/or the feed stub 3 of the current loop slot antenna may alternatively be implemented in a form of a flexible circuit board (Flexible Printed Circuit, FPC), MDA, or the like. A specific implementation form of the current loop slot antenna is not limited in this embodiment of this application.

In the foregoing description, the coupled feeding solution provided in the embodiments of this application is described with reference to the current loop slot antenna. The following uses an example in which the current loop antenna is a current loop left-handed antenna and a feeding form uses the coupled feeding structure shown in (a) in FIG. 10 to describe the current loop antenna based on coupled feeding provided in the embodiments of this application.

Figure 35A:
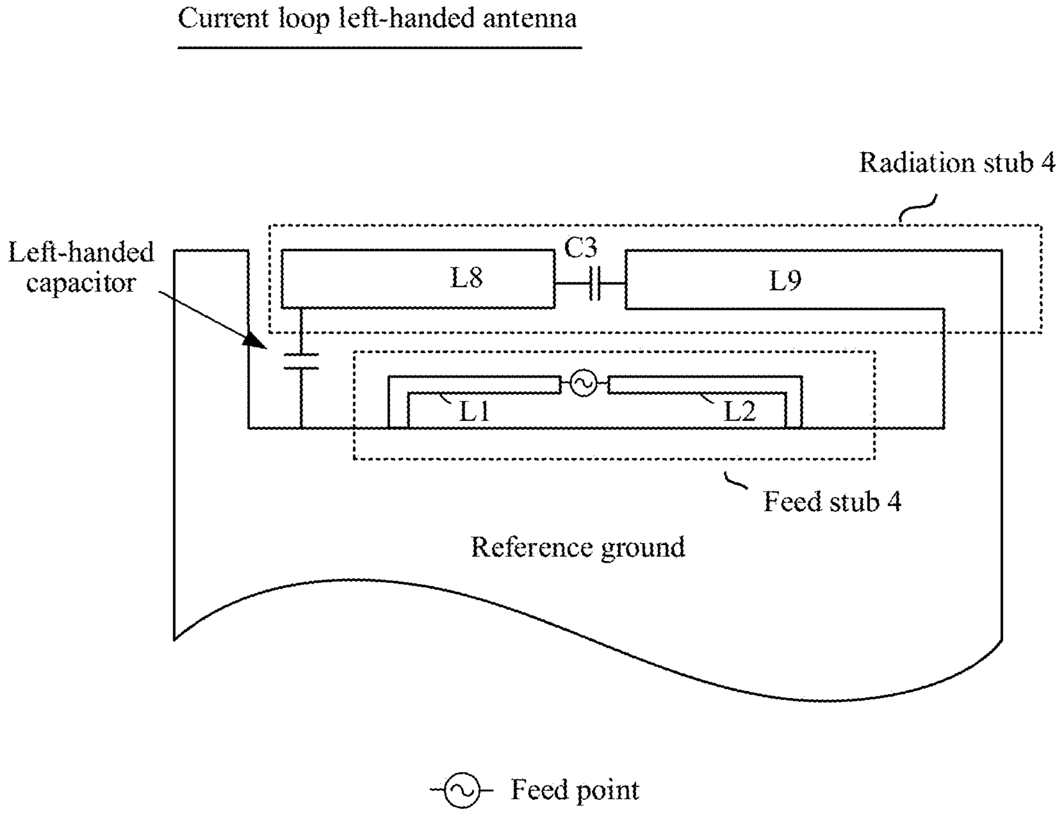
FIG. 35A is a schematic composition diagram of a current loop left-handed antenna according to an embodiment of this application.

For example, refer to FIG. 35A, which is a schematic composition diagram of a current loop left-handed antenna based on coupled feeding according to an embodiment of this application.

As shown in FIG. 35A, the current loop left-handed antenna provided in this example may include a radiation stub 4 and a feed stub 4. The feed stub 4 may be used to generate a transverse current under excitation of a feed point. Through magnetic coupling, the feed stub 4 can excite the radiation stub 4 to generate radiation with a current loop radiation feature.

In this example, the radiation stub 4 may include at least two radiators, for example, L8 and L9. One end of L8 and one end L9 may be provided facing each, and at the ends provided facing each other, L8 and L9 may be coupled to each other through a capacitor C3. In addition, for one radiator (for example, L8) of the two radiators, one end of L8 away from C3 may be coupled to the reference ground through a capacitor (for example, a left-handed capacitor). For the other radiator (for example, L9) of the two radiators, one end of L9 away from C3 may be directly coupled to the reference ground. In other words, in this example, L8 may be a radiator on the radiator of the left-handed antenna, with both ends coupled to capacitors. L9 may be a radiator on the radiator of the left-handed antenna, with one end coupled to a capacitor and one end grounded. In different implementations, L9 may be a "straight-line"-shaped radiator on the radiation stub on the top opposite to the reference ground as shown in FIG. 35A. Alternatively, in some other implementations, L9 may be an "L"-shaped radiator formed by the foregoing "straight-line"-shaped radiator and a radiator at a portion connected to the main ground of the reference ground. In some other implementations, the radiators L8 and L9 are on a same straight line, and a radiator jointly formed thereby forms an "L" shape together with the radiator at the portion connected to the main ground of the reference ground.

In different implementations, the magnitude of the left-handed capacitor and that of C3 may be determined based on an operating band of the current loop dipole antenna. The arrangement of the left-handed capacitor can be used to excite the radiation stub 4 to generate a corresponding left-hand mode for radiation.

Figure 35B:
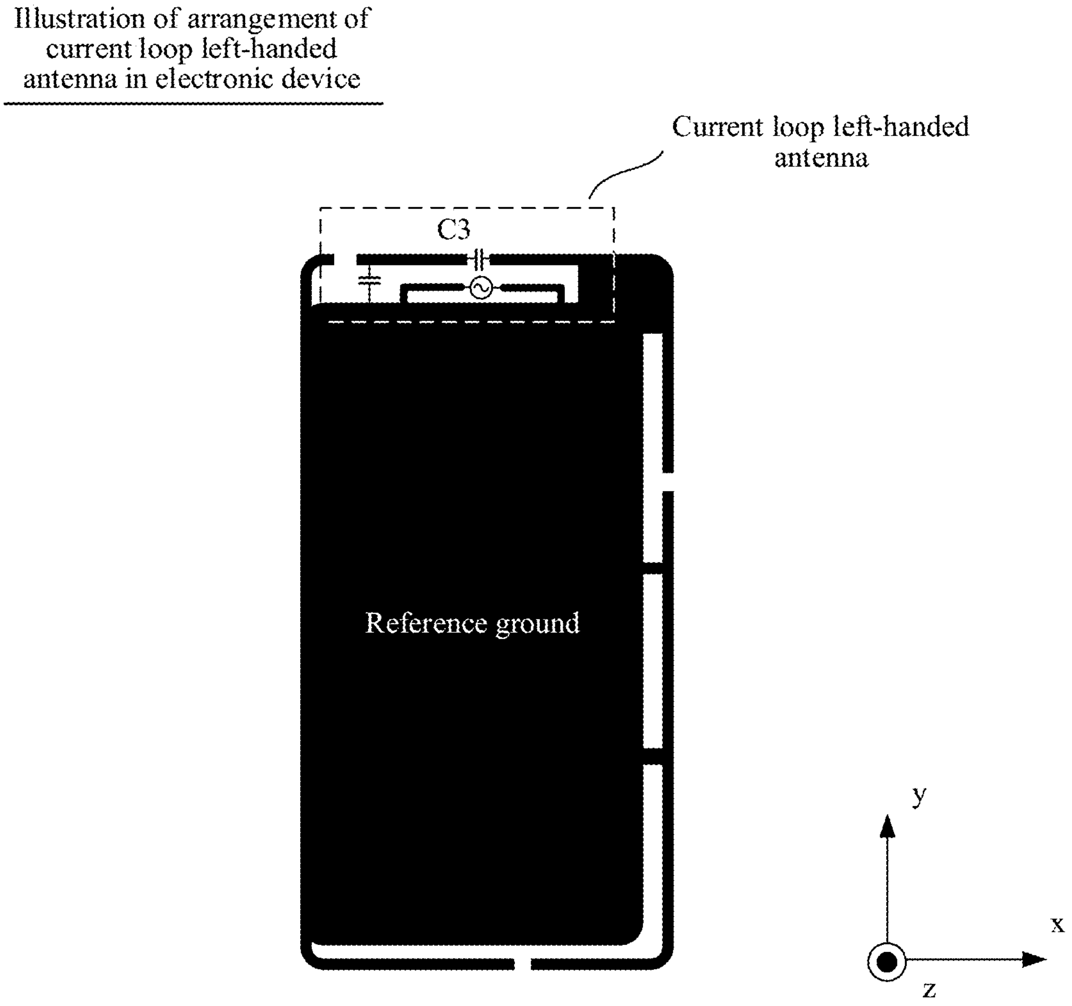
FIG. 35B is a schematic diagram of arrangement of a current loop left-handed antenna in an electronic device according to an embodiment of this application.

In an implementation, refer to FIG. 35B. The current loop left-handed antenna with the composition shown in FIG. 35A may be provided on the top of an electronic device, to cover one or more operating bands of the electronic device.

The current loop left-handed antenna with the composition shown in FIG. 35A can generate radiation with the radiation feature of the current loop antenna under coupled feeding of the feed stub 4. For example, description is provided with reference to the current simulation in FIG. 36 and the magnetic field simulation in FIG. 37.

Figure 36:
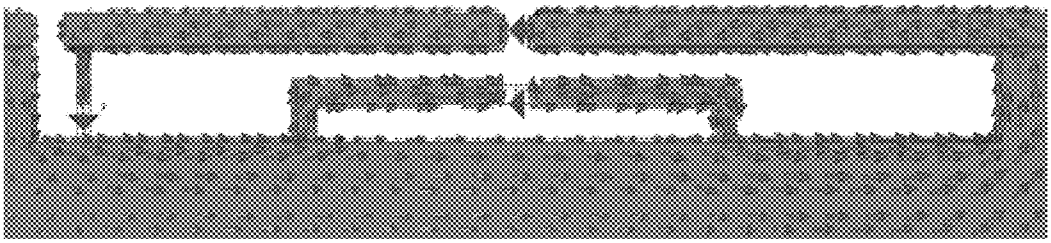
FIG. 36 is a schematic diagram of current distribution of a current loop left-handed antenna according to an embodiment of this application.
Figure 36:
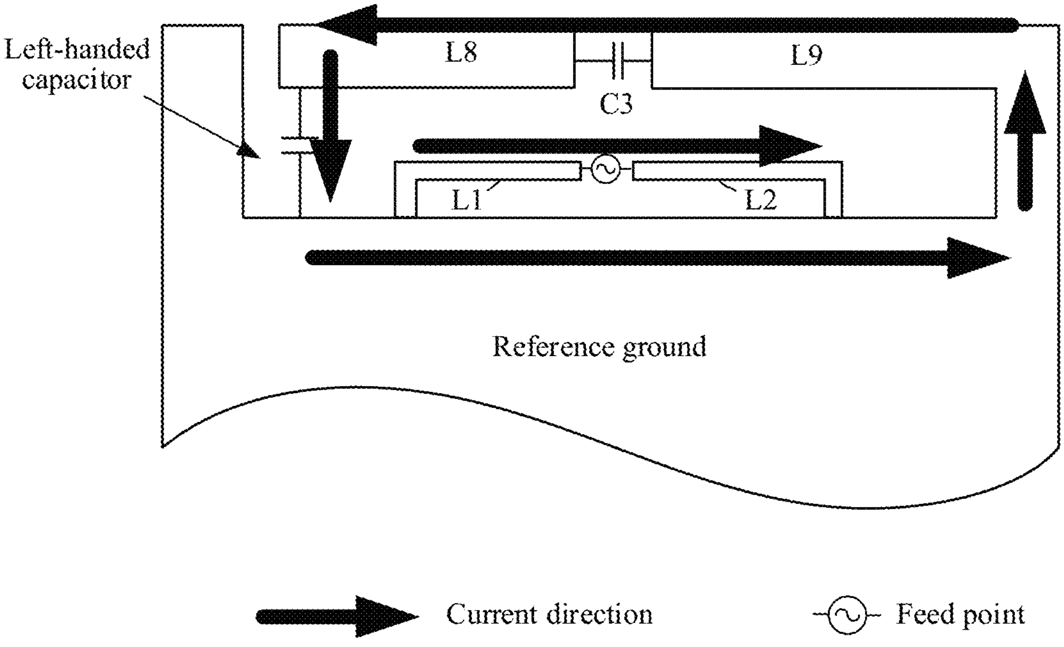

FIG. 36 is a schematic diagram of current simulation of a current loop left-handed antenna according to an embodiment of this application. (a) in FIG. 36 is an actual simulation result. For better description, (b) in FIG. 36 is a simplified current distribution illustration of a current on the radiation stub 4 (for example, L8 and L9) of the current loop left-handed antenna. It can be seen that when the current loop left-handed antenna is working, currents in opposite directions can be formed on L8, L9, and a reference ground. For example, a leftward current can be formed on L8 and L9, and a rightward current can be formed on the reference ground. In this case, the current on L8 and L9 and the current on the reference ground can form a closed current loop. In addition, a current in a direction that is the same as the current on the reference ground and opposite to the current on L8 and L9 may be formed on the feed stub 4. Therefore, this conforms to a current distribution feature in a working process of the current loop antenna.

Figure 37:
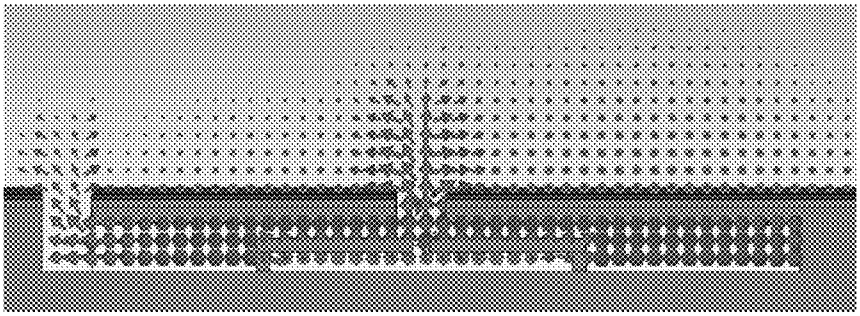
FIG. 37 is a schematic diagram of magnetic field distribution of a current loop left-handed antenna according to an embodiment of this application.
Figure 37:
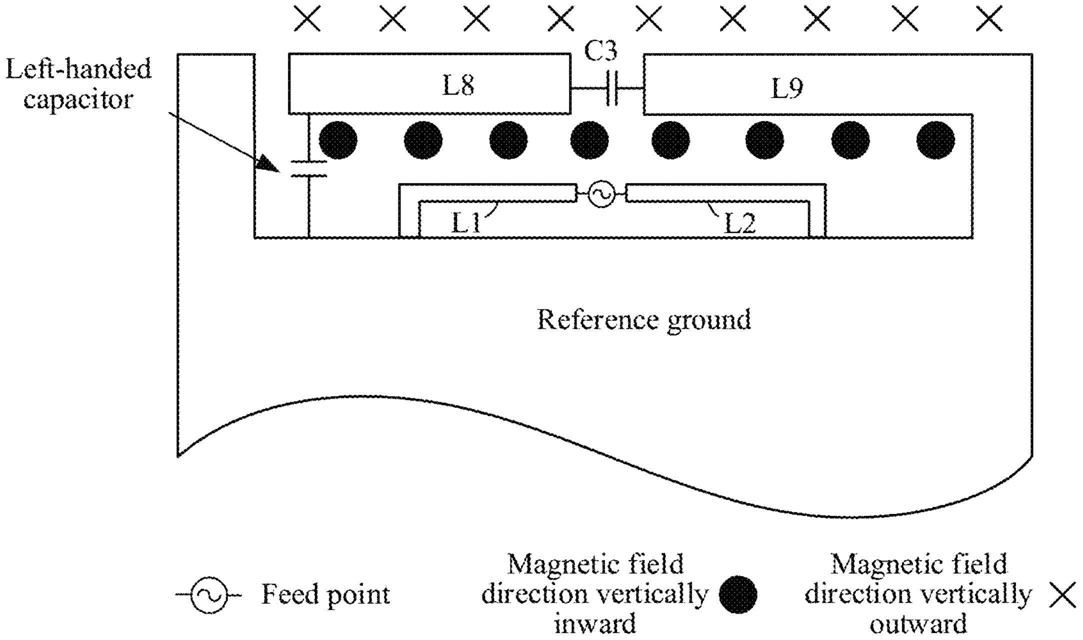

Based on FIG. 36, refer to FIG. 37, which is a schematic diagram of magnetic field simulation of the current loop left-handed antenna further provided in this embodiment of this application. (a) in FIG. 37 is an actual simulation result. For better description, (b) in FIG. 37 is a simplified illustration of distribution of a magnetic field near L8 and L9 of the current loop left-handed antenna. It can be seen that when the current loop left-handed antenna is working, a uniform magnetic field can be formed in space. For example, a uniform magnetic field in an inward direction perpendicular to the paper (that is, in a positive direction of a z-axis) can be formed in an upper space of L8 and L9. A uniform magnetic field in a negative direction of the z-axis is formed in a lower space of L8 and L9. In this way, it is proved that the current loop left-handed antenna based on coupled feeding with the composition shown in FIG. 35A can obtain the radiation feature of the current loop antenna. It can be understood that, in this example, through the arrangement of C3, based on an energy storage feature of the capacitor for electric energy, the antenna radiator and a surface of the reference ground close to the antenna can generate a closed uniform current, so that a uniformly distributed magnetic field can be obtained in this region (for example, a region enclosed by the radiation stub and the reference ground).

The antenna solution provided in the embodiments of this application also has favorable radiation performance. A radiation status of the current loop left-handed antenna based on coupled feeding with the composition shown in FIG. 35A is described below with reference to simulation results of S parameters.

Figure 38:
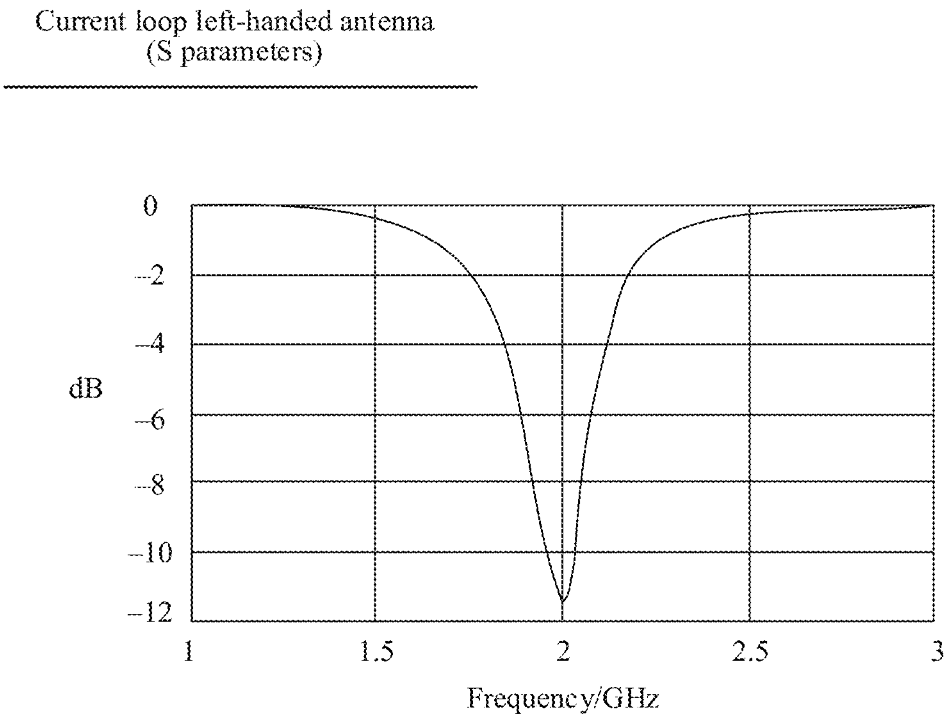
FIG. 38 is a schematic diagram of S parameters of a current loop left-handed antenna according to an embodiment of this application.
Figure 38:
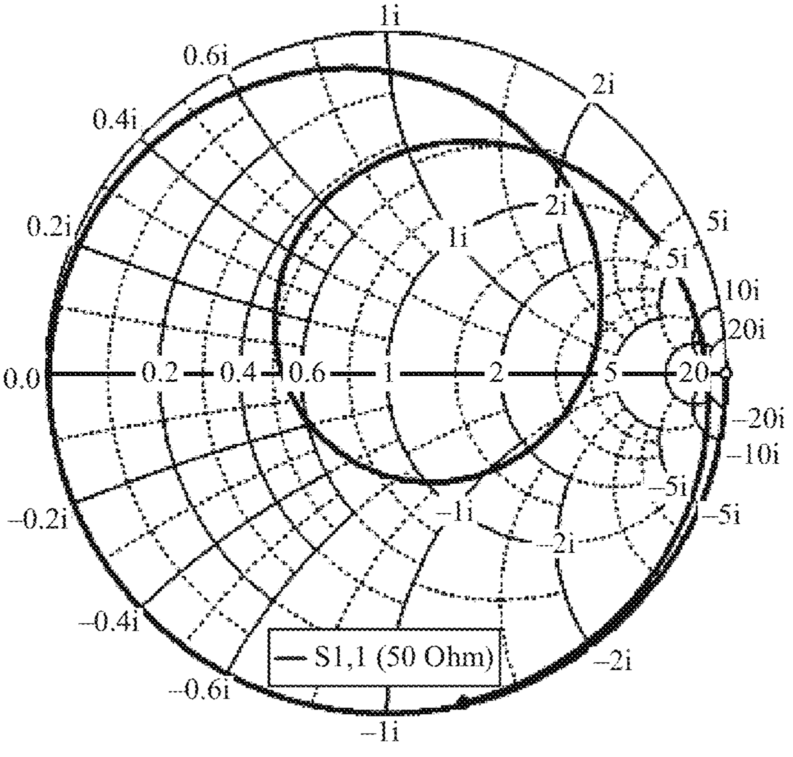
Figure 39:
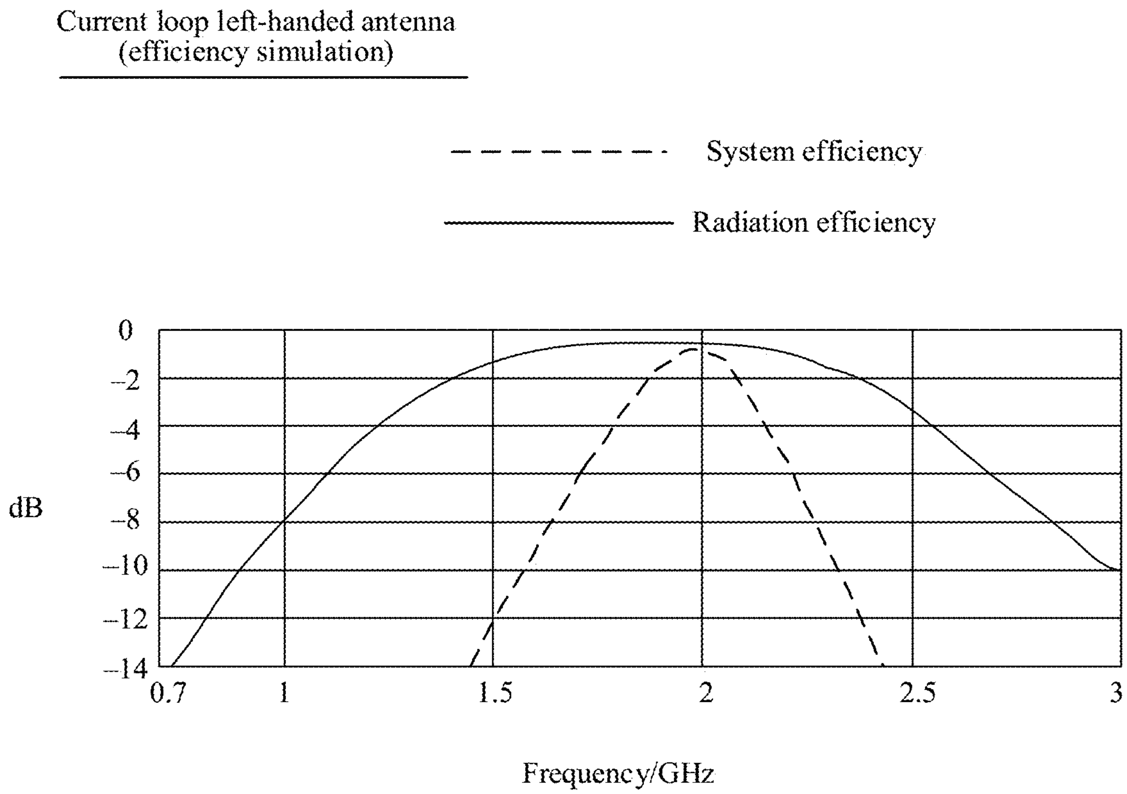
FIG. 39 is a schematic diagram of efficiency simulation of a current loop left-handed antenna according to an embodiment of this application.

For example, refer to FIG. 38. As shown in (a) in FIG. 38, on an Su curve, the current loop left-handed antenna can perform excitation to generate a resonance near 2 GHz. The resonance has a −5 dB bandwidth close to 200 MHz, and therefore, coverage of at least one operating band can be achieved. With reference to (b) in FIG. 38, in a Smith chart, except for the several capacitors (for example, a coupled radiator for excitation of left-handed radiation and a capacitor of the reference ground, and a capacitor connected in series with the radiator) shown in FIG. 35A, no additional matching circuit is required in the current loop left-handed antenna, and favorable 50 ohms port matching can be achieved. Refer to FIG. 39, which shows an illustration of radiation efficiency and system efficiency of the current loop left-handed antenna based on coupled feeding with the composition shown in FIG. 35A. As shown in FIG. 39, the current loop left-handed antenna has a −2 dB radiation efficiency bandwidth of close to 1 GHz, and therefore, a favorable radiation capability can be provided. Correspondingly, in a current environment, the system efficiency of the current loop left-handed antenna has a −6 dB bandwidth of also close to 1 GHz. Therefore, in an actual environment, the current loop left-handed antenna can also provide favorable bandwidth and radiation performance.

With reference to the foregoing analysis results of the impact of the sizes and positions of the feed stubs 1 on antenna radiation in FIG. 12B to FIG. 21 for the current loop monopole antenna, the results are still applicable to the current loop left-handed antenna. For example, a port matching state of the current loop left-handed antenna can be adjusted by adjusting the length of the feed stub 4 (for example, L1 and L2). For another example, x-axis positions of L1 and L2 have little impact on the resonant frequency and radiation performance of the current loop left-handed antenna.

Figure 40:
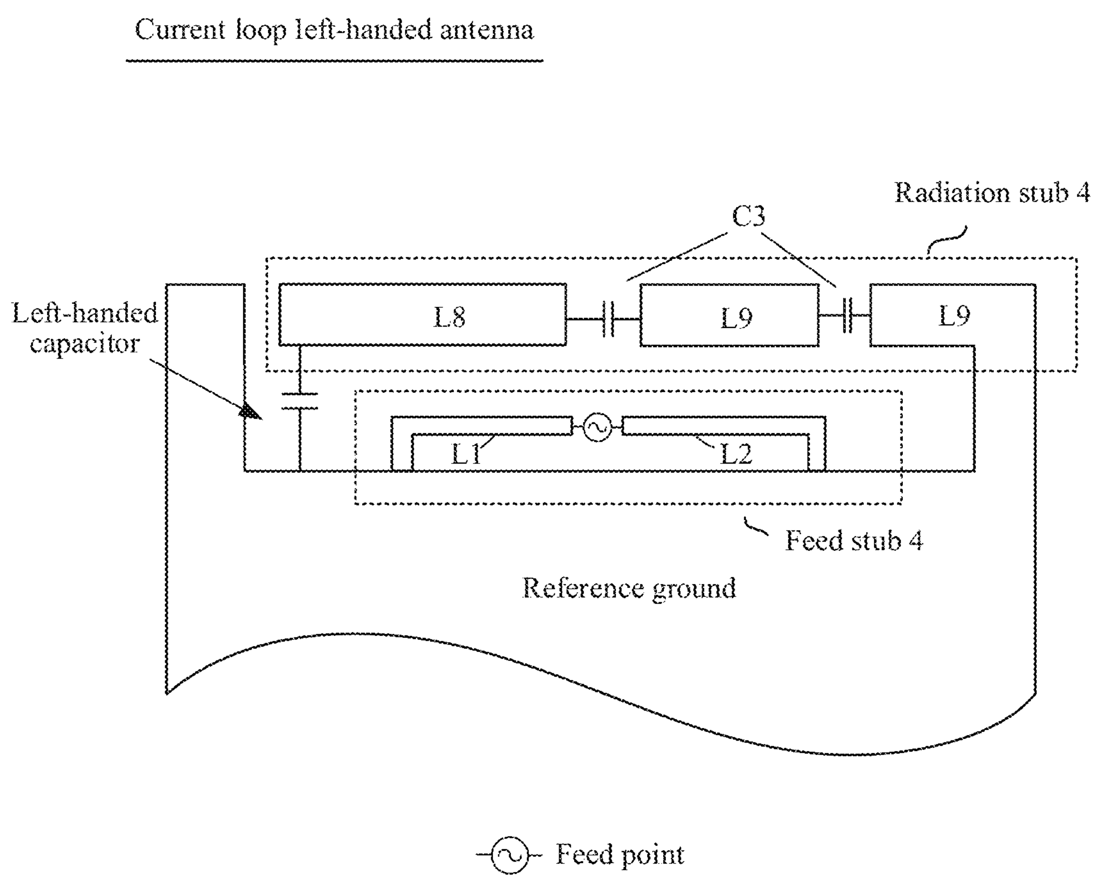
FIG. 40 is a schematic composition diagram of a current loop monopole antenna according to an embodiment of this application.

It should be noted that in the current loop left-handed antennas provided above in FIG. 35A to FIG. 39, the compositions of the radiation stubs 4 are each an example only. In some other implementations of this application, the radiation stub 4 may alternatively be in other forms. For example, the radiation stub 4 may alternatively be connected in series with more capacitors. For example, FIG. 40 shows an illustration of a current loop left-handed antenna with a radiation stub 4 connected in series with a plurality of (for example, three) capacitors. In this example, L9 may be connected in series with one more capacitor C3. Certainly, in some other examples, L8 may also be connected in series with more capacitors C3. Coupled feeding can still be performed on the current loop left-handed antenna with the composition shown in FIG. 40 through the feed stub 4 in the foregoing example to obtain the current loop radiation feature. It is proved through experiments that the radiation efficiency of the antenna can be further improved when the radiation stub 4 is connected in series with a plurality of capacitors. For the setting of the corresponding capacitor position and the setting of a quantity of capacitors, selection may be flexibly performed according to actual needs, and this is not limited in this embodiment of this application.

It should be understood that, the foregoing example is described by using a case in which the current loop antenna achieves the radiation feature thereof through the left-handed antenna after adjustment. For a right-handed antenna, improvement can also be performed in a manner similar to that of the foregoing left-handed antenna to obtain radiation of the current loop right-handed antenna. For parameters and arrangement requirements of the antenna, refer to the current loop left-handed antenna. Details are not described herein again.

In addition, the foregoing examples are all described by using an example in which the composition shown in (a) in FIG. 10 is used for the coupled feeding. In some other embodiments of this application, other examples in FIG. 10 or any example shown in FIG. 11 may alternatively be used for the composition of the coupled feeding, and an effect that can be achieved is similar to the foregoing examples. A form of the composition used for the coupled feeding is not limited in the embodiments of this application.

In different specific implementation processes, specific implementations of the current loop left-handed antenna with any composition shown in FIG. 35A to FIG. 40 may be different. For example, in some embodiments, the radiator of the radiation stub 4 and/or the feed stub 4 of the current loop left-handed antenna may fully or partially reuse a metal frame of an electronic device. In some other embodiments, the radiator of the radiation stub 4 and/or the feed stub 4 of the current loop left-handed antenna may alternatively be implemented in a form of a flexible circuit board (Flexible Printed Circuit, FPC), MDA, or the like. A specific implementation form of the current loop left-handed antenna is not limited in this embodiment of this application.

Through the foregoing examples of the current loop monopole antenna shown in FIG. 13A to FIG. 22, the current loop dipole antenna shown in FIG. 23A to FIG. 28, the current loop slot antenna shown in FIG. 29A to FIG. 34, and the current loop left-handed antenna shown in FIG. 25 to FIG. 40, a person skilled in the art should be capable of having a comprehensive and accurate understanding of composition features and the working status of the current loop antenna based on coupled feeding provided in the embodiments of this application. It should be understood that, in addition to the foregoing examples, the solution of excitation of the current loop radiation feature by coupled feeding may be further applied to another typical antenna, so that the corresponding typical antenna can also perform radiation with the current loop radiation feature under particular conditions, thereby improving the radiation capability of the antenna. In addition, based on the coupled feeding mechanism, a requirement on environment settings introduced by direct feeding is avoided. Therefore, this can be applied to a wider range of scenarios, and a better wireless communication function can be provided for an electronic device through the current loop antenna.

Although this application is described with reference to specific features and the embodiments thereof, apparently, various modifications and combinations may be made to them without departing from the scope of this application. Correspondingly, this specification and the accompanying drawings are merely used as exemplary descriptions of this application defined by the appended claims, and are considered as having covered any of and all of modifications, variations, combinations, or equivalents within the scope of this application. Obviously, a person skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. A terminal monopole antenna based on coupled feeding, wherein the terminal monopole antenna comprises a feed stub and a radiation stub;

a first end of the radiation stub and a second end of the radiation stub are coupled to a reference ground through a first capacitor and a second capacitor, respectively, to ground the first end of the radiation stub through the first capacitor and ground the second end of the radiation stub through the second capacitor;

the feed stub is not connected to the radiation stub, the feed stub is arranged between the radiation stub and the reference ground, a feed point is provided on the feed stub, and the feed stub is used to perform coupled feeding on the radiation stub; and a length of the radiation stub is less than one quarter of an operating wavelength of the terminal monopole antenna.

2. The terminal monopole antenna according to claim 1, wherein when an operating band of the terminal monopole antenna is 450 MHz to 1 GHz, a capacitance value of each of the first capacitor and the second capacitor is set within [1.5 pF, 15 pF];

when an operating band of the terminal monopole antenna is 1 GHz to 3 GHZ, a capacitance value of each of the first capacitor and the second capacitor is set within [0.5 pF, 15 pF]; or when an operating band of the terminal monopole antenna is 3 GHz to 10 GHz, a capacitance value of each of the first capacitor and the second capacitor is set within [1.2 pF, 12 pF].

3. The terminal monopole antenna according to claim 1, wherein the radiation stub is connected in series with one or more third capacitors; and when an operating band of the terminal monopole antenna is 450 MHz to 1 GHz, a capacitance value of the one or more third capacitors is set within [2 pF, 25 pF];

when an operating band of the terminal monopole antenna is 1 GHz to 3 GHZ, a capacitance value of the one or more third capacitors is set within [0.8 pF, 12 pF]; or when an operating band of the terminal monopole antenna is 3 GHz to 10 GHz, a capacitance value of the one or more third capacitors is set within [0.2 pF, 8 pF].

4. The terminal monopole antenna according to claim 1, wherein the feed stub comprises a first feed portion and a second feed portion, a first end of the first feed portion is coupled to a first end of the feed point, a first end of the second feed portion is coupled to a second end of the feed point, and the first feed portion and the second feed portion are axisymmetrical about a longitudinal axis on which the feed point is located; and a second end of each of the first feed portion and the second feed portion that is farthest from the feed point is coupled to the reference ground.

5. The terminal monopole antenna according to claim 4, wherein that the second end of each of the first feed portion and the second feed portion that is farthest from the feed point is coupled to the reference ground comprises:

the second end of each of the first feed portion and the second feed portion that is farthest from the feed point is coupled to the reference ground through a capacitor.

6. The terminal monopole antenna according to claim 1, wherein the feed stub comprises a third feed portion, a first end of the third feed portion is coupled to a first end of the feed point, a second end of the third feed portion is coupled to the reference ground, and a second end of the feed point is coupled to a radio frequency microstrip.

7. The terminal monopole antenna according to claim 6, wherein the third feed portion is connected in series with at least one capacitor, comprising at least a fourth capacitor, and the fourth capacitor is arranged in a center of a coupling part between the third feed portion and the radiation stub.

8. The terminal monopole antenna according to claim 6, wherein the second end of the third feed portion is coupled to the reference ground through a tuning device, and the tuning device comprises at least one of the following devices: a capacitor, an inductor, or a resistor.

9. The terminal monopole antenna according to claim 8, wherein a distance between the first end of the third feed portion and the second end of the third feed portion is less than a projection length of the third feed portion on the radiation stub.

10. The terminal monopole antenna according to claim 9, wherein the third feed portion is connected in series with at least one capacitor, comprising at least a fifth capacitor and a sixth capacitor and a seventh capacitor respectively arranged on two sides of the fifth capacitor, and the fifth capacitor is arranged in a center of a coupling part between the third feed portion and the radiation stub.

11. The terminal monopole antenna according to claim 1, wherein different sizes of feed stubs correspond to different port impedances of the terminal monopole antenna.

12. The terminal monopole antenna according to claim 1, wherein the feed stub is configured to excite the radiation stub to perform radiation with a radiation feature of a current loop antenna, and the radiation feature of the current loop antenna is that there is a uniform magnetic field near the radiation stub when the terminal monopole antenna is working.

13. The terminal monopole antenna according to claim 1, wherein when the terminal monopole antenna is working, a current flow direction on the radiation stub is a first direction, a current flow direction on the reference ground is a second direction, and the first direction is opposite to the second direction; and a current flow direction on the feed stub is the second direction.

14. An electronic device, wherein the electronic device comprises at least one processor, a radio frequency module, and a terminal monopole antenna based on coupled feeding; and during signal transmission or reception, the electronic device transmits or receives signals through the radio frequency module and the terminal monopole antenna based on coupled feeding; and the terminal monopole antenna comprises a feed stub and a radiation stub;

a first end of the radiation stub and a second end of the radiation stub are coupled to a reference ground through a first capacitor and a second capacitor, respectively, to ground the first end of the radiation stub through the first capacitor and ground the second end of the radiation stub through the second capacitor;

the feed stub is not connected to the radiation stub, the feed stub is arranged between the radiation stub and the reference ground, a feed point is provided on the feed stub, and the feed stub is used to perform coupled feeding on the radiation stub; and a length of the radiation stub is less than one quarter of an operating wavelength of the terminal monopole antenna.

15. The electronic device according to claim 14, wherein when an operating band of the terminal monopole antenna is 450 MHz to 1 GHz, a capacitance value of each of the first capacitor and the second capacitor is set within [1.5 pF, 15 pF].

16. The electronic device according to claim 14, wherein when an operating band of the terminal monopole antenna is 1 GHz to 3 GHZ, a capacitance value of each of the first capacitor and the second capacitor is set within [0.5 pF, 15 pF].

17. The electronic device according to claim 14, wherein when an operating band of the terminal monopole antenna is 3 GHz to 10 GHz, a capacitance value of each of the first capacitor and the second capacitor is set within [1.2 pF, 12 pF].

18. The electronic device according to claim 14, wherein the radiation stub is connected in series with one or more third capacitors, and when an operating band of the terminal monopole antenna is 450 MHz to 1 GHz, a capacitance value of the one or more third capacitors is set within [2 pF, 25 pF].

19. The electronic device according to claim 14, wherein the radiation stub is connected in series with one or more third capacitors, and when an operating band of the terminal monopole antenna is 1 GHz to 3 GHZ, a capacitance value of the one or more third capacitors is set within [0.8 pF, 12 pF].

20. The electronic device according to claim 14, wherein the radiation stub is connected in series with one or more third capacitors, and wherein when an operating band of the terminal monopole antenna is 3 GHz to 10 GHz, a capacitance value of the one or more third capacitors is set within [0.2 pF, 8 pF].

* * * * *